US012776575B2

(12) United States Patent
Neenan et al.

(10) Patent No.: US 12,776,575 B2
(45) Date of Patent: Oct. 27, 2026

(54) ANTENNA SYSTEMS

(71) Applicant: Parsec Technologies, Inc., Plano, TX (US)

(72) Inventors: Michael A Neenan, Plano, TX (US); Richard Loy Smith, Jr., Dallas, TX (US); Rauhon Ahmed Shaik, Wylie, TX (US); George Alexander Bednekoff, Plano, TX (US)

(73) Assignee: Parsec Technologies, Inc., Plano, TX (US)

( * ) Notice: Subject to any disclaimer, the term of this patent is extended or adjusted under 35 U.S.C. 154(b) by 127 days.

(21) Appl. No.: 18/896,695

(22) Filed: Sep. 25, 2024

(65) Prior Publication Data

US 2025/0233306 A1 Jul. 17, 2025

Related U.S. Application Data

(63) Continuation-in-part of application No. 18/894,607, filed on Sep. 24, 2024, and a continuation of (Continued)

(51) Int. Cl.
*H01Q 5/30* (2015.01)
*H01Q 1/42* (2006.01)
*H01Q 1/48* (2006.01)

(52) U.S. Cl.
CPC ................ *H01Q 5/30* (2015.01); *H01Q 1/42* (2013.01); *H01Q 1/48* (2013.01)

(58) Field of Classification Search
CPC ............... H01Q 5/30; H01Q 1/42; H01Q 1/48
See application file for complete search history.

(56) References Cited

U.S. PATENT DOCUMENTS 5,966,102 A 10/1999 Runyon
6,067,053 A 5/2000 Runyon (Continued)

FOREIGN PATENT DOCUMENTS

CN 102097674 6/2011
CN 102468529 5/2012

(Continued)

OTHER PUBLICATIONS

Balling et al., "Broadband Dual Polarized Antenna Arrays for Mobile Communication Applications", 33rd European Microwave Conference Proceedings IEEE, Oct. 7, 2003, Munich, Germany, p. 1-4.

(Continued)

*Primary Examiner* — Hai V Tran
(74) *Attorney, Agent, or Firm* — Knobbe, Martens, Olson & Bear, LLP

(57) ABSTRACT

An antenna assembly can include a case, a first ground plane, and a multi-band multi-element antenna. The case can include a body portion and a door pivotably coupled to the body portion. The first ground plane can be coupled to the body portion and can divide the case into a first internal volume and a second internal volume. The multi-band multi-element antenna can include at least one multi-band radiating element coupled to a top side of the first ground plane. The antenna assembly can include a tablet computer and/or a display screen.

20 Claims, 58 Drawing Sheets

Related U.S. Application Data application No. PCT/US2024/048229, filed on Sep. 24, 2024.

(60) Provisional application No. 63/680,045, filed on Aug. 6, 2024, provisional application No. 63/676,268, filed on Jul. 26, 2024, provisional application No. 63/652,599, filed on May 28, 2024, provisional application No. 63/638,330, filed on Apr. 24, 2024, provisional application No. 63/637,247, filed on Apr. 22, 2024, provisional application No. 63/585,541, filed on Sep. 26, 2023, provisional application No. 63/540,335, filed on Sep. 25, 2023.

(56) References Cited

U.S. PATENT DOCUMENTS

| | | | | |
|---|---|---|---|---|
| 6,111,550 | A | 8/2000 | Miller et al. | |
| 6,618,013 | B1 * | 9/2003 | Aldous | H01Q 1/244 343/702 |
| 9,379,453 | B2 | 6/2016 | Rentz | |
| 10,224,615 | B2 | 3/2019 | Wu | |
| 10,312,583 | B2 | 6/2019 | Ng | |
| 10,511,086 | B1 | 12/2019 | Thill | |
| 11,251,539 | B2 | 2/2022 | Hinman | |
| 11,283,149 | B2 | 3/2022 | Neenan et al. | |
| 11,329,363 | B1 | 5/2022 | Neenan et al. | |
| 11,658,382 | B2 | 5/2023 | Neenan et al. | |
| 11,664,574 | B2 | 5/2023 | Neenan et al. | |
| 11,909,090 | B2 | 2/2024 | Neenan et al. | |
| 11,936,094 | B2 | 3/2024 | Neenan et al. | |
| 12,057,641 | B2 | 8/2024 | Neenan et al. | |
| 12,212,035 | B2 | 1/2025 | Neenan et al. | |
| 12,266,845 | B2 | 4/2025 | Neenan et al. | |
| 12,537,318 | B2 | 1/2026 | Neenan et al. | |
| 12,548,922 | B2 | 2/2026 | Neenan et al. | |
| 2008/0180333 | A1 * | 7/2008 | Martiskainen | H01Q 1/38 343/722 |
| 2010/0206523 | A1 * | 8/2010 | Chen | H01Q 1/002 165/104.33 |
| 2010/0253584 | A1 | 10/2010 | Yang et al. | |
| 2011/0080323 | A1 | 4/2011 | Thiam | |
| 2011/0102278 | A1 | 5/2011 | Rozan | |
| 2012/0146872 | A1 | 6/2012 | Chainon et al. | |
| 2012/0280882 | A1 | 11/2012 | Zimmerman | |
| 2013/0082893 | A1 * | 4/2013 | Wang | H01Q 9/26 343/810 |
| 2014/0139387 | A1 | 5/2014 | Jones et al. | |
| 2014/0375507 | A1 | 12/2014 | Lin et al. | |
| 2015/0042521 | A1 | 2/2015 | Hazen | |
| 2015/0102974 | A1 | 4/2015 | Stoytchev et al. | |
| 2015/0357714 | A1 * | 12/2015 | Ng | H01Q 1/3275 343/848 |
| 2016/0172750 | A1 | 6/2016 | Ng | |
| 2016/0248148 | A1 | 8/2016 | Hill et al. | |
| 2016/0277062 | A1 | 9/2016 | Cheon et al. | |
| 2016/0285161 | A1 | 9/2016 | Apaydin et al. | |
| 2017/0062952 | A1 | 3/2017 | Sundararajan | |
| 2017/0237158 | A1 | 8/2017 | Gibson et al. | |
| 2017/0317428 | A1 * | 11/2017 | Petropoulos | H01Q 21/065 |
| 2017/0324171 | A1 | 11/2017 | Shehan | |
| 2017/0358842 | A1 | 12/2017 | Shehan | |
| 2018/0062731 | A1 | 3/2018 | Ng et al. | |
| 2018/0083348 | A1 | 3/2018 | Thiam et al. | |
| 2018/0109006 | A1 | 4/2018 | Ng et al. | |
| 2018/0323513 | A1 | 11/2018 | Varnoosfaderani et al. | |
| 2019/0148825 | A1 | 5/2019 | Huerta et al. | |
| 2019/0237850 | A1 | 8/2019 | Fleischer et al. | |
| 2019/0305406 | A1 | 10/2019 | Williams | |
| 2019/0341674 | A1 | 11/2019 | Rosenthal et al. | |
| 2019/0356051 | A1 | 11/2019 | Barrera et al. | |
| 2020/0112101 | A1 | 4/2020 | Yun | |
| 2020/0212948 | A1 | 7/2020 | Thill et al. | |
| 2020/0243940 | A1 | 7/2020 | Greenstein et al. | |
| 2020/0350664 | A1 | 11/2020 | Thill | |
| 2020/0373668 | A1 | 11/2020 | Wu | |
| 2020/0411972 | A1 | 12/2020 | Hicks et al. | |
| 2021/0226316 | A1 * | 7/2021 | Migliorino | H01Q 9/0421 |
| 2021/0305718 | A1 | 9/2021 | Li | |
| 2021/0391655 | A1 | 12/2021 | Brobston et al. | |
| 2022/0384966 | A1 | 12/2022 | Chiang et al. | |
| 2023/0052185 | A1 | 2/2023 | Thill | |
| 2023/0145053 | A1 | 5/2023 | Kilbury et al. | |
| 2023/0198553 | A1 | 6/2023 | Kim et al. | |
| 2023/0223709 | A1 | 7/2023 | Guntupalli | |
| 2023/0408619 | A1 | 12/2023 | El-Akkad et al. | |
| 2024/0097339 | A1 | 3/2024 | Khatua | |
| 2024/0113450 | A1 | 4/2024 | Neenan et al. | |
| 2024/0113451 | A1 | 4/2024 | Neenan et al. | |
| 2024/0128644 | A1 | 4/2024 | Neenan et al. | |
| 2024/0304958 | A1 | 9/2024 | Matsumura | |
| 2025/0079683 | A1 | 3/2025 | Neenan et al. | |
| 2025/0079704 | A1 | 3/2025 | Neenan et al. | |
| 2025/0087905 | A1 | 3/2025 | Neenan et al. | |
| 2025/0105530 | A1 | 3/2025 | Neenan et al. | |
| 2025/0158281 | A1 | 5/2025 | Neenan et al. | |
| 2025/0158289 | A1 | 5/2025 | Neenan et al. | |
| 2025/0167445 | A1 | 5/2025 | Neenan et al. | |
| 2025/0167459 | A1 | 5/2025 | Neenan et al. | |
| 2025/0233307 | A1 | 7/2025 | Neenan et al. | |
| 2025/0260160 | A1 | 8/2025 | Neenan et al. | |
| 2025/0329911 | A1 | 10/2025 | Neenan et al. | |
| 2025/0329912 | A1 | 10/2025 | Neenan et al. | |
| 2025/0329927 | A1 | 10/2025 | Neenan et al. | |

FOREIGN PATENT DOCUMENTS

| | | |
|---|---|---|
| CN | 203562507 | 4/2014 |
| CN | 105281049 | 1/2016 |
| CN | 210806018 | 6/2020 |
| CN | 212303910 | 1/2021 |
| CN | 114465021 | 5/2022 |
| CN | 116151285 | 5/2023 |
| DE | 202017002307 U1 | 8/2017 |
| EP | 0 349 499 | 1/1990 |
| EP | 3 474 376 | 4/2019 |
| EP | 3 614 491 | 2/2020 |
| KR | 102260880 | 6/2021 |
| WO | WO 2005/062422 | 7/2005 |
| WO | WO 2013/090783 | 6/2013 |
| WO | WO 2018/140305 | 8/2018 |
| WO | WO 2020/010039 | 1/2020 |
| WO | WO 2023/128683 | 7/2023 |
| WO | WO 2024/035801 | 2/2024 |
| WO | WO 2024/035805 | 2/2024 |
| WO | WO 2024/035810 | 2/2024 |
| WO | WO 2025/072367 | 9/2024 |
| WO | WO 2025/072213 | 4/2025 |
| WO | WO 2025/072553 | 4/2025 |
| WO | WO 2025/221801 | 10/2025 |
| WO | WO 2025/226612 | 10/2025 |
| WO | WO 2025/226867 | 10/2025 |

OTHER PUBLICATIONS

International Search Report and Written Opinion issued in PCT Application No. PCT/US2024/048229, in 11 pages.

* cited by examiner

ANTENNA SYSTEMS

INCORPORATION BY REFERENCE TO ANY PRIORITY APPLICATIONS

The present application claims priority benefit to U.S. Provisional Application No. 63/540,335, filed Sep. 25, 2023, entitled "ANTENNA SYSTEMS," U.S. Provisional Application No. 63/652,599, filed May 28, 2024, entitled "ANTENNA SYSTEMS," and U.S. Provisional Application No. 63/680,045, filed Aug. 6, 2024, entitled "ANTENNA SYSTEMS," and is a continuation of PCT Application No. PCT/US2024/048229, filed Sep. 24, 2024, entitled "ANTENNA SYSTEMS." The present application also claims priority benefit to U.S. Provisional Application No. 63/637,247, filed Apr. 22, 2024, entitled "ANTENNA SYSTEMS." The present application also claims priority benefit to U.S. Provisional Application No. 63/638,330, filed Apr. 24, 2024, entitled "ANTENNA SYSTEMS," and U.S. Provisional Application No. 63/676,268, filed Jul. 26, 2024, entitled "ANTENNA SYSTEMS." The present application also claims priority benefit to U.S. Provisional Application No. 63/585,541, filed Sep. 26, 2023, entitled "ANTENNA SYSTEMS," and is a continuation-in-part of U.S. application Ser. No. 18/894,607, filed Sep. 24, 2024, entitled "ANTENNA SYSTEMS." All of the above-mentioned applications are hereby incorporated by reference herein in their entireties. Any and all applications for which a foreign or domestic priority claim is identified in the Application Data Sheet as filed with the present application are hereby incorporated by reference under 37 CFR 1.57 and made a part of this specification.

BACKGROUND

Field

The present disclosure relates to the field of wireless broadband communication, and more particularly to antenna systems and antennas that cover multiple frequency bands used in the telecommunication wireless spectrum.

Description of the Related Art

Over the last few decades, 3GPP as a collaborative organization has developed protocols for mobile telecommunications. The latest operational standard is known as 5G. Wireless communication relies on a variety of radio components including radio antennas that are used for transmitting and receiving information via electromagnetic waves. To communicate to specific devices without interference from other devices, radio transceivers and receivers communicate within a dedicated frequency bandwidth and have associated antennas that are configured to electromagnetically resonate at frequencies within the dedicated bandwidth. As more wireless devices are used on a frequency bandwidth, a communication bottleneck occurs as wireless devices compete for frequency channels within a dedicated bandwidth. 3GPP frequency bands range from 450 MHz to 8 GHz and beyond, however, antennas configured to resonate within this spectrum only resonate below 8 GHz for mobile 3GPP telecommunication standards. To capture a greater portion of the 3GPP or other telecommunication spectrum, either an antenna array of various antenna configurations is used, or a single geometrically complex antenna can be used. An antenna array, in most instances, takes up too much space and is therefore impractical for small devices, but employing a single antenna will have a useable bandwidth that is limited by its geometrical configuration. In one example, a known antenna configuration permits a 700 MHz-2.7 GHz frequency band; however, a single antenna configuration that permits a wider frequency band is desired. Additionally, it can be difficult and expensive to manufacture, assemble, and procure materials for components of antenna array systems. This may result in a system with poor functionality and/or coverage.

SUMMARY

This disclosure relates to antennas that cover multiple frequency bands that are prolific in today's telecommunication wireless spectrum. The advances of telecommunications wireless devices have expanded the number of frequency bands that a radio can support for prolific coverage. For example, there are over 30 5G Bands that a radio may be asked to support if the radio is to provide ubiquitous coverage for a mobile device. While some of the LTE Bands overlap one another, there are numerous gaps between the bands as well. A multi-band approach to the antenna's frequency response provides a unique and novel radiating structure to support the numerous 5G bands.

According to some advantageous implementations, an antenna assembly can comprise a cover defining a first internal volume and a radome defining a second internal volume, the radome coupled to the cover. The antenna assembly can include one or more multi-band radiator portions and one or more dual-band WiFi radiator portions, wherein the one or more multi-band radiator portions and the one or more dual-band WiFi radiator portions are housed within the second internal volume.

In some implementations, an antenna assembly can include a case, a first ground plane, and a multi-band multi-element antenna. The case can include a body portion and a door pivotably coupled to the body portion. The first ground plane can be coupled to the body portion and can divide the case into a first internal volume and a second internal volume. The multi-band multi-element antenna can include at least one multi-band radiating element coupled to a top side of the first ground plane.

In some implementations, an antenna assembly can include a cover, a radome, one or more multi-band radiator portions, and one or more dual-band WiFi radiator portions. The cover can define a first internal volume. The radome can define a second internal volume. The radome can be coupled to the cover. The one or more multi-band radiator portions and the one or more dual-band WiFi radiator portions can be housed within the second internal volume.

Some advantageous features have thus been outlined in order that the more detailed description that follows may be better understood and to ensure that the present contribution to the art is appreciated. Additional features will be described hereinafter and will form the subject matter of the claims that follow.

Many objects of the present application will appear from the following description and appended claims, reference being made to the accompanying drawings forming a part of this specification wherein like reference characters designate corresponding parts in the several views.

Before explaining at least one implementation of the present disclosure in detail, it is to be understood that the implementations are not limited in its application to the details of construction and the arrangements of the components set forth in the following description or illustrated in the drawings. The implementations are capable of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the various purposes of the present design. Accordingly, the claims should be regarded as including such equivalent constructions in so far as they do not depart from the spirit and scope of the present application.

BRIEF DESCRIPTION OF THE DRAWINGS

The novel features believed characteristic of the application are set forth in the appended claims. However, the application itself, as well as a preferred mode of use, and further objectives and advantages thereof, will best be understood by reference to the following detailed description when read in conjunction with the accompanying drawings, wherein:

Figure 1A:
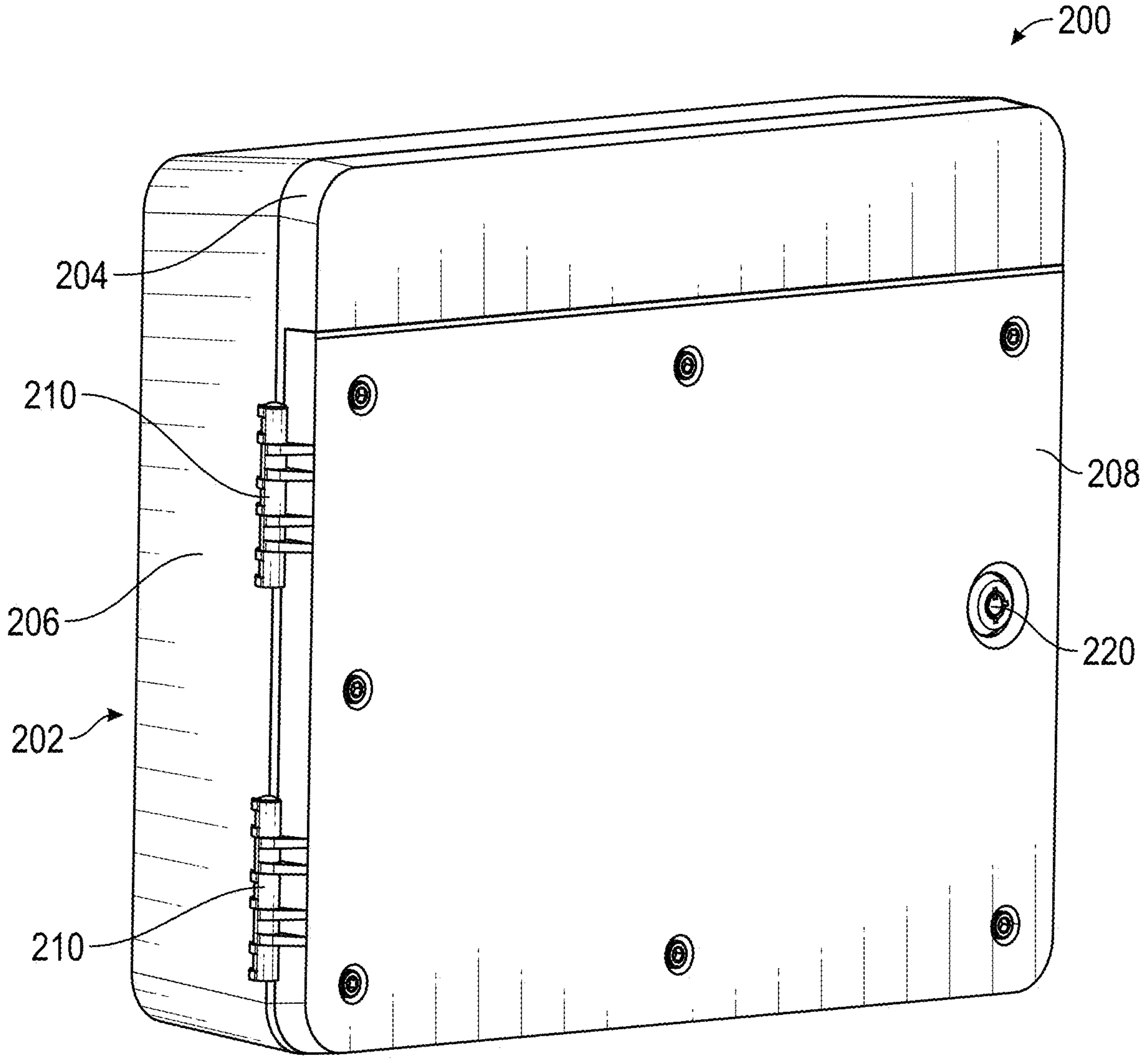
FIG. 1A illustrates a front perspective view of an antenna assembly, in accordance with some aspects of this disclosure.

While the implementations and method of the present application is susceptible to various modifications and alternative forms, specific implementations thereof have been shown by way of example in the drawings and are herein described in detail. It should be understood, however, that the description herein of specific implementations is not intended to limit the application to the particular implementation disclosed, but on the contrary, the intention is to cover all modifications, equivalents, and alternatives falling within the spirit and scope of the process of the present application as defined by the appended claims.

DETAILED DESCRIPTION

Illustrative implementations of the present disclosure are described below. In the interest of clarity, not all features of an actual implementation are described in this specification.

It will of course be appreciated that in the development of any such actual implementation, numerous implementation-specific decisions must be made to achieve the developer's specific goals, such as compliance with system-related and business-related constraints, which will vary from one implementation to another. Moreover, it will be appreciated that such a development effort might be complex and time-consuming but would nevertheless be a routine undertaking for those of ordinary skill in the art having the benefit of this disclosure.

In the specification, reference may be made to the spatial relationships between various components and to the spatial orientation of various aspects of components as the devices are depicted in the attached drawings. However, as will be recognized by those skilled in the art after a complete reading of the present application, the devices, members, apparatuses, etc. described herein may be positioned in any desired orientation. Thus, the use of terms to describe a spatial relationship between various components or to describe the spatial orientation of aspects of such components should be understood to describe a relative relationship between the components or a spatial orientation of aspects of such components, respectively, as the implementations described herein may be oriented in any desired direction.

The system and method will be understood, both as to its structure and operation, from the accompanying drawings, taken in conjunction with the accompanying description. Several implementations of the system may be presented herein. It should be understood that various components, parts, and features of the different implementations may be combined together and/or interchanged with one another, all of which are within the scope of the present application, even though not all variations and particular implementations are shown in the drawings. It should also be understood that the mixing and matching of features, elements, and/or functions between various implementations is expressly contemplated herein so that one of ordinary skill in the art would appreciate from this disclosure that the features, elements, and/or functions of one implementation may be incorporated into another implementation as appropriate, unless otherwise described. As used herein, "system" and "assembly" are used interchangeably. It should be noted that the articles "a", "an", and "the", as used in this specification, include plural referents unless the content clearly dictates otherwise. Dimensions provided herein provide for an exemplary implementation, however, alternate implementations having scaled and proportional dimensions of the presented exemplary implementation are also considered. Additional features and functions are illustrated and discussed below.

Referring now to the drawings wherein like reference characters identify corresponding or similar elements in form and function throughout the several views. FIGS. 1A-1D illustrate various view of an antenna assembly. FIGS. 2A-2E illustrates various views of the antenna assembly of FIG. 1A with the housing and radome removed. FIGS. 3A-3L illustrate various views of components of various multi-band radiator portions that can be included in the antenna assembly of FIG. 1A, in accordance with some aspects of this disclosure. FIGS. 4A-4H illustrate various views of components of another implementation of a multi-band radiator portion that can be included in an antenna assembly described herein. FIGS. 5A-5J, 6A-8, and 9A-9F illustrate various view of additional implementations of antenna assemblies. FIGS. 10A-18D illustrate various views of additional components that can be included in any of the antenna assemblies described herein.

The following detailed description of certain implementations presents various descriptions of specific implementations. However, the innovations described herein can be embodied in a multitude of different ways, for example, as defined and covered by the claims. In this description, reference is made to the drawings where like reference numerals can indicate identical or functionally similar elements. It will be understood that elements illustrated in the figures are not necessarily drawn to scale. Moreover, it will be understood that certain implementations can include more elements than illustrated in a drawing and/or a subset of the elements illustrated in a drawing. Further, some implementations can incorporate any suitable combination of features from two or more drawings.

Objects that are coupled together can be permanently connected together or releasably connected together. Objects that are permanently connected together can be formed out of one sheet of material or multiple sheets of material. The type of connection can provide different means for the realization of particular advantages and/or convenience consistent with the suitable function and performance of the device.

With reference to FIG. 1A, a perspective front side view of an antenna assembly 200 is illustrated in accordance with an implementation of the present disclosure. The antenna assembly 200 may include a cover 202, a radome 204, and multi-element antenna 201. The antenna assembly 200 can be configured to provide wireless internet connectivity for a plurality of uses (e.g., data, voice communication, video, and/or the like). For example, the antenna assembly 200 can be a self-contained WiFi hotspot. The antenna assembly 200 may be used in a wide range of applications. For example, the antenna assembly 200 may be used in vehicles. In another example, the antenna assembly 200 may be used to extend the range area for remote cameras for security. The antenna assembly 200 can be a multi-band LTE antenna. In some implementations, the antenna assembly 200 can be configured to run both personal communications networks ("PCN") and cellular networks at the same time. In some implementations, the antenna assembly 200 can increase the range of a tablet and/or be used to provide remote WiFi connections to other devices.

The antenna assembly 200 may be a High Power User Equipment ("HPUE") antenna. For example, the antenna assembly 200 may be capable of transmitting at higher power levels compared to standard user equipment. For example, the antenna assembly 200 may have an extended coverage area and improved uplink performance, especially in challenging environments such as rural areas or indoor locations where signal strength is generally weak. In some implementations, the cover 202 of the antenna assembly 200 may be a National Electrical Manufacturers Association ("NEMA") enclosure that is configured to safeguard the electrical components of the antenna assembly 200 from various environmental conditions (e.g., dust, water, corrosive substances, and/or the like). In some implementations, the antenna assembly 200 can be configured to isolate the band 14 FirstNet element for maximum throughput in an omni-directional pattern. In some implementations, the multi-band multi-element antenna 201 can include radiating elements (e.g., multi-band radiator portions 100, multi-band radiator portion 100', dual-band WiFi radiator portions 216, and/or any other antenna or radiating portions described herein) configured to radiate at specific frequency bands. For example, the radiating elements 200, 300 can be configured for one or more of: low-band operation (approximately 600 MHZ to 900 MHZ), mid-band operation (approximately 1.7 GHz to 2.7 GHZ), CBRS-band ("C-band") operation (approximately 3.4 GHz to 4.2 GHz), and/or 5 GHz Wi-Fi-band ("Wi-Fi-band") operation (approximately 4.8 GHz to 7.25 GHZ), depending on the desired performance of the antenna assembly. Throughout the disclosure, reference may be made to a "high-band", or certain radiating elements may be described as configured for "high-band operation". High-band operation may cover approximately 1.6 GHz to 6 GHz, in some implementations.

Figure 1B:
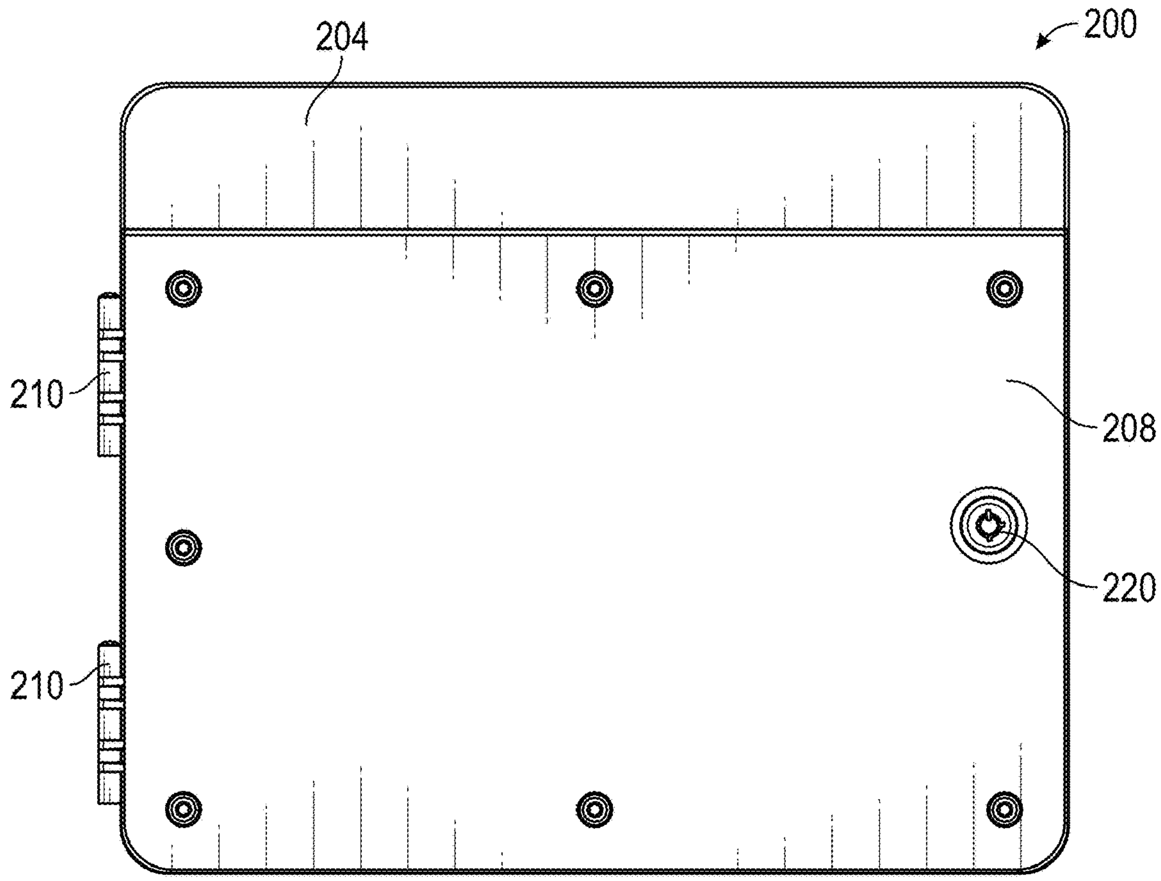
FIGS. 1B and 1C illustrate a front side view and a back side view respectively of the antenna assembly of FIG. 1A, in accordance with some aspects of this disclosure.
Figure 1C:
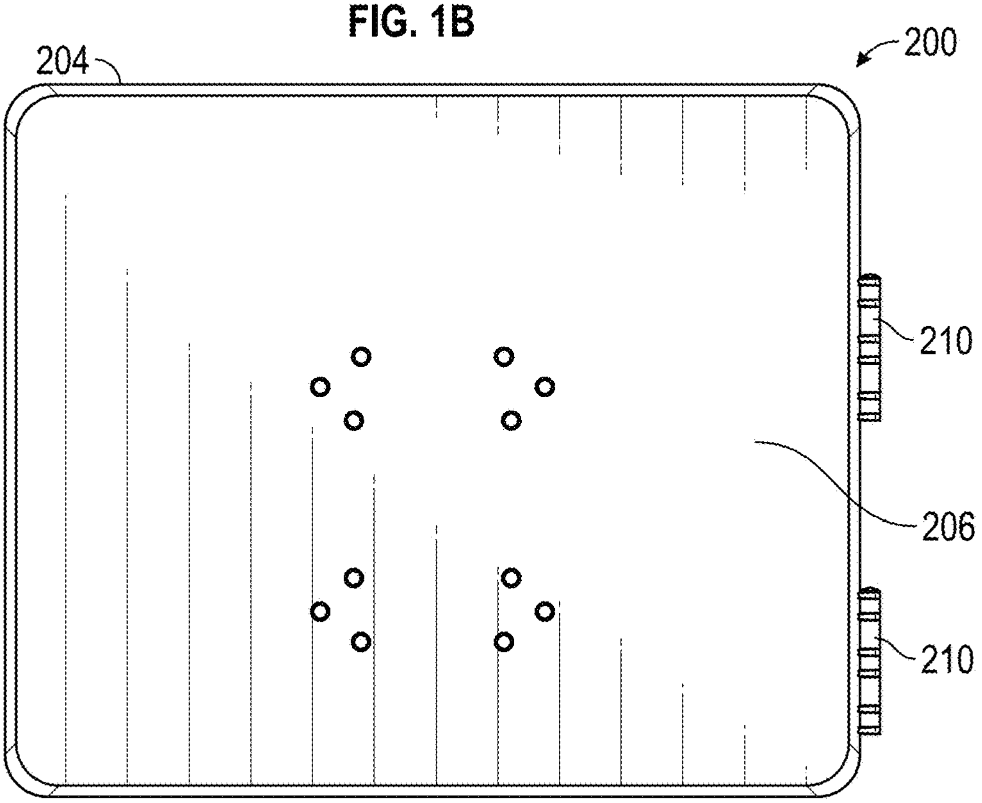
Figure 1D:
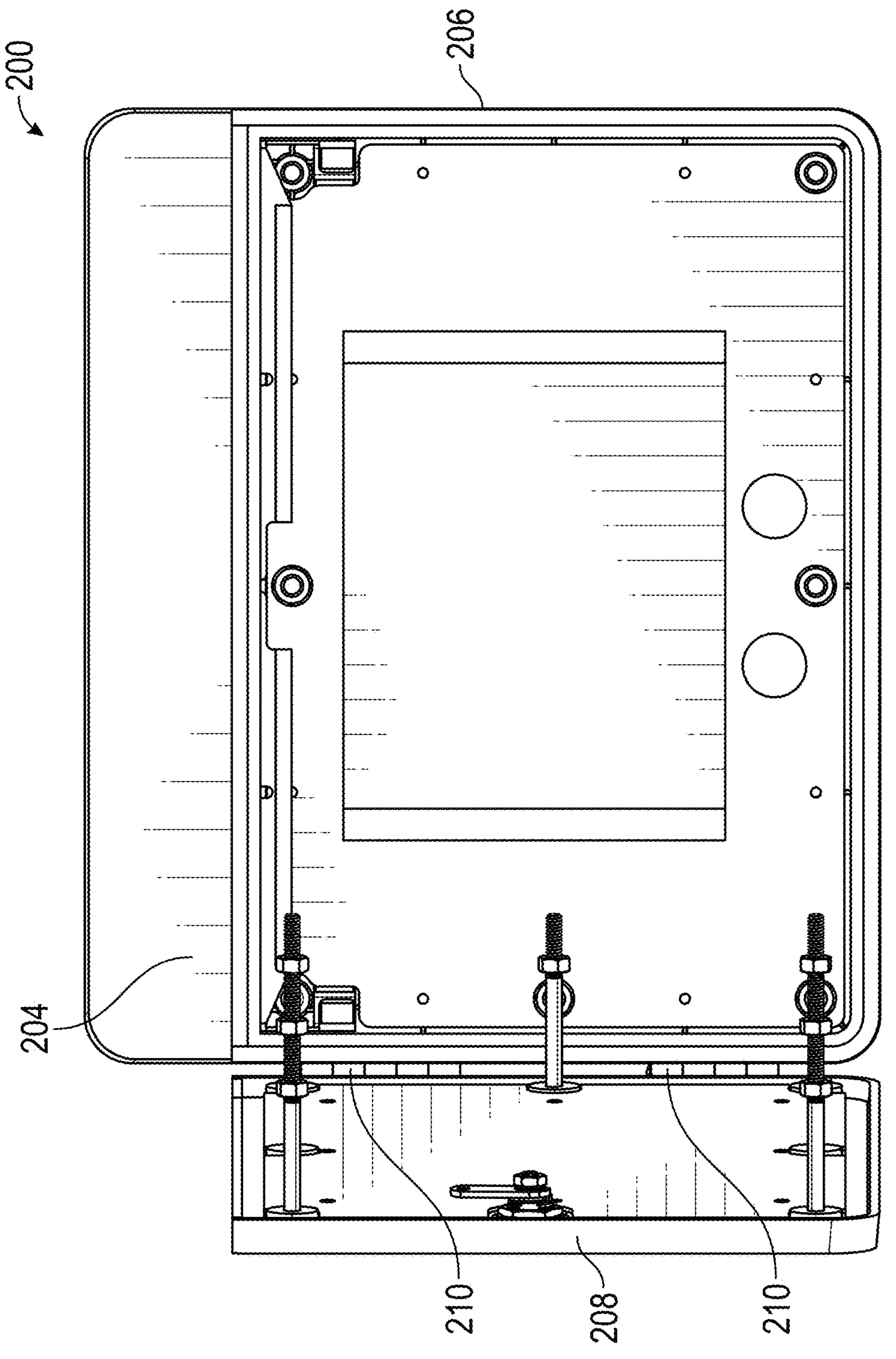
FIG. 1D illustrates a front side view of the antenna assembly of FIG. 1A with a door of a cover of the antenna assembly in an open configuration, in accordance with some aspects of this disclosure.

FIGS. 1B and 1C illustrate a front side view and back side view of the antenna assembly 200. The antenna assembly 200 can include the cover 202 (also referred to herein as a "case 202") and the radome 204. The cover 202 can form a first housing defining a first internal volume of the antenna assembly 200. The radome 204 can form a second housing defining a second internal volume of the antenna assembly 200. The radome 204 can be coupled to a top side of the cover 202. In some implementations, the radome 204 can form a portion of the cover 202. For example, the cover 202 may define the entire outer body of the antenna assembly 200. As shown in FIG. 1D, the cover 202 can include a main body 206 and a door 208. The door 208 can be pivotably connected to the main body 206. For example, the door 208 can be coupled to the main body 206 via one or more hinges 210. This arrangement allows the door 208 to move between an open configuration (e.g., shown in FIG. 1D), and a closed configuration (e.g., shown in FIG. 1B). In the open configuration, the first internal volume of the cover 202 is accessible. In some implementations, the door 208 can be locked to the main body 206 via lock 220. In some implementations, the cover 202 can be used to mount a fan/vented exhaust, which could be used for forced air convection. In some implementations, the antenna assembly 200 can include a display screen (e.g., a tablet/interactive touch screen display). In this implementation, the display screen (not shown), can be mounted to the door 208. Including a touch screen interface can improve data entry for the antenna assembly 200, in some cases. Including a touch screen interface can also simplify installation of the antenna assembly 200.

In some implementations, the antenna assembly 200 can have a rectangular prism shaped outer body comprised of the cover 202 and/or radome 204. The outer body can have a square shape when viewed from the front in some examples. The antenna assembly 200 can have rounded edges. In some implementations, the antenna assembly 200 can have a compact internal volume of under 1600 cubic inches. In some implementations, the antenna assembly 200 can have a compact internal volume of between 1400 and 2000 cubic inches (e.g., between 1500 and 1900 cubic inches, 1500 and 1800 cubic inches, 1500 and 1700 cubic inches, 1500 and 1600 cubic inches, values between the foregoing, etc.).

The cover 202 and radome 204 can protect and/or provide mechanical support for the internal components of the antenna assembly 200 (e.g., the antennas 100 or any other antennas utilized in the antenna assembly 200). For example, as discussed herein, the multi-band multi-element antenna 201 can be supported by cover 202 and enveloped by the radome 204. In some implementations, the radome 204 may be transparent to radiation from the antenna portions and may serve as an environmental shield for the internal components of antenna assembly 200. One or both of the cover 202 and radome 204 can be made of non-conductive materials. For example, the cover 202 and/or radome 204 may not be made of metal. In some examples, the cover 202 and/or radome 204 can be made of plastic, fiberglass, carbon fiber, and/or the like materials that allow RF signals to pass through. The radome 204 can be configured to be removably coupled to the cover 202. For example, a bottom edge of the radome 204 can be configured to interface with a top edge of the cover 202.

In some implementations, the cover 202 can include one or more attachment portions (not shown). The attachment portions can be used to mount the antenna assembly 200 to various locations. The type of the attachment portion(s) included in the antenna assembly 200 can vary based on the intended mounting manner and location. For example, one or more attachment portions could be mounted/coupled to the back side of the main body 206 to mount the antenna assembly 200 to the inside of a vehicle (e.g., on a dashboard).

FIGS. 2A-2E illustrates various views of the antenna assembly 200 with the cover 202 and the radome 204 removed. The antenna assembly 200 can include a first ground plane 212, one or more second ground planes 214, and the multi-band multi-element antenna 201. The multi-band multi-element antenna 201 may include one or more first antenna elements 216, one or more second antenna elements 100, and/or one or more GPS antenna elements 218. The antenna elements 100, 216 may also be referred to herein as "radiating antenna elements", "radiator antennas" and "radiating portions." As described further herein, various alternative antenna elements can also be incorporated into the multi-band multi-element antenna 201, in some implementations. For example, any of the multi-band radiator multi-band radiator portions 100, portion 100', multi-band radiator portion 100", dual-band WiFi radiator portions 216, GPS antenna elements 218, multi-band radiator portion 500, multi-band antenna 600, multi-band antenna 700, multi-band antenna 800, multi-band antenna 900, multi-band antenna 1000, stacked patch antenna 1100, and/or multi-band radiator portion 1200 can form part of the multi-band multi-element antenna 201. Additionally, in some implementations, any of the millimeter wave radios 250 described with reference to at least FIGS. 18A-18D can be incorporated into the antenna assembly 200.

With continued reference to FIGS. 2A-2E, the first ground plane 212 may serve as the ground reference for at least the multi-band multi-element antenna 201. The radiating portions or the multi-band multi-element antenna 201 may be coupled to a top side of the first ground plane 212. In the assembled antenna assembly 200, the first ground plane 212 can be covered by the radome 204, enclosing the second internal volume. In some implementations, the first ground plane 212 can be the primary ground plane. The first ground plane 212 can be coupled to the second ground plane 214, as shown in FIGS. 2A-2D. In some implementations, the second ground plane 214 can be orthogonal to at least a portion of the first ground plane 212. The second ground plane 214 can be a secondary ground plane for one or more radiating portions of the multi-band multi-element antenna 201. In some implementations, the second ground plane 214 can be a primary ground plane for one or more radiating portions of the multi-band multi-element antenna 201. The second ground plane 214 can be housed within the cover 202. In some implementations, the second ground plane 214 can serve as a heat sink. In some implementations, the second ground plane 214 can be a mounting surface. For example, various components of the antenna assembly 200, such as a battery, charger, modem, etc. (not shown) can be mounted to the second ground plane 214 and positioned within the first internal volume defined by the cover 202.

The arrangement of the first ground plane 212 and the second ground plane 214 can allow the groundplane for the multi-band radiator portions 100 to be extended in a manner that still allows access to the first internal volume of the cover 202. For example, the cover 202 can house the internal modem, battery, and other electronics of the antenna assembly 200. As such, these components can be serviced without interference or removal of the second ground plane 214. Additionally, the second ground plane 214 can be replaced within the antenna assembly 200 with another second ground plane 214 that can support other model numbers of modems, batteries, and other devices. Generally, conventional antennas used for the same purposes of the antenna assembly 200 need to be mounted to a 24"×24" flat groundplane so that the antenna elements will resonate and radiate in a desired manner. The size of the antenna assembly 200 is significantly reduced relative to conventional antennas, without compromising the performance of the antenna assembly 200. For example, as described with reference to FIGS. 7A-8, the antenna assemblies described herein (e.g., the antenna assembly 200, the antenna assembly 300, and the antenna assembly 400) can include a five-sided rectangular ground plane that is smaller in width and height that the 24"×24" flat groundplane with similar performance.

In the illustrated implementation, the multi-band multi-element antenna 201 includes a plurality of first antenna elements 216. The first antenna elements 216 can be configured operation at frequencies above approximately 1 GHz, in some implementations. For example, the first antenna elements 216 can be configured for as multi-band Wi-Fi radios, 3GPP radios, cellular radios, and/or the like. In some advantageous implementations, the second radiating elements 200 can be multi-band WiFi antenna devices. As such, the first antenna elements 216 can be configured for mid-band operation, CBRS-band operation, and Wi-Fi-band operation, depending on the specific radio or transceiver attached. In some cases, the first antenna elements 216 can have an operating range of approximately 1.6 GHz to 8 GHZ or higher. In some implementations, the first antenna elements 216 can include one or more PCB portions. The PCB portions may be made of flexible substrate materials (e.g., polyimide). As such, the PCB portions may be a flex circuit. In some cases, the PCB portions may be fiberglass reinforced with epoxy (e.g., FR4). The PCB portions may provide structure for the radiating portions of the first antenna elements 216. The various conductive portions of the first antenna elements 216 may be etched into the structure of the PCB portions. In some implementations, the first antenna elements 216 can be used for un-licensed band wireless telecommunication purposes. Accordingly, the first antenna elements 216 may be referred to herein as "dual-band WiFi radiator portions/antennas".

Depending on the particular use, the number of first antenna elements 216 can vary. In the illustrated example, the antenna assembly 200 includes five first antenna elements 216. However, more or fewer dual-band first antenna elements 216 are possible. In some cases, one or more of the first antenna elements 216 can be configured for Bluetooth communication. For example, one or more of the first antenna elements 216 can be a Bluetooth radiator portion 216. In some implementations, each dual first antenna elements 216 can be coupled to an individual coaxial cable (not shown).

The GPS antenna elements 218 can be used to collect one or more signal(s) from geosynchronous satellites so that the GPS function of a radio including the antenna assembly 200 can determine where the antenna assembly 200 is positioned relative to a global coordinate system. Depending on the particular use, the number of GPS antenna elements 218 can vary. In the illustrated example, the antenna assembly 200 includes one GPS antenna element 218. However, more or fewer GPS antenna elements 218 are possible. The GPS antenna element(s) 218 may be positioned on the first ground plane 212 and within the radome 204. In this arrangement, the GPS antenna element(s) 218 is/are supported by the first ground plane 212 in the assembled antenna assembly 200.

In some implementations, the second antenna elements 100 can be used for wireless telecommunication purposes. Accordingly, the second antenna elements 100 may be referred to herein as "multi-band radiator portions" or "cellular radiator portions". Depending on the particular use, the number of multi-band radiator portions 100 can vary. In the illustrated example, the antenna assembly 200 includes four multi-band radiator portions 100 (e.g., multi-band radiator portion 100A, multi-band radiator portion 100B, multi-band radiator portion 100C, multi-band radiator portion 100D). However, more or fewer multi-band radiator portions 100 are possible. The multi-band radiator portions 100 are described further herein with reference to at least FIGS. 3A-3K. Another example of a multi-band radiator portion 100' that can be used in addition to or alternatively to the multi-band radiator portions 100 in the multi-band multi-element antenna 201 is described further herein with reference to at least FIGS. 4A-4H. It is recognized that any discussion of the features or arrangements of the multi-band radiator portions 100 in the multi-band multi-element antenna 201 can apply to the multi-band radiator portions 100'. Similarly, such discussion can also apply to any alternative antennas or radiator portion included in an implementation of the multi-band multi-element antenna 201.

The cabling (not shown) to connect the router of the antenna assembly 200 to the multi-band multi-element antenna 201 can extend through the first ground plane 212 and into the first internal volume of the cover 202. The antenna assembly 200 can include data ports (not shown) for external devices. The antenna assembly 200 can include a connection (not shown) to an external power source.

The orientation and the arrangement of the multi-band radiator portions 100 and the dual-band WiFi radiator portions 216 on the first ground plane 212 relative to each other can be selected to optimize the performance of the antenna assembly 200 for the particular use case. In the illustrated example, a pair of dual-band WiFi radiator portions 216 (and one pair of a single dual-band WiFi radiator portion 216 and the GPS antenna element 218) are positioned between individual multi-band radiator portions 100. The relationship between the multi-band radiator portions 100 can be important for the performance of the antenna assembly 200. In the illustrated example, the multi-band radiator portion 100A is positioned in a first orientation and extends in a first direction. The multi-band radiator portion 100B can be positioned in a second orientation and extend in a second direction, 90-degrees offset from the multi-band radiator portion 100A. The multi-band radiator portion 100C can be positioned in a third orientation and extend in third direction, 90-degrees offset from the multi-band radiator portion 100A, and 180 degrees offset from the multi-band radiator portion 100B. The multi-band radiator portion 100D can be positioned in a fourth orientation and extend in a fourth direction, 90 degrees offset from the multi-band radiator portion 100C, and 180 degrees offset from the multi-band radiator portion 100A. In this arrangement, one multi-band radiator portion 100 extends in each direction, 90 degrees offset from at least two other multi-band radiator portions 100. Further, the multi-band radiator portion 100A can face the multi-band radiator portion 100D. Each multi-band radiator portion 100 can face in one of four rotational-directions, 90-degrees offset from each other. As such, with each multi-band radiator portion 100 being able to be in one or four different rotational directions, the multi-band radiator portions 100 can be arranged in 256 different configurations.

The arrangement of the multi-band radiator portions 100 can be selected to have complementary overlapping azimuth patterns. Additionally, the arrangement can be selected to reduce the multi-band radiator portion 100 to multi-band radiator portion 100 isolation, without the use of divider walls or RF absorbing material. Additionally, the illustrated configuration allows for conducting surfaces such vertical walls from metal buildings and other such vertically conducting surfaces in close proximity to the antenna assembly 200 to have the least amount of system impact on the antenna assembly 200.

FIGS. 3A-3K illustrate various views of components of the multi-band radiator portions 100, in accordance with some aspects of this disclosure. Each multi-band radiator portion 100 can include a multi-band radiating element 101 and a ground connection 103. The ground connection 103 is configured to couple to multi-band radiating element 101 to the ground plane 212. FIGS. 3A and 3C-3F illustrate assorted view of the multi-band radiating element 101. FIGS. 3B and 3G-3K illustrate the ground connection 103. It is recognized that the multi-band radiator portions 100 described herein are just one example of multi-band radiator portions that can be included in the antenna assembly 200. In other implementations, different multi-band radiator portions can be included. The antenna assembly 200 can include multi-band radiator portions that are similar or identical to any of the antennas described and/or illustrated in U.S. Pat. No. 11,283,149, filed Sep. 30, 2019, titled "ANTENNA SYSTEM" and in U.S. patent application Ser. No. 17/712,000, filed Apr. 1, 2022, titled "ANTENNA SYSTEM," the entire contents of both of which are hereby incorporated by reference in their entirety.

Figure 3A:
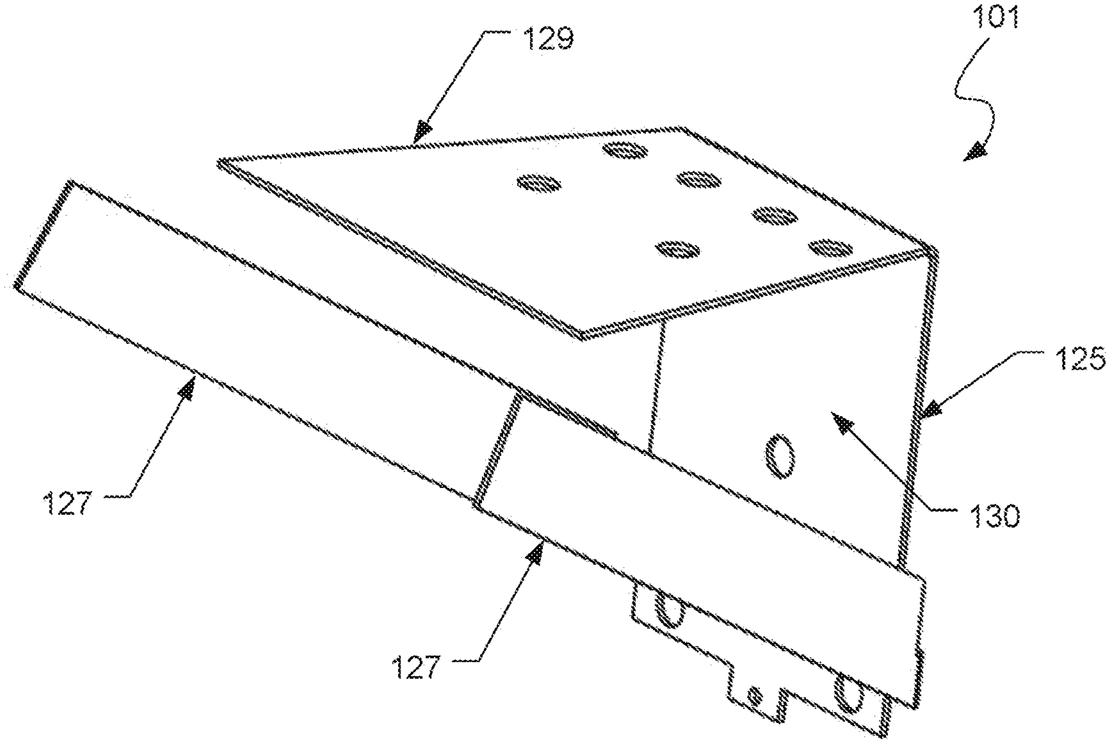
FIGS. 3A-3K illustrate various views of components of a multi-band radiator portion that can be included in any antenna assembly described herein, in accordance with some aspects of this disclosure.

As shown in FIG. 3A, a radiating element 101 can be one element or component of the multi-band radiator portion 100. An upright low band radiation portion 125 (also referred to herein as the "body portion 125") can be a body portion of the radiating element 101. The upright low band radiation portion 125 can be coupled to a feeding portion at a feed point 119 (see e.g., FIG. 3C) to electrically excite the radiating element 101. As shown in FIG. 3A, a second low band radiation portion 129 (also referred to herein as the "head portion 129") can be positioned at an angle relative to the body portion (e.g., the upright low band radiation portion 125) and extend such that the second low band radiation portion 129 is not coplanar with the upright low band radiation portion 125. In some other implementations, the second low band radiation portion 129 can be configured without a bend such that it is coplanar with the upright low band radiation portion 125. In some implementations, advantages of a bend can include having two distinct low band radiating portions, reducing the total height of the system to be more compact and conserve space, and configuring the system to be able to easily cover and provide protection for the system in a compact configuration with multi-band coverage (e.g., in the antenna assembly 200). In some other implementations the second low band radiation portion 129 can be coupled to a third low band radiation portion, a fourth low band radiation portion, and/or other radiation portions. In some implementations, material forming the second low band radiation portion 129 can extend in a direction further away from the upright low band radiation portion 125 and comprise a slit between the material such that portion of material on each side of the slit may form a third low band radiation portion and a fourth low band radiation portion respectively, that may be coplanar with and extend beyond the second low band radiation portion 129. In some implementations the third and fourth low band radiation portions can be the same length and width. In some implementations, the length and/or width of the third low band radiation portion may be different from the length and/or width of the fourth low band radiation portion. In some implementations, one or more of the third low band radiation portion and the fourth low band radiation portion may be angled or bent or attached such that it is not coplanar with the second low band radiation portion 129. Adding variations in radiation portions can provide advantageous coverage in different areas of bandwidth in some implementations.

In some cases, the radiating element 101 is a modified printed inverted-F antenna (PIFA) modified to have three bent arm members that make the radiating element 101 a three-dimensional antenna as opposed to a two-dimensional antenna generally practiced in the art for printed inverted F antenna. Furthermore, the radiating element 101 can be a dual-band monopole antenna, a multi-band 3D inverted F antenna, or a version of a 2D inverted F antenna similar to a PIFA. that has a configuration that, when used in conjunction with high order electromagnetic modes generated or received by a transceiver and/or receiver (as is typically performed for PIFA antenna), permit the radiating element 101 to have an operating frequency range of 600 MHz to 7.25 GHz.

The low band portions (e.g., upright low band radiation portion 125, the second low band radiation portion 129, and/or any additional low band radiation portions) can be configured for radiation in the low band, including low band odd multiples. The high band radiation portion can comprise one or more arms 127 configured for high band radiation. In the illustrated example, the radiating element 101 includes two arms 127. The two arms 127 can be coupled to a lower portion of the upright low band radiation portion 125. In some implementations, the arms 127 can be coupled to an upper portion of the upright low band radiation portion 125. In some other implementations, one or more additional arms can be coupled to an upper portion of a low band radiation portion (e.g., upright low band radiation portion 125, the second low band radiation portion 129, etc.). In some implementations the arms 127 can have the same length. In some implementations arms 127 can have different lengths. In some implementations, one or more of the arms 127 can be positioned at an angle relative to the upright low band radiation portion 125 and/or relative to the ground plane 212. The arms 127 can be positioned at the same angle or at different angles. The arms 127 can be configured for radiation in the high band, including high even order resonances. In some implementations, additional arm portions can be added or formed at selected locations to add coverage for additional high frequency bandwidth areas. For example, in some implementations portions of the arms may be slit, extended, angled, bent, modified, and/or otherwise connected to provide improved coverage areas.

Figure 3B:
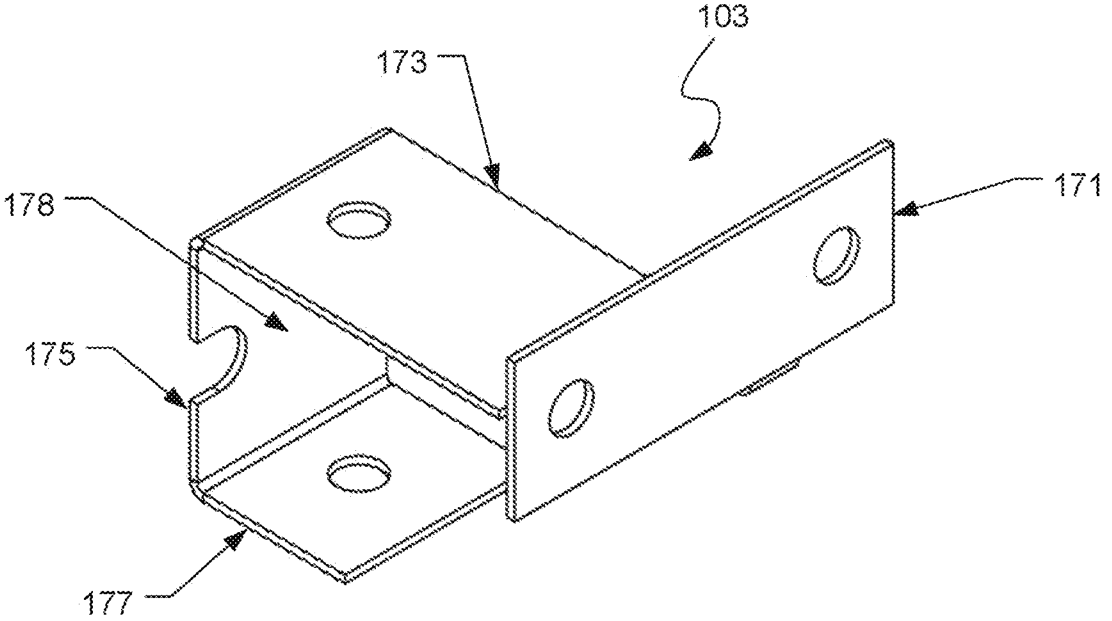
Figure 3C:
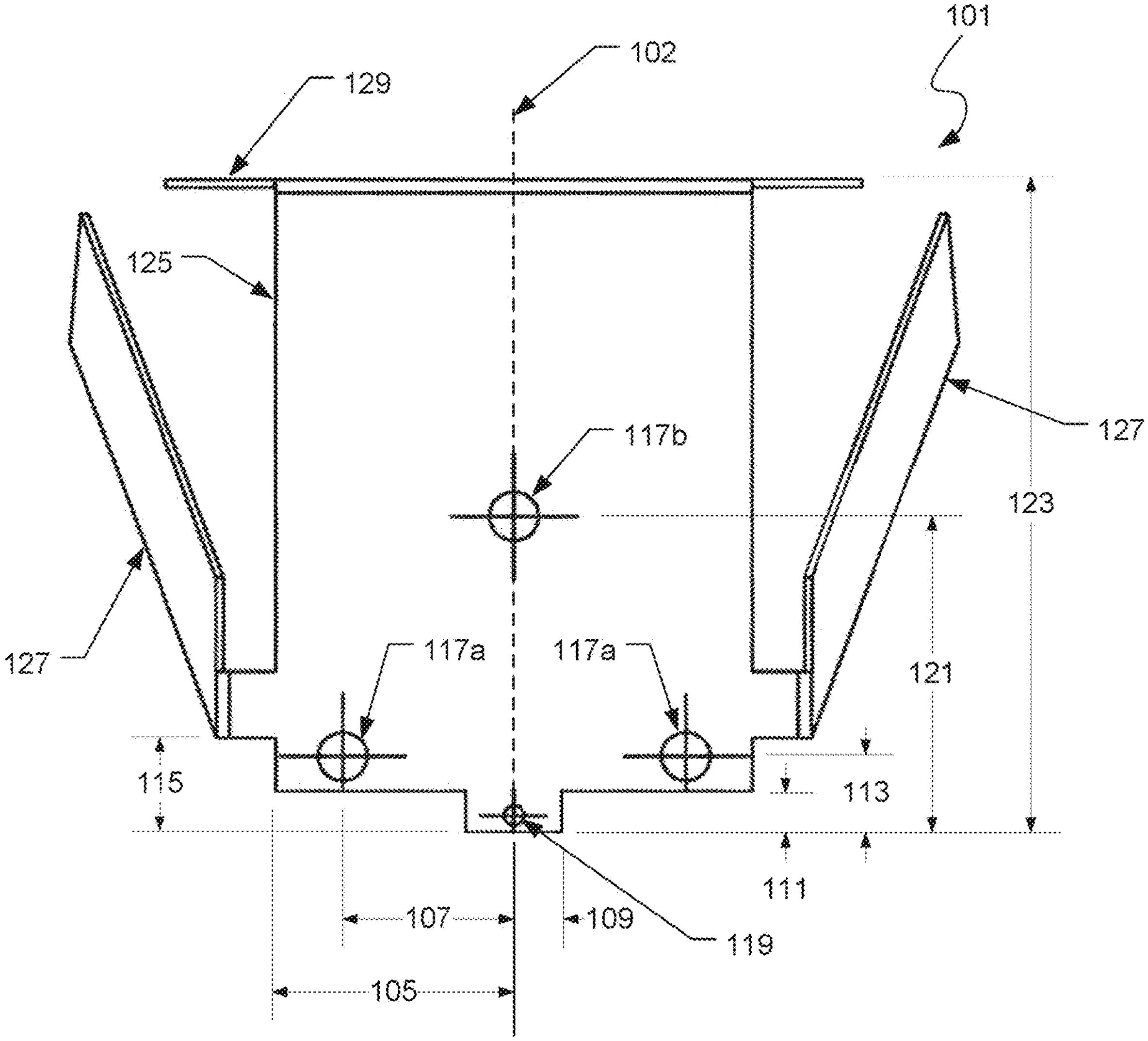

As shown in FIG. 3B, a ground connection 103 (also referred to herein as the "tuner 103" or the "grounding portion 103") can be adapted and configured to couple the radiating element 101 with the first ground plane 212. The tuner 103 can include a face plate 171 that is configured to be coupled to the first ground plane 212. The tuner 103 can include an arm portion 173, which can be an arm portion coupled to the face plate 171. The width of arm portion 173 can be adjusted to accommodate clearance for transmission lines (not shown) of the antenna assembly 200, which can be used to excite the radiating element 101. Low band operation of the multi-band radiator portions 100 is enhanced and can be adjusted by the length and width of body portion 125 and head portion 129 as well as the location, placement, and configuration of an opening 117*b* (see e.g., FIG. 3C) in body portion 125. The tuner 103 can include a base portion 177. The base portion 177 can be adapted and configured to be positioned against the body portion 125 of the radiating element 101 such that the opening in the base 177 and the opening 117*b* can be a point of coupling creating a ground connection for the multi-band radiator portion 100. The raised ground connection being elevated relative to the feed location provides advantages to achieve the multiband coverage. Dimensions can be selected to provide harmonic resonance at higher odd orders in some implementations. The grounding portion provides advantages for achieving multiple advantageous resonances. For example, in some implementations, the height, width, and clearance provided for by the size of arm portion 173 can be advantageously selected. Additionally, the length and width of body portion 175 can also be advantageously selected. The location of opening 117*b* and the corresponding connecting location of the coupling point 181*b*, shown in FIG. 3J, when coupled together for the grounding connection create a symbiotic connection to provide a resonance of desired impedance to match a desired frequency and bandwidth for a low band frequency configuration in some implementations. FIG. 3C shows twin coupling points 117*a* of the radiating element 101. The twin coupling points 117*a* can be used to attach the multi-band radiator portion 100 to a nonconductive structural stand coupled to the first ground plane 212. More isolation can be created from the first ground plane 212 by expanding the space 111 as well as decreasing the width 109. The feed point location 119 is configured to receive an electrical connection to excite the radiating element 101.

In some other implementations, features and aspects of the multi-band radiator portions 100 can be further described as follows. FIG. 3C illustrates the radiating element 101 that can be coupled to the first ground plane 212 of the antenna assembly 200 shown in FIG. 2E, and electrically excited at the feed point 119. The feed point 119 can be coupled to the upright low band radiation portion 125 with what can be a narrow width tab 109. Additional isolation between the upright low band radiation portion 125 and the first ground plane 212 can be obtained by adjusting 111 and consequently the coupling location reference 113. For additional mechanical support, the upright low band radiation portion 125, can have a non-conductive coupling mechanism (not shown) to the first ground plane 212. The upright low band radiation portion 125 can have a coupling point 117*b* for attaching the grounding portion 103 with the coupling point 181*b* (see e.g., FIG. 3J). As noted above, also coupled to the upright low band radiation portion 125 can be two arms 127. The arms 127 can assist with the dominate radiation in the high band for the multi-band radiator portion 100. One or more portions similar to the arms 127 may be used for assisting in the high band portion of the radiation are realizable in the implementation of this approach. Higher even order resonances may radiate from portions similar to the arms 127 of the radiating element 101 to assist in the multi-band properties of the device. Furthermore, there can be the additional head portion 129 coupled to the upright low band radiation portion 125 that may be perpendicular in nature for its orientation. Though it is not necessary for it to be bent near 90-degrees as depicted in this illustration and can be shown to be perceptibly straight in other implementations, by bending the low band radiation portion of the radiating element 101 to realize two distinct portions (e.g., the upright low band radiation portion 125 and the second low band radiation portion 129), the total height of the radiating element 101 is reduced and as such the total volume of the antenna assembly 200 to most likely provide environmental protection is consequently reduced. The low band operation of the radiating element 101 is determined by several factors. Some of the factors are the length and width of upright low band radiation portion 125 and of second low band radiation portion 129, the location of opening 117*b*, and/or the grounding portion 103.

FIG. 3B illustrates the grounding portion of the device 103. The face plate 171 can be coupled to the arm 173. The width of the arm 173 can be adjusted to accommodate clearance for assembly purposes for a transmission line of the antenna assembly 200 that may be used for excitation of the multi-band radiator portion 100. The body 175 can be coupled to arm 173. The base 177 can be coupled to the body 175. The base 177 can also have a coupling point 178 that is configured to couple to the opening 117*b* of the radiating element 101 in the assembled multi-band radiator portion 100. The height of the arm 173, the width of the arm 173, the clearance provided for in the arm 173, the length of body 175, and the symbiotic location of opening 117*b* and coupling point 181*b* all provide for a reactance that counterbalances the reactance of the low band impedance to provide a resonance of desired impedance match for the desired frequency and bandwidth for the low band radiation. The location of the coupling point 181*b* and the length and width of the grounding portion 103 are also chosen to provide higher odd order resonant harmonics at the desired locations to cover a portion of the frequency band of the multi-band performance of the antenna assembly 200.

FIG. 3C illustrates a back side view of the radiating element 101. Twin coupling points 117*a* in the radiating element 101 may be coupled to a non-conductive object (not shown), which can be coupled to the first ground plane 212 of the antenna assembly 200 shown in FIG. 6A. This coupling may provide mechanical stability for the multi-band radiator portions 100 while not disturbing or inhibiting the ground connection provided by tuner 103.

Figure 3D:
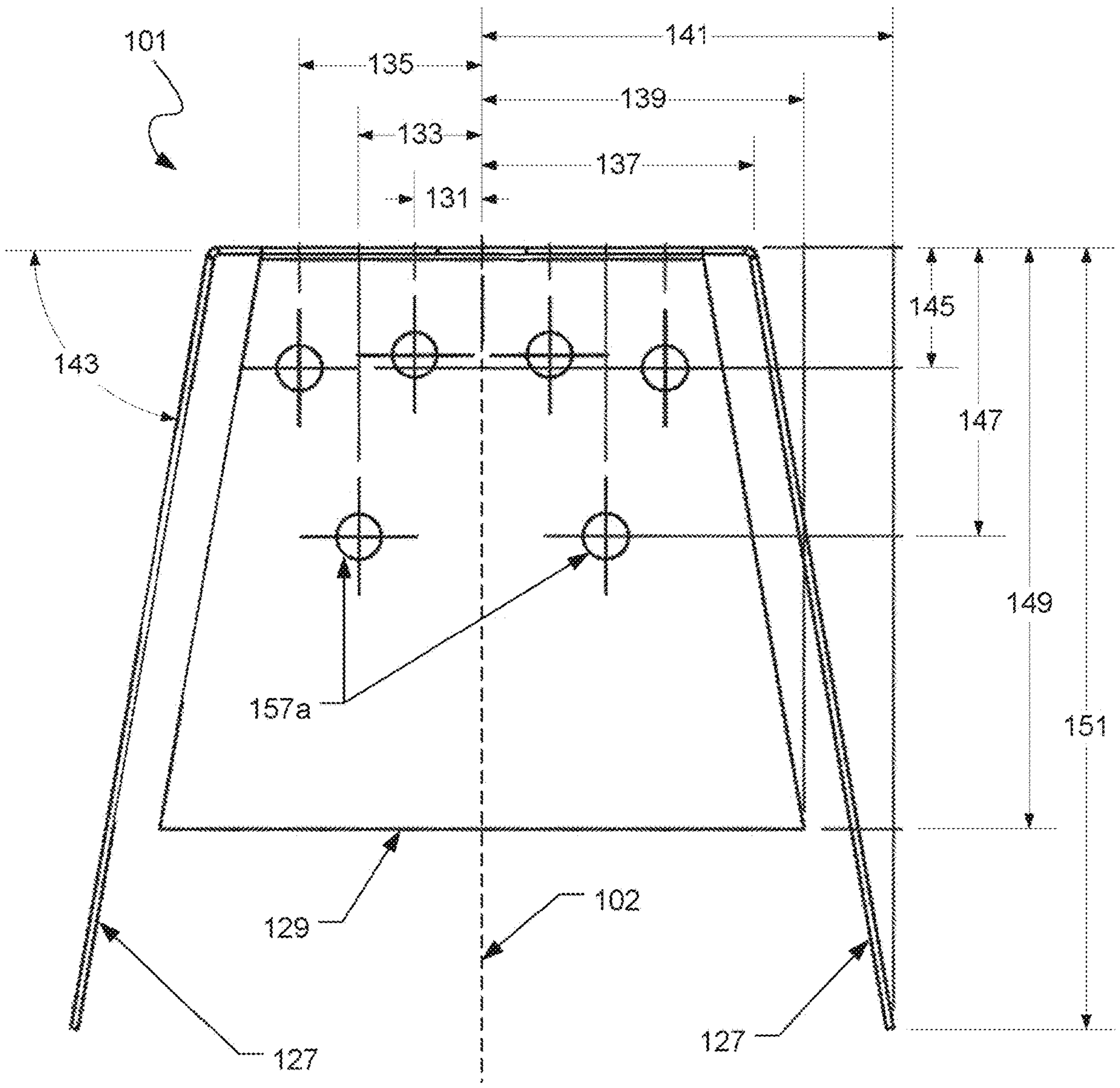
Figure 3E:
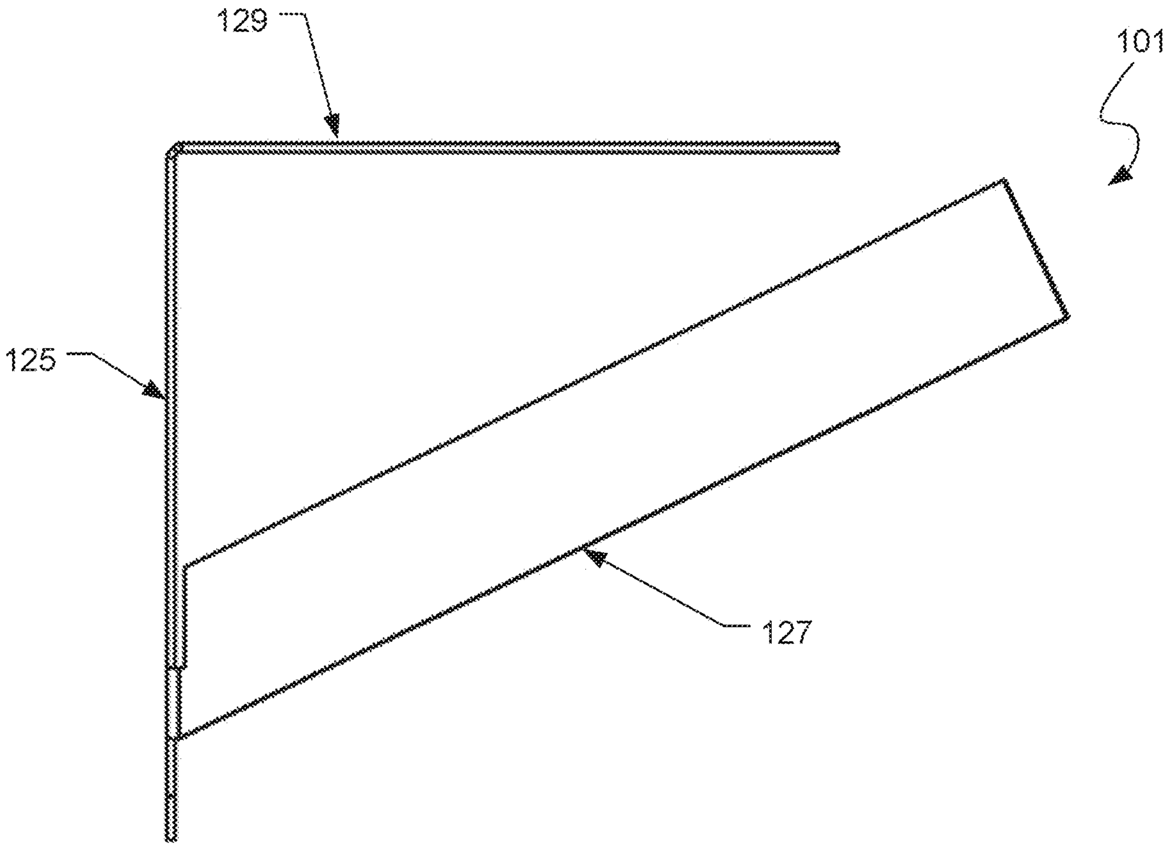
Figure 3F:
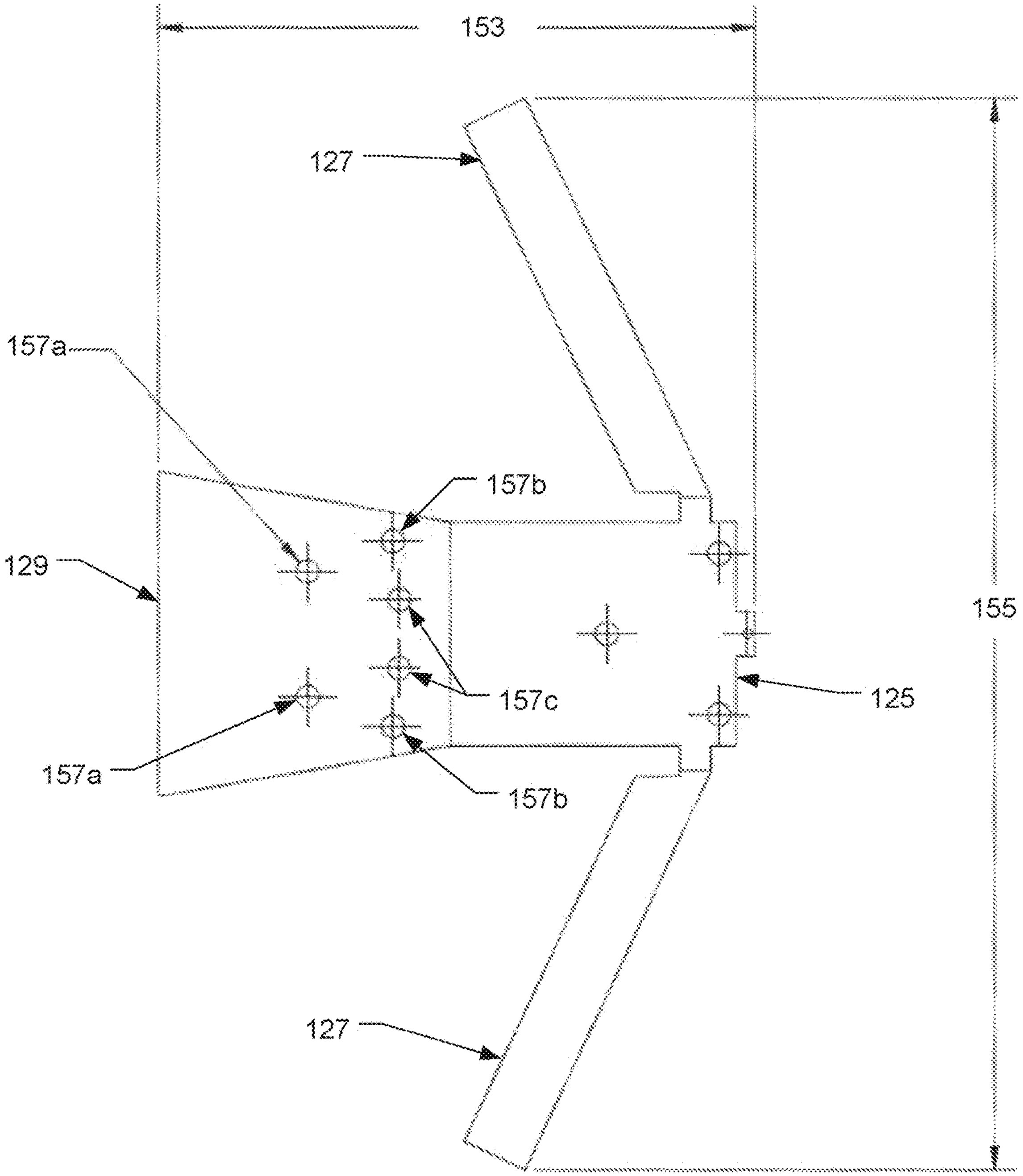
Figure 3G:
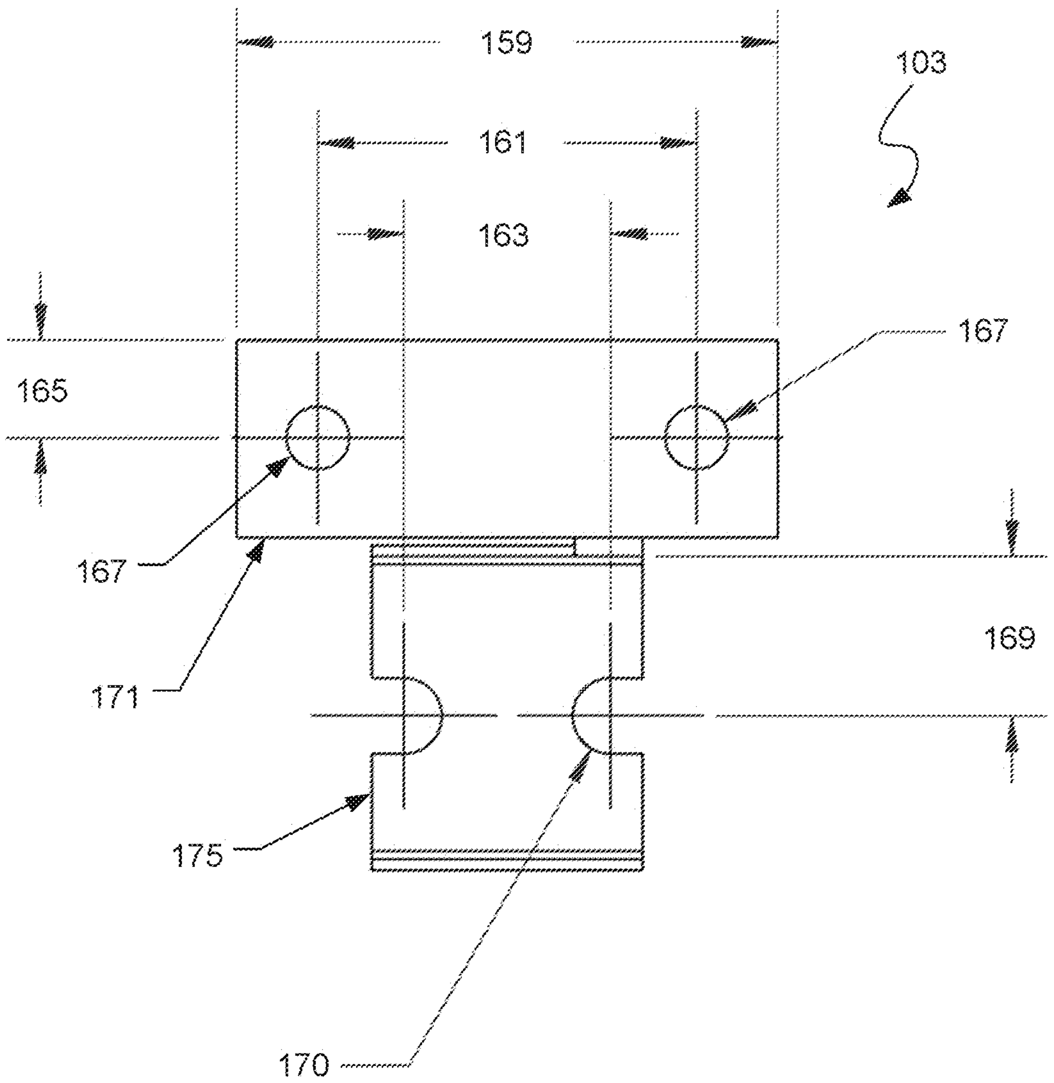
Figure 3H:
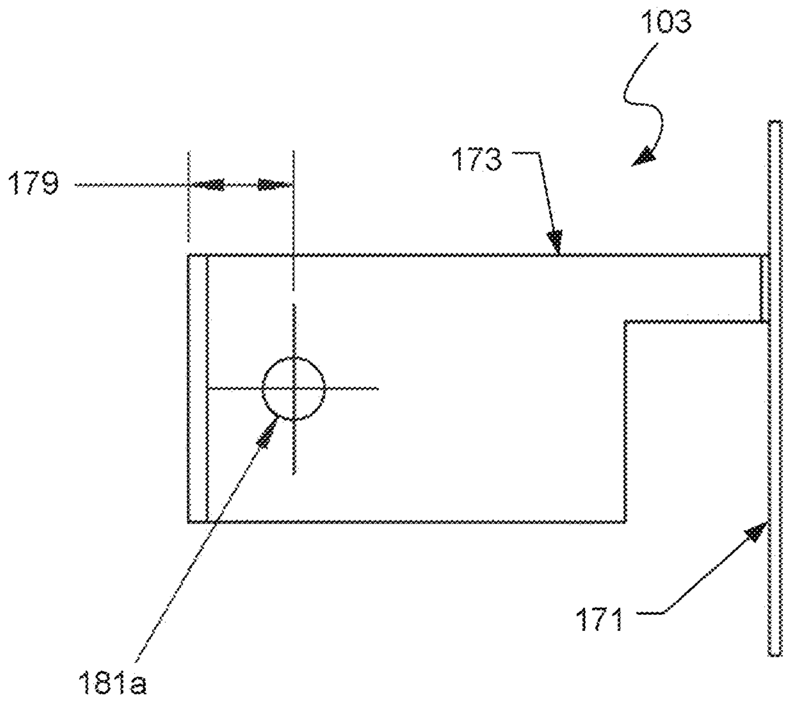
Figure 3I:
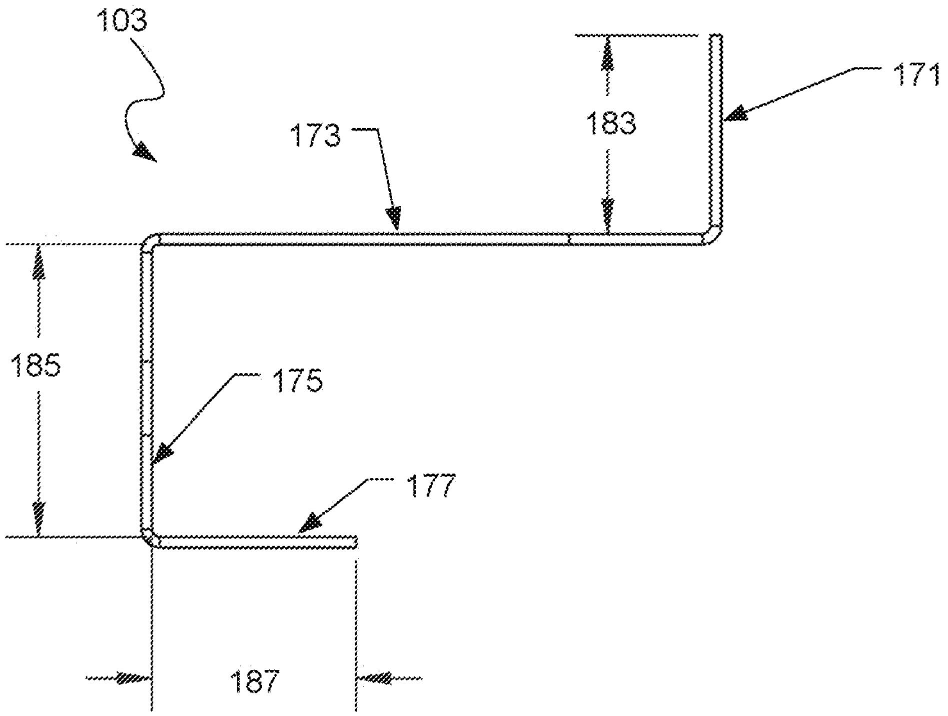
Figure 3J:
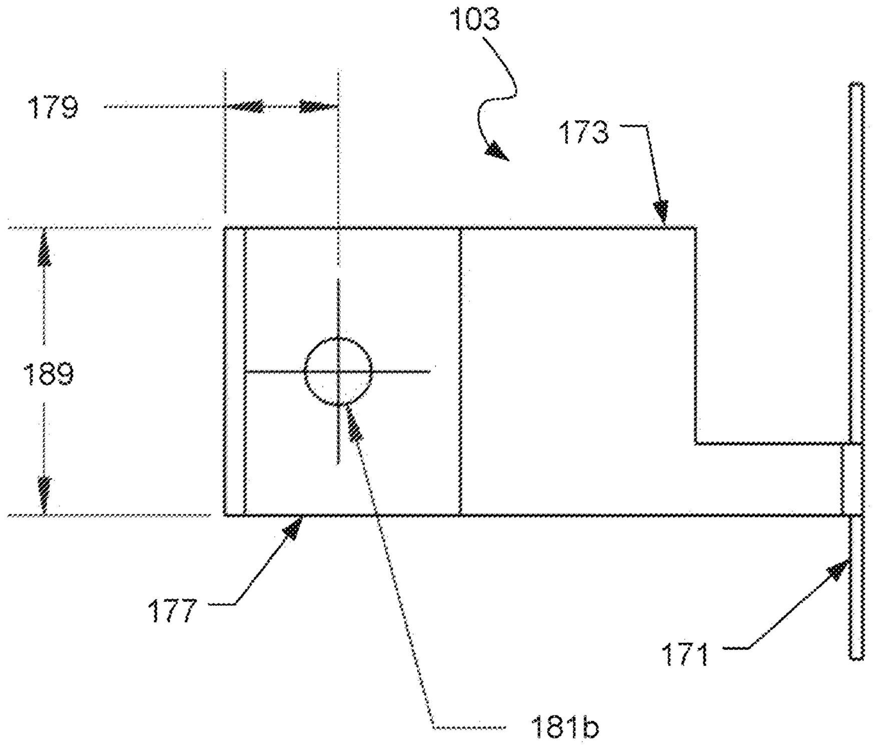
Figure 3K:
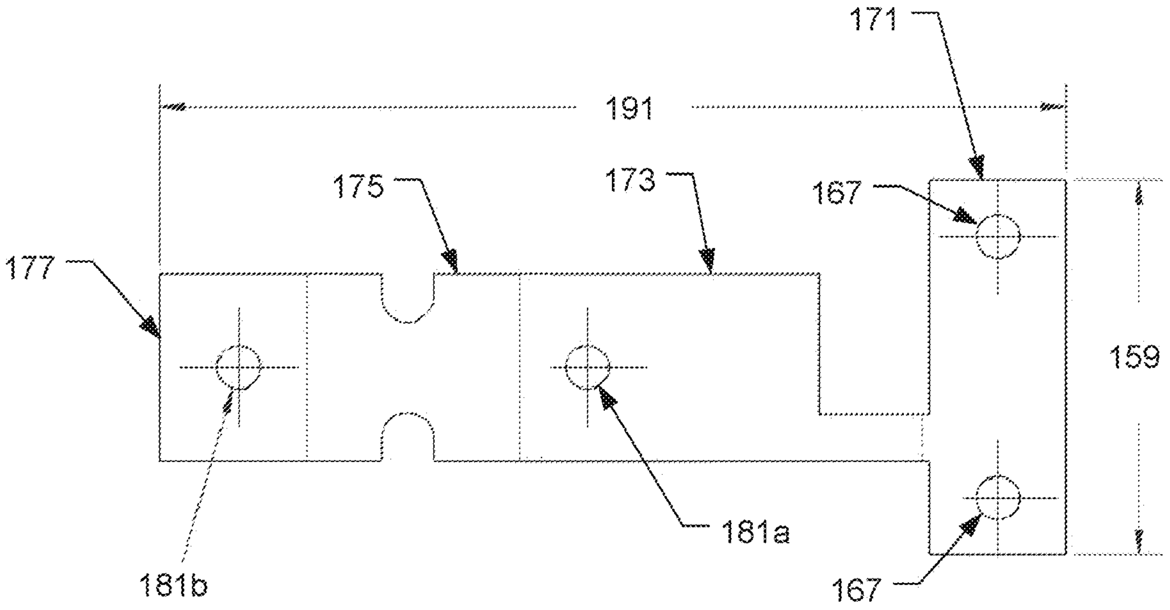

FIGS. 3D-3F provide additional views of the radiating element 101. As shown in FIGS. 3D and 3F, the second low band radiation portion 129 can include one or more clearances. For example, the second low band radiation portion 129 can include one or more first clearances 157*a*, one or more second clearances 157*b*, and/or one or more third clearances 157*c*. The clearances 157*a*, 157*b*, 157*c* may allow for ease of assembly of the completed multi-band radiator portions 100. FIG. 3G-3K provide additional views of the ground connection 103 of the multi-band radiator portions 100.

Figure 2A:
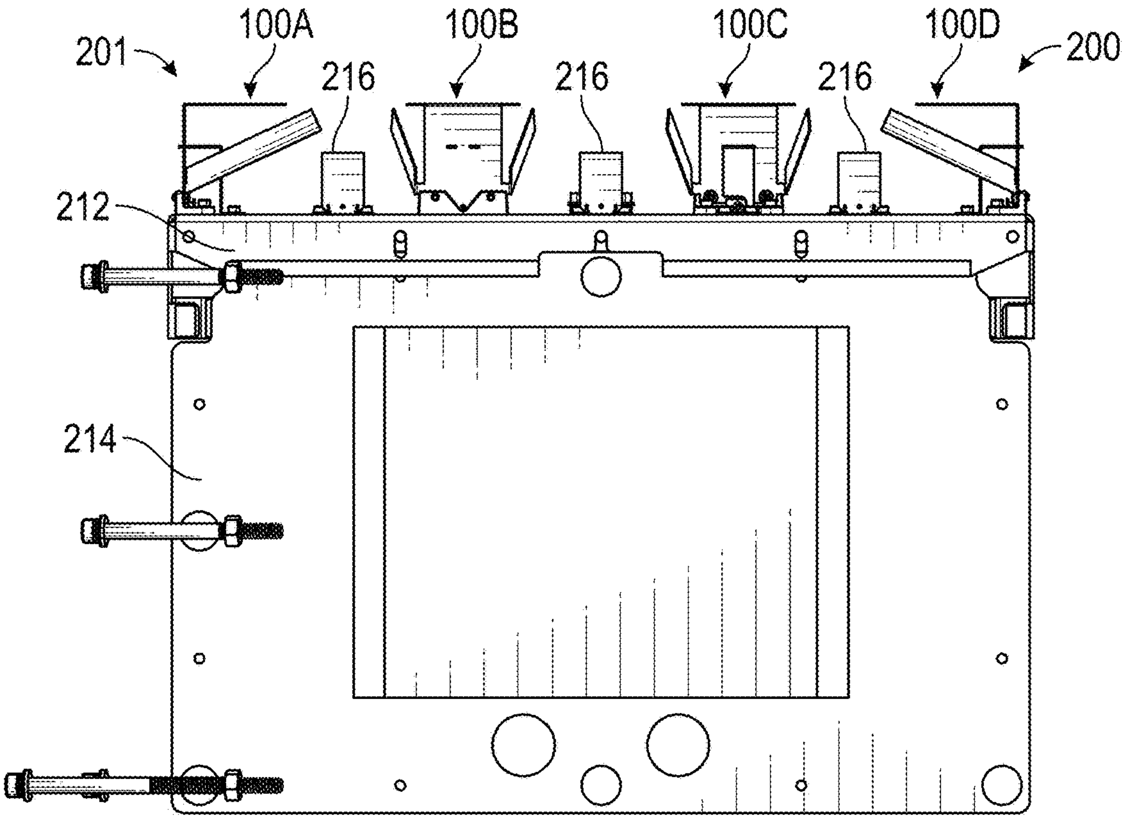
FIGS. 2A-2E illustrate a front side view, a back side view, a right-side view, a left side view, and a top side view of the antenna assembly of FIG. 1A with the cover and a radome of the antenna assembly removed, in accordance with some aspects of this disclosure.
Figure 2B:
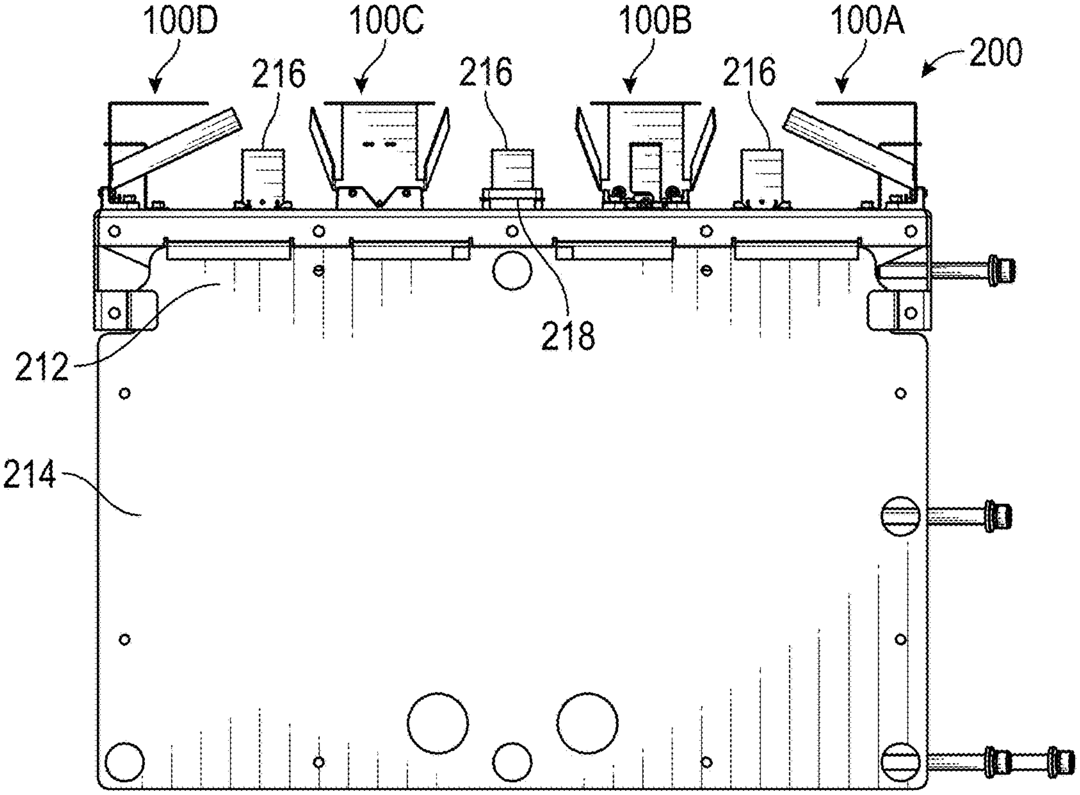
Figure 2D:
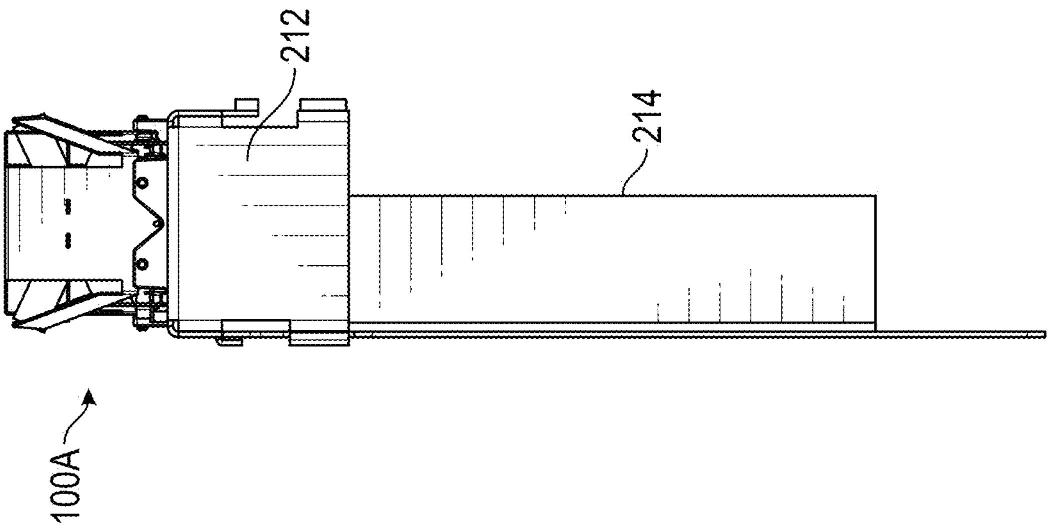
Figure 2C:
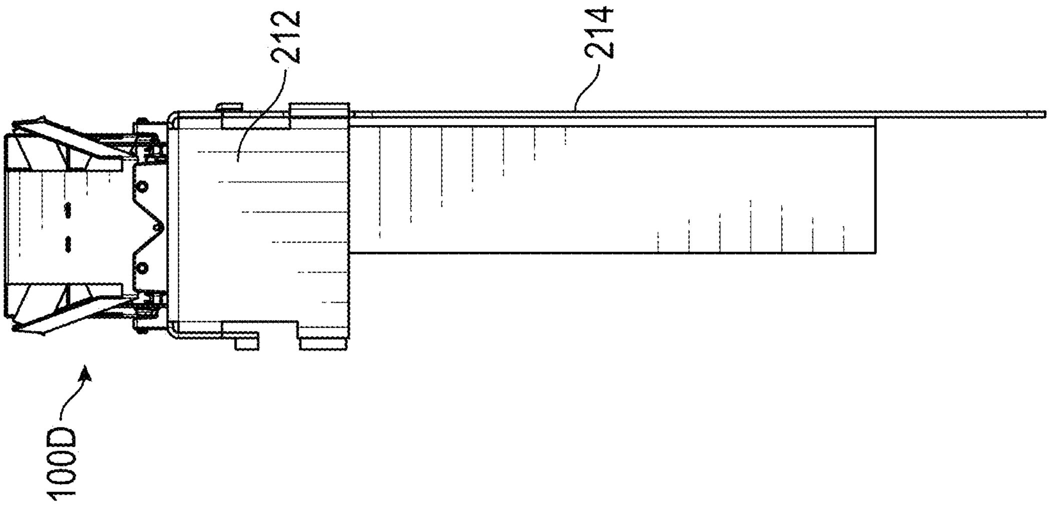
Figure 2E:
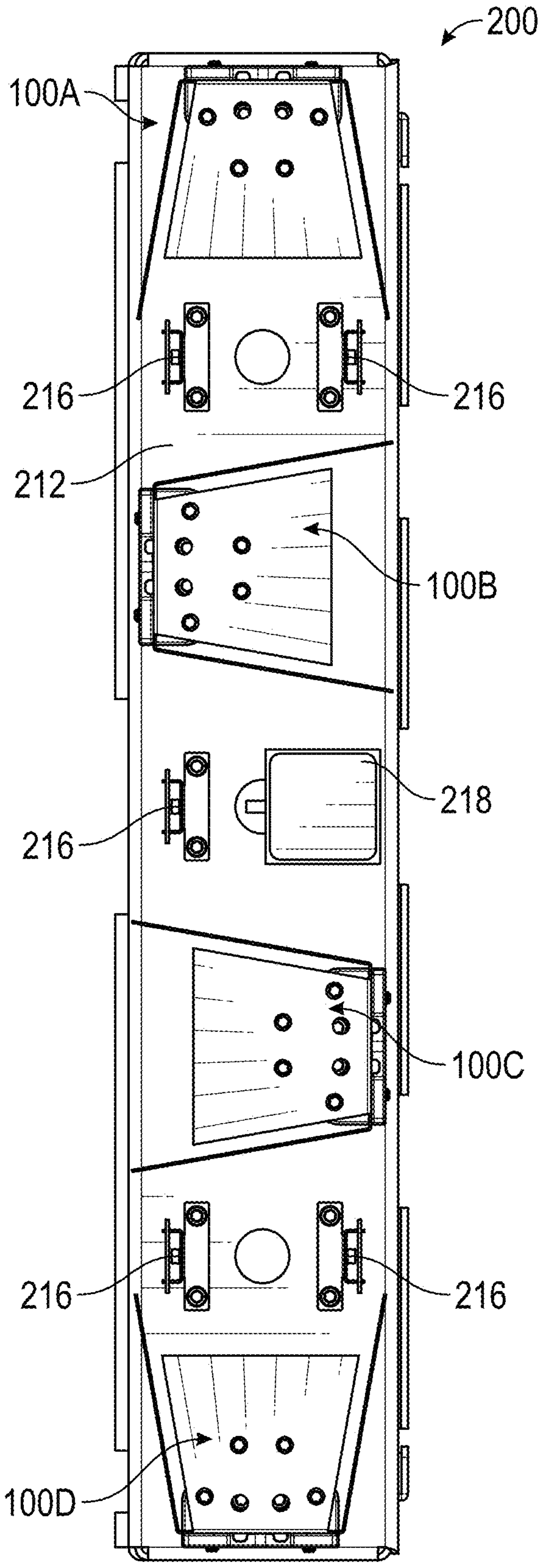
Figure 3L:
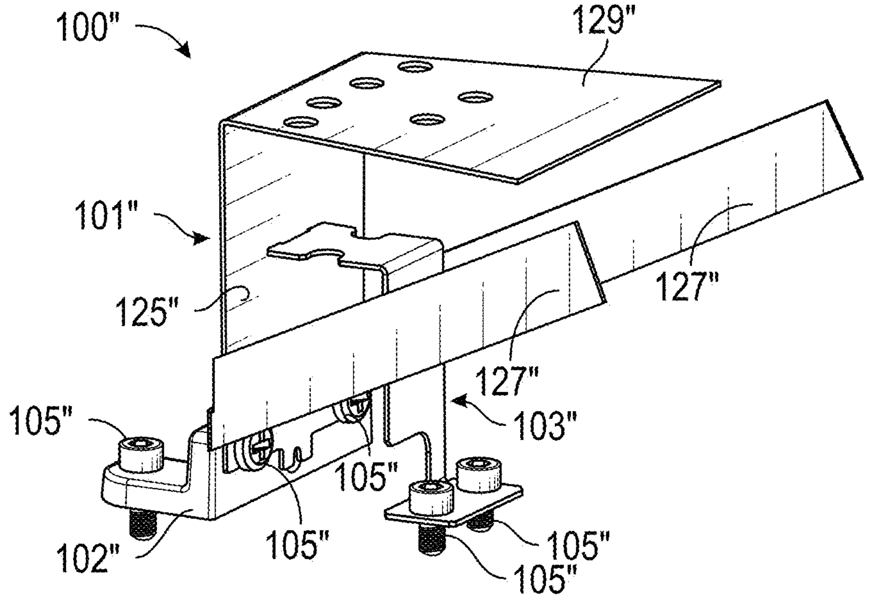
FIGS. 3L-3N illustrate various views of components of another implementation of a multi-band radiator portion that can be included in any antenna assembly described herein, in accordance with some aspects of this disclosure.
Figure 3M:
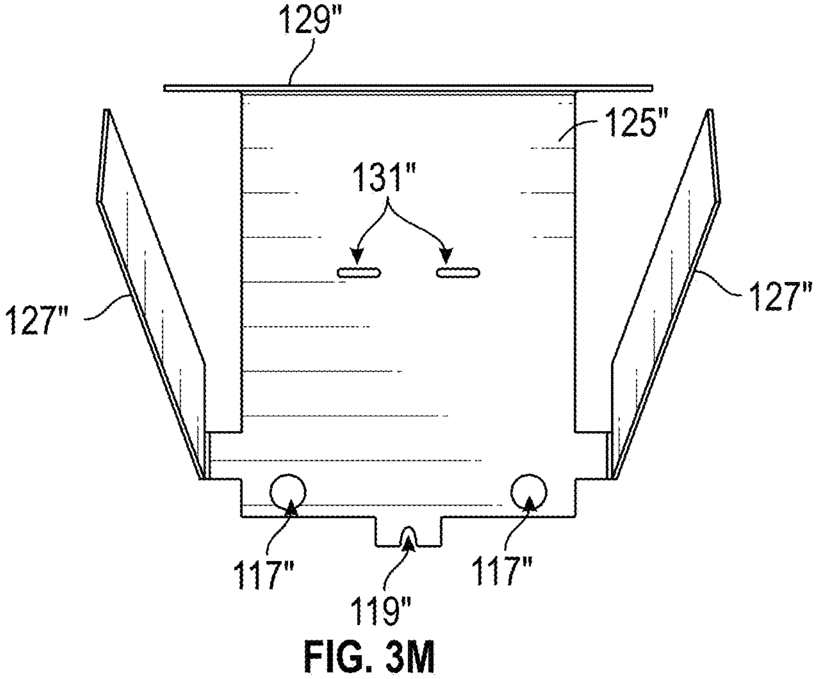
Figure 3N:
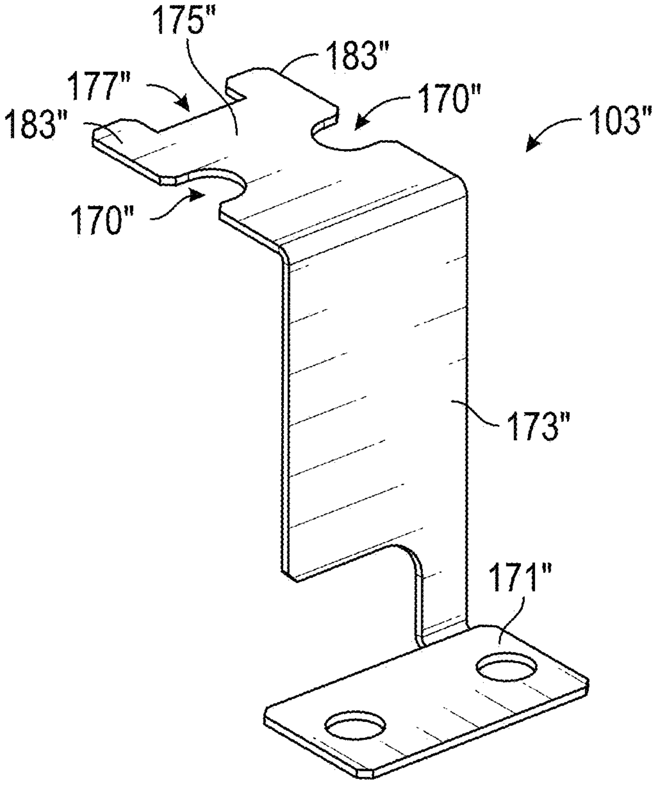

In some implementations, a different ground connection, such as the ground connection 103' or a similar ground connection, can be used with the multi-band radiator portions 100, as shown in at least FIG. 2A. For example, FIGS. 3L-3N shown an implementation of the multi-band radiator portion 100 in the form of multi-band radiator portion 100" that includes a ground connection 103". The radiating element 101" of the multi-band radiator portion 100" differs from the radiating element 101 of the multi-band radiator portion 100 in that the radiating element 101" includes slots 131" instead of opening **117*b* for coupling to the ground connection 103". The ground connection 103" is similar to the ground connection 103' described with reference to FIGS. 4A-4**H below and includes like reference numbers ending in a "double prime" instead of a single "prime" accordingly.

Figure 4A:
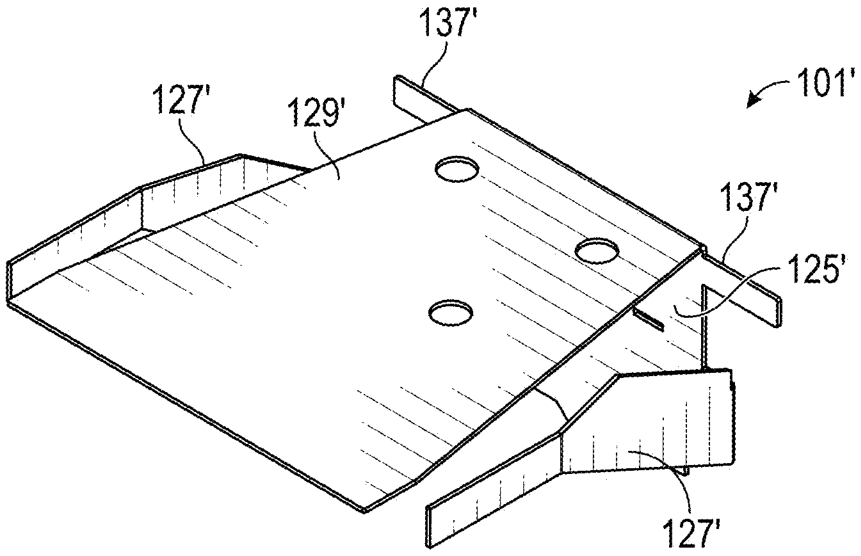
FIGS. 4A-4H illustrate various views of components of another implementation of a multi-band radiator portion that can be included in any antenna assembly described herein, in accordance with some aspects of this disclosure.
Figure 4B:
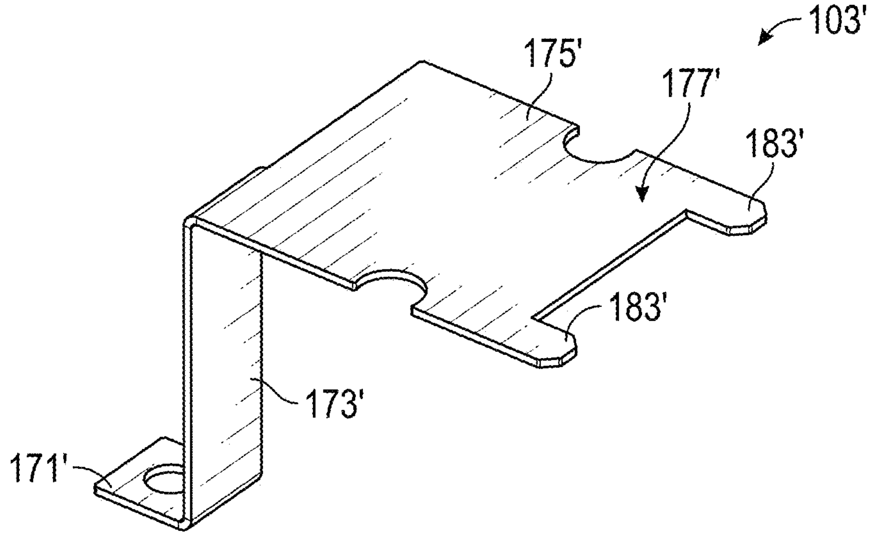
Figure 4C:
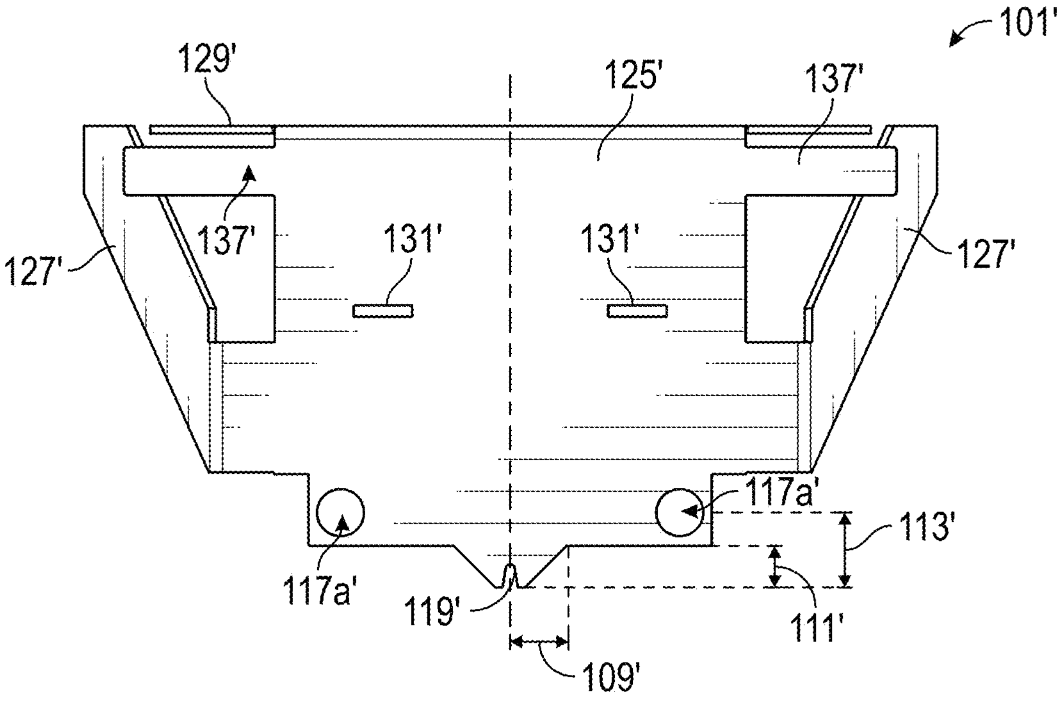
Figure 4D:
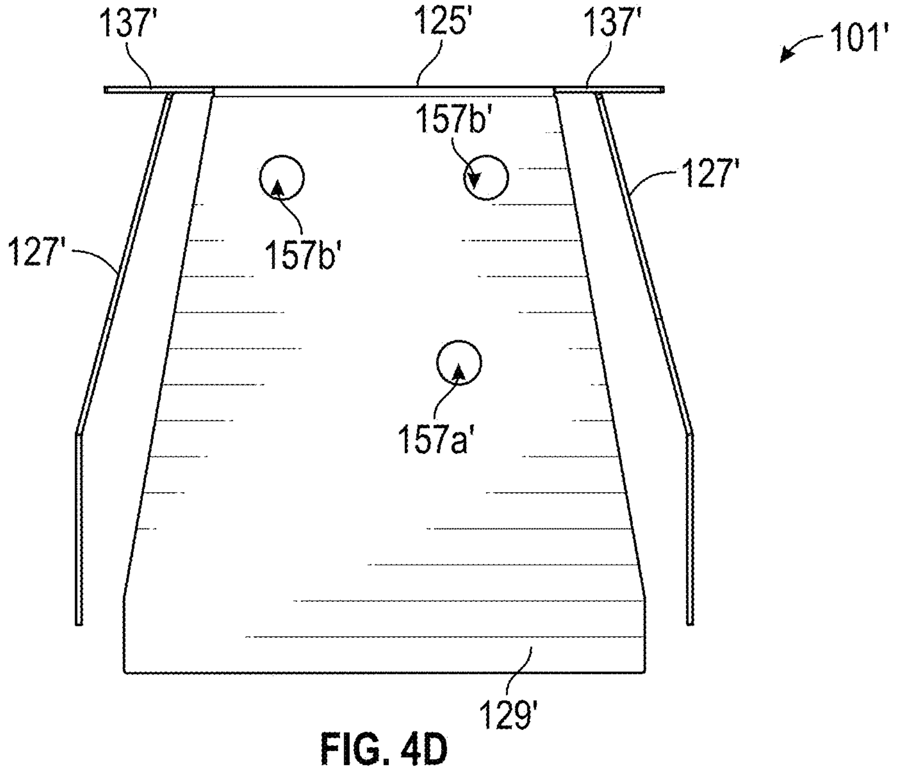
Figure 4E:
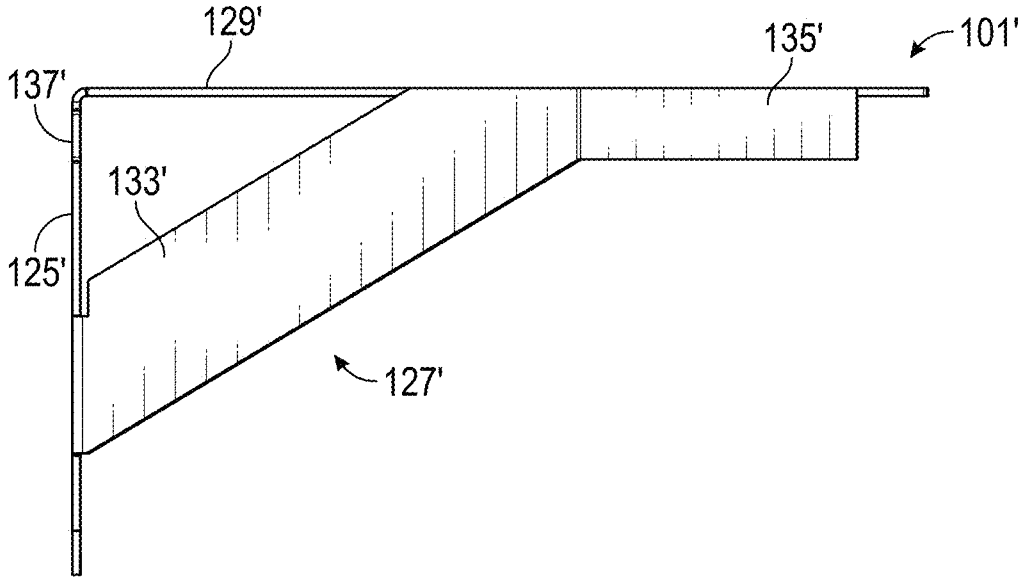
Figure 4F:
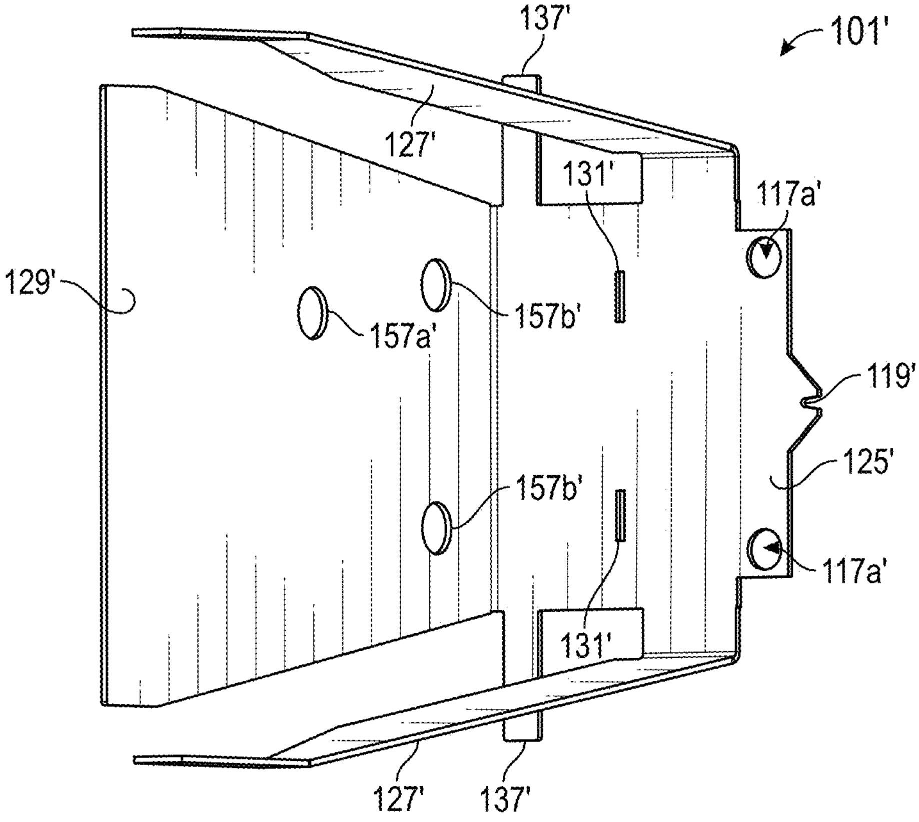
Figure 4G:
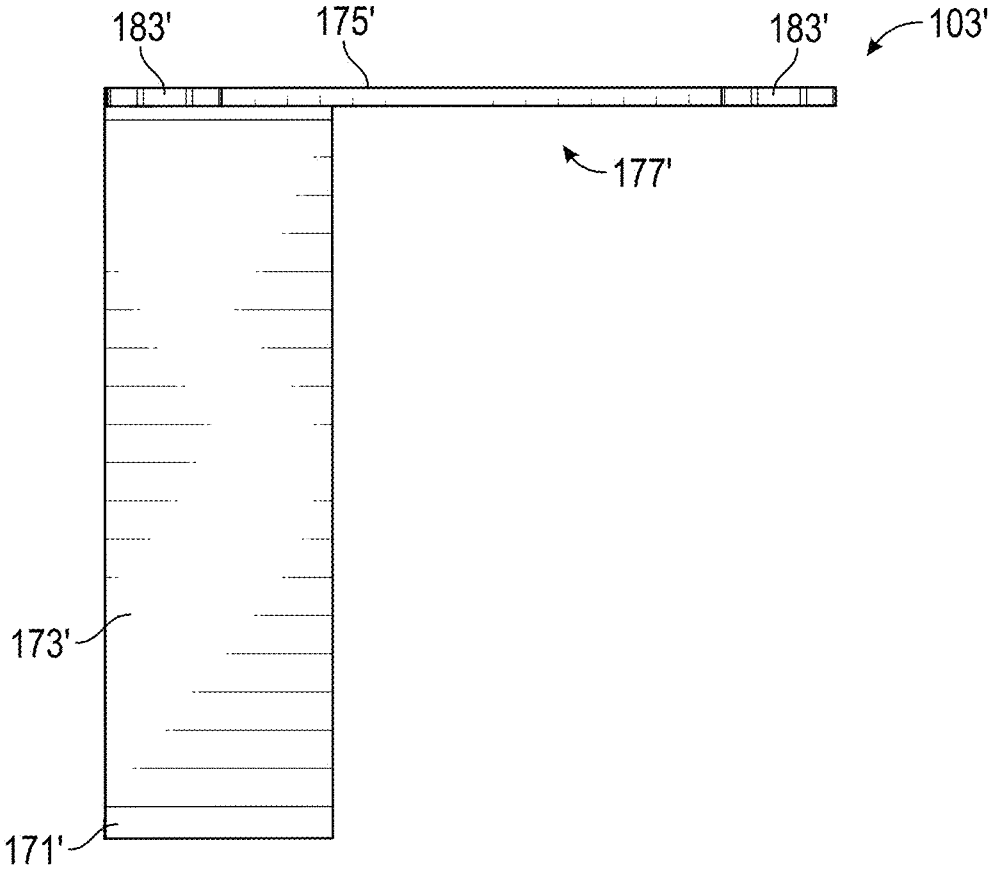
Figure 4H:
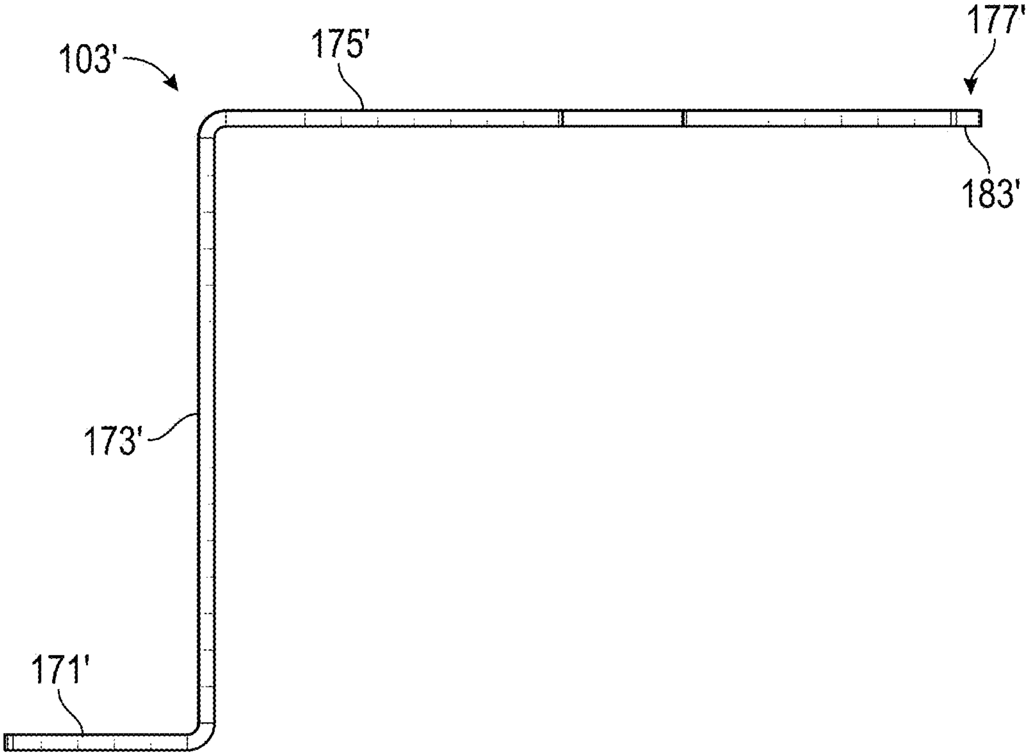

FIGS. 4A-4H illustrate various views of components of the multi-band radiator portions 100', in accordance with some aspects of this disclosure. Each multi-band radiator portion 100' can include a multi-band radiating element 101' and a ground connection 103' (also referred to herein as a "grounding portion" or a "tuner"). The ground connection 103' is configured to couple multi-band radiating element 101' to the ground plane 212. FIGS. 4A and 4C-4F illustrate assorted views of the multi-band radiating element 101'. FIGS. 4B and 4G-4H illustrate the ground connection 103'. In some implementations, a different ground connection, such as the ground connection 103 illustrated in at least FIG. 3B can be used with the radiating element 101' to form the multi-band radiator portions 100'. It is recognized that the multi-band radiator portions 100' described herein are just one example of multi-band radiator portions that can be included in the antenna assembly 200. In other implementations, different multi-band radiator portions can be included. For example, the antenna assembly 200 can include multi-band radiator portions that are similar or identical to the multi-band radiator portions 100 described herein. In the illustrated implementation, the radiating element 101' and the ground connection 103' are constructed of metal (e.g., a conductive sheet). In some cases, the conductive sheet can have a thickness between 0.01 inches and 0.03 inches. In other implementations, the radiating element 101' and/or ground connection 103' could be constructed out of several rigid PCB portions or a single flex circuit PCB (e.g., supported by the radome 204 or another RF-transparent supporting structure). Additional disclosure regarding antenna systems and assemblies including the multi-band radiator portions 100' of FIGS. 4A-4H is further described in U.S. application Ser. No. 18/894,607, filed Sep. 24, 2024, entitled "Antenna Systems," the entire contents of which is hereby incorporated by reference herein in its entirety. The disclosure and Figures in U.S. application Ser. No. 18/894,607 can be used in connection with the disclosure and Figures described and shown herein.

As shown in FIG. 4A, a radiating element 101' can be one element or component of the multi-band radiator portion 100'. An upright low-band radiation portion 125' (also referred to herein as the "body portion 125'") can be a body portion of the radiating element 101'. The upright low-band radiation portion 125' can be coupled to a feeding portion at a feed point 119' (see e.g., FIG. 4C) to electrically excite the radiating element 101'. As shown in FIG. 4A, a second low-band radiation portion 129' (also referred to herein as the "head portion 129'") can be positioned at an angle relative to the body portion 125' (e.g., the upright low-band radiation portion 125') and extend such that the second low-band radiation portion 129' is not coplanar with the upright low-band radiation portion 125'. In some other implementations, the second low-band radiation portion 129' can be configured without a bend such that it is coplanar with the upright low-band radiation portion 125'. In some implementations, advantages of a bend can include having two distinct low-band radiating portions, reducing the total height of the system to be more compact and conserve space, and configuring the system to be able to easily cover and provide protection for the system in a compact configuration with multi-band coverage (e.g., in the antenna assembly 200). Having a compact radiating element 101' (e.g., in part due to the bend between the upright low-band radiation portion 125' and the second low-band radiation portion 129') can allow the multi-band radiator portions 100' to be utilized in antenna assemblies where a low profile is required or desired. For example, it can be desirable for the antenna assembly 200 to have as low a profile as possible, to allow the antenna assembly 200 to be used in high wind operating conditions or applications that require low visual impact. Accordingly, as the multi-band radiator portions 100' represent the limiting factor in terms of total height of the antenna assembly 200, the low-profile multi-band radiator portions 100' are particularly advantageous. In some implementations, the multi-band radiator portions 100' can have a total height (e.g., from the bottom of the feed point 119' to the top of the second low-band radiation portion 129') of between 0.75 inch and 3 inches. For example, the multi-band radiator portions 100' may have a total height of less than 3 inches, less than 2.5 inches, less than 2 inches, less than 1.5 inches, less than 1 inches, and/or the like.

In some other implementations, the second low-band radiation portion 129' can be coupled to a third low-band radiation portion, a fourth low-band radiation portion, and/or other radiation portions. In some implementations, material forming the second low-band radiation portion 129' can extend in a direction further away from the upright low-band radiation portion 125' and comprise a slit between the material such that portion of material on each side of the slit may form a third low-band radiation portion and a fourth low-band radiation portion respectively, that may be coplanar with and extend beyond the second low-band radiation portion 129'. In some implementations the third and fourth low-band radiation portions can be the same length and width. In some implementations, the length and/or width of the third low-band radiation portion may be different from the length and/or width of the fourth low-band radiation portion. In some implementations, one or more of the third low-band radiation portion and the fourth low-band radiation portion may be angled or bent or attached such that it is not coplanar with the second low-band radiation portion 129'. Adding variations in radiation portions can provide advantageous coverage in different areas of bandwidth in some implementations.

In some cases, the radiating element 101' is a modified printed inverted-F antenna (PIFA) modified to have three bent arm members that make the radiating element 101' a three-dimensional antenna as opposed to a two-dimensional antenna generally practiced in the art for printed inverted-F antennas. Furthermore, the radiating element 101' can be a dual-band monopole antenna, a multi-band 3D inverted F antenna, or a version of a 2D inverted F antenna similar to a PIFA that has a configuration that, when used in conjunction with high order electromagnetic modes generated or received by a transceiver and/or receiver (as is typically performed for PIFA antennas), permit the radiating element 101' to have an operating frequency range of 500 MHz to 8 GHz.

The low-band portions (e.g., upright low-band radiation portion 125', the second low-band radiation portion 129', and any additional low-band radiation portions) can be configured for radiation in the low-band (e.g., approximately 600 MHz to 900 MHZ), including low-band odd multiples. The radiating element 101' can also include additional portions configured for radiation above the low-band. For example, the radiating element 101' can include one or more primary arms 127' and/or one or more secondary arms 137'.

The primary arms 127' and the secondary arms 137' may be configured for operation on different bands or the same bands. For example, the primary arms 127' can be configured for radiation in the mid-band (e.g., approximately 1.7 GHZ to 2.7 GHZ) and the secondary arms 137' can be configured for radiation in the C-band (e.g., approximately 3.4 GHz to 4.2 GHz). In the illustrated example, the radiating element 101' includes two primary arms 127' and two secondary arms 137'. However, more or fewer arms 127', 137' are possible. Further, in other implementations, the arms 127', 137' or additional/alternative arms can be included in the radiating element 101' and configured for radiation in the high band Wi-Fi band (e.g., approximately 4.8 GHz to 7.25 GHz).

The arms 127' can be coupled to a lower portion of the upright low-band radiation portion 125'. In some implementations, the arms 127' can be coupled to an upper portion of the upright low-band radiation portion 125'. In some other implementations, one or more additional arms 127' can be coupled to an upper portion of a low-band radiation portion (e.g., upright low-band radiation portion 125', the second low-band radiation portion 129', etc.). In some implementations the arms 127' can have the same length. In some implementations arms 127' can have different lengths. In some implementations, one or more of the arms 127' can be positioned at an angle relative to the upright low-band radiation portion 125' and/or relative to a ground plane (e.g., the first ground plane 212). The arms 127' can be positioned at the same angle or at different angles. The arms 127' can be configured for radiation in the mid-band, including higher even order resonances. In some implementations, additional arm portions can be added or formed at selected locations to add coverage for additional high frequency bandwidth areas (e.g., the high band Wi-Fi band). For example, in some implementations, portions of the arms 127' (and/or the arms 137') may be slit, extended, angled, bent, modified, and/or otherwise connected to provide improved coverage areas.

As shown in FIG. 4E, in some implementations, each arm 127' can include a first arm portion 133' and a second arm portion 135'. The first arm portions 133' can be coupled to or extend from the upright low-band radiation portion 125', and the second arm portions 135' can be coupled to or extend from the first arm portions 133'. The second arm portions 135' can be at a different angle relative to the upright low-band radiation portion 125' and the first ground plane 212 compared to the first arm portions 133'. The second arm portions 135' can have a different width, thickness, length, and/or bend angle compared to the first arm portions 133'. These variations can improve return loss and radiation pattern performance in some cases. In the illustrated example, the first arm portions 133' extend from a lower portion of the upright low-band radiation portion 125' in a direction towards the second low-band radiation portion 129'. The first arm portions 133' and the second low-band radiation portion 129' can both extend away from the upright low-band radiation portion 125'. In some implementations, the arms 127' can have a maximum height (relative to the first ground plane 212) that is substantially the same as the maximum height of the second low-band radiation portion 129' (relative to the first ground plane 212).

The arms 137' can extend from or be coupled to the upright low-band radiation portion 125'. For example, the arms 137' can be coupled to an upper portion of the upright low-band radiation portion 125'. In some implementations, the arms 137' can be positioned above the arms 127', relative to the first ground plane 212. In some implementations, the arms 137' can be coupled to a lower portion of the upright low-band radiation portion 125'. For example, the arms 137' may be positioned below the arms 127'. In some other implementations, one or more additional arms 137' can be coupled to a low-band radiation portion of the radiating element 101' (e.g., the upright low-band radiation portion 125', the second low-band radiation portion 129', etc.). In some implementations the arms 137' can have the same length. In some implementations arms 137' can have different lengths. In some implementations, one or more of the arms 137' can be positioned at an angle relative to the upright low-band radiation portion 125' and/or relative to a ground plane (e.g., the first ground plane 212). The arms 137' can be positioned at the same angle or at different angles. As described herein, the arms 137' can be configured for radiation in the C-band (e.g., approximately 3.4 GHz to 4.2 GHz), including high even order resonances. In some implementations, additional arm portions can be added or formed at selected locations to add coverage for additional high frequency bandwidth areas (e.g., the C-band or higher). For example, in some implementations portions of the arms may be slit, extended, angled, bent, modified, and/or otherwise connected to provide improved coverage areas. In some implementations, the arms 137' can be coplanar to the upright low-band radiation portion 125', as shown in FIG. 4E. In some implementations, the arms 137' can improve return loss at the upper end of the mobile telecommunications spectrum relative to the radiating element 101', which may not include the additional arms similar to the arms 137'.

As shown in FIG. 4B, a ground connection 103' (also referred to herein as the "tuner 103'") can be adapted and configured to couple the radiating element 101' with the first ground plane 212. The tuner 103' can include a face plate 171' that is configured to be coupled to a ground plane (e.g., the first ground plane 212). The tuner 103' can include an arm portion 173', which can be an arm portion coupled to the face plate 171'. The width of arm portion 173' can be adjusted to accommodate clearance for transmission lines, such as coaxial cables (not shown) of antenna assembly 200, which can be used to excite the radiating element 101'. For example, the illustrated width of the arm portion 173' allows the coaxial cables to extend past the arm portion 173', under the body 175', and to be positioned adjacent the arm portion 173' when coupled to the radiating element 101'. Low-band operation of the multi-band radiator portion 100' is enhanced and can be adjusted by the length and width of body portion 125' and head portion 129' as well as the location, placement, and configuration of an opening (not shown) in body portion 125'. The tuner 103' can include a body 175' that includes an engagement portion 177'. The engagement portion 177' can be adapted and configured to be positioned against the body portion 125' of the radiating element 101'. For example, the engagement portion 177' can be positioned against the upright low-band radiation portion 125' such that the body 175' is substantially orthogonal to the upright low-band radiation portion 125'. The engagement portion 177' can include one or more tabs 183'. The tabs one or more tabs 183' can be twist tabs. The one or more tabs 183' can be received within one or more slots 131' of the upright low-band radiation portion 125'. As such, the extension of the tabs 183' through the slots 131' can be a point of coupling, creating a ground connection for the multi-band radiator portion 100'. Use of the tabs 183' and the slot 131' for the ground connection can improve grounding, reduce the part count, and/or reduce assembly time, compared to other coupling means such as a nut and threaded fastener. For example, to couple the ground connection 103' to the radiating element 101', the tabs 183' can be inserted in the slots 131' and twisted (e.g., with pliers) to create the connection. This type of connection can be completed more quickly than other connections (such as soldering, nut and fastener, etc.) and can provide a secured connection. In some cases, solder can optionally be used to improve the electrical connection between the ground connection 103' and the radiating element 101'; however, the solder is generally not required for the mechanical or electrical connection to be established. The lateral position of the arm portion 173' relative to body 175' can also be selected to accommodate clearance for transmission lines. For example, while the arm portion 173' is shown as positioned on one side of the body 175', this position is not required and the arm portion 173' could be centrally positioned on the body 175' in other implementations. The position and width of the arm portion 173' can also impact the performance of the multi-band radiator portion 100' across the various bands.

The ground connection 103' can be elevated relative to the feed location 119' of the radiating element 101' in the assembled antenna assembly 200. For example, the face plate 171' can be coupled to a portion of the first ground plane 212 that is higher than the feed point 119' in the assembled antenna assembly 200. Such a raised connection provides advantages to achieve the multi-band coverage. Dimensions can be selected to provide harmonic resonance at higher odd orders in some implementations. The grounding portion 103' provides advantages for achieving multiple advantageous resonances. Also, the selection of the dimensions for radiating portion 100' may also be adjusted to impact the radiation patterns of the fundamental mode as well as the higher order modes. For example, in some implementations, the height, width, and clearance provided for by the size of arm portion 173' can be advantageously selected. Additionally, the length and width of body portion 175' can also be advantageously selected. For example, the width and length of the arm portion 173' and the body 175' can be adjusted for impedance matching as well as to achieve a desired radiation pattern for the multi-band radiator portion 100'. The locations of the one or more slots 131' and one or more tabs 183', when coupled together for the grounding connection create a symbiotic connection to provide a resonance of desired impedance to match a desired frequency and bandwidth and radiation pattern for a low-band frequency configuration in some implementations. In the illustrated example, the slots 131' are near the vertical center of the upright low-band radiation portion 125'. The vertical position of the slots 131' on the upright low-band radiation portion 125' is related to the height or length of the arm portion 173'. In other implementations, the slots 131' can be located higher or lower on upright low-band radiation portion 125' relative to the vertical axis. The location of the slots 131' (e.g., where the ground connection 103' attaches) relative to the height of the upright low-band radiation portion 125' is selected for impedance matching and the desired behavior of the higher order modes (e.g., where the higher order modes occur). The relative dimensions are also selected so that the radiation patterns come off of the radiating element 101' in the desired shape and/or direction. The width between the slots 131' can also be variable. In the illustrated example, each slot 131' is located approximately centrally between the central vertical axis of the upright low-band radiation portion 125' and an outside edge of the upright low-band radiation portion 125'. In other examples, the slots 131' can be closer or further apart from each other. In some cases, decreasing the width between the slots 131' can require the height of the slots 131' to also be reduced relative to the upright low-band radiation portion 125' for optimal performance of the multi-band radiator portion 100'. In some cases, it can be desirable for the slots 131' to be located as high on the upright low-band radiation portion 125' as possible for improved structural benefits. However, the height of the slots 131' is selected generally selected for a balance of good structural support and performance of the multi-band radiator portion 100' across all desired bands.

FIG. 4C shows coupling points 117*a*' of the radiating element 101'. The twin coupling points 117*a*' can be used to attach the multi-band radiator portion 100' to a non-conductive structural stand coupled to the first ground plane 212. For example, the non-conductive structural stand can be secured to the first ground plane 212. More isolation can be created from the first ground plane 212 by expanding the space 113' and/or the space 111' between the twin coupling points 117*a*' and a feed point location 119'. The feed point location 119' is configured to receive an electrical connection to excite the radiating element 101'. For example, the center conductor of the coaxial cable can be electrically and mechanically coupled to the feed point 119' with the outer conductor being electrically and mechanically coupled to the first ground plane 212. The space 111' can be selected primarily for impedance matching purposes and may vary depending on the particular implementation of the multi-band radiator portion 100' and the antenna assembly 200. For example, changing the dimensions or structure of the first ground plane 212 can result in a variation in the size of the space 111'. In some implementations, the feed point 119' can be twice the height (e.g., space 111' can be doubled) or greater and/or the feed point 119' can be twice the width (e.g., the narrow width tab 109' can be doubled) or greater. In other implementations, a feed point 119' with different structural features can be used. For example, the radiating element 101' may include a feed point that is a tab. The tab feed point may extend substantially perpendicular to the upright low-band radiation portion 125'. In one example, the radiating element 101' can include a feed point that includes a spacer with a push rivet or established via a heat stake operation. In some implementations, the feed point of the radiating element 101' can be configured to be snap fit into a slot or configured as a push pass connection.

In some other implementations, features and aspects of the multi-band radiator portions 100' can be further described as follows. FIG. 4C illustrates the radiating element 101' that can be coupled to the first ground plane 212 of the antenna assembly 200 shown in at least FIG. 2A, and electrically excited at the feed point 119'. For example, as described above, the center conductor of the coaxial cable can be coupled to the feed point 119' with the outer conductor being coupled to the first ground plane 212. The feed point 119' can extend from or be coupled to the upright low-band radiation portion 125' with what can be a narrow width tab 109'. Additional isolation between the upright low-band radiation portion 125' and the first ground plane 212 can be obtained by adjusting 111' and consequently the coupling location reference 113'. For additional mechanical support, the upright low-band radiation portion 125' can have a non-conductive coupling mechanism (not shown) to the first ground plane 212. The upright low-band radiation portion 125' can have a coupling point (e.g., one or more slots 131') for attaching the grounding portion 103' with via the one or more tabs 183'. As noted above, also extending from/coupled to the upright low-band radiation portion 125' can be one or more primary arms 127' and/or one or more secondary arms 137'. The arms 127', 137' can assist with the dominate radiation in the mid-band and C-band for the multi-band radiator portion 100'. One or more portions similar to the arms 127', 137' may be used for assisting in the high band portion of the radiation are realizable in the implementation of this approach. Higher even order resonances may radiate from portions similar to the arms 127', 137' of the radiating element 101' to assist in the multi-band properties of the device. Furthermore, there can be the additional head portion 129' coupled to the upright low-band radiation portion 125' that may be perpendicular in nature for its orientation. Though it is not necessary for it to be bent near 90-degrees as depicted in this illustration and can be shown to be perceptibly straight in other implementations. By bending the low-band radiation portion of the radiating element 101' to realize two distinct portions (e.g., the upright low-band radiation portion 125' and the second low-band radiation portion 129'), the total height of the radiating element 101' is reduced and as such the total volume of the antenna assembly 200 to most likely provide environmental protection is consequently reduced. The low-band operation of the radiating element 101' is determined by several factors. Some of the factors are the length and width of the upright low-band radiation portion 125' and of the second low-band radiation portion 129', the location of opening one or more slots 131', and/or the grounding portion 103'.

FIG. 4B illustrates the grounding portion of the device 103'. The face plate 171' can extend from or be coupled to the arm 173'. The width of the arm 173' can be adjusted to accommodate clearance for assembly purposes for a transmission line of the antenna assembly 200 that may be used for excitation of the multi-band radiator portion 100'. The body 175' can extend from or be coupled to arm 173'. The engagement portion 177' can be coupled to or form a portion of the body 175'. The engagement portion 177' can also have one or more coupling points (e.g., one or more tabs 183') that are configured to couple to the opening one or more slots 131' of the radiating element 101' in the assembled multi-band radiator portion 100'. The height of the arm 173', the width of the arm 173', the clearance provided for in the arm 173', the length of body 175', and the symbiotic location of slots 131' and/or tabs 183' can provide for a reactance that counterbalances the reactance of the low-band impedance to provide a resonance of desired impedance match for the desired frequency and bandwidth for the low-band radiation. The location of the coupling points (e.g., one or more tabs 183') and the length and width of the grounding portion 103' are also chosen to provide higher odd order resonant harmonics at the desired locations to cover a portion of the frequency band of the multi-band performance of the antenna assembly 200. Further, the relative dimensions described above also influence the radiation pattern generated by the radio frequency excitation of the multi-band radiator portion 100'.

FIG. 4C illustrates a back side view of the radiating element 101'. Twin coupling points 117*a'* in the radiating element 101' may be coupled to a non-conductive object (not shown), which can be coupled to the first ground plane 212 of the antenna assembly 200. This coupling may provide mechanical stability for the multi-band radiator portions 100' while not disturbing or inhibiting the ground connection provided by the ground connection 103'.

FIGS. 4D-4F provide additional views of the radiating element 101'. As shown in FIGS. 4D and 4F, the second low-band radiation portion 129' can include one or more clearances. For example, the second low-band radiation portion 129' can include one or more first clearances 157*a'* and/or one or more second clearances 157*b'*. The clearances 157*a'*, 157*b'* can be holes or openings formed in the second low-band radiation portion 129'. The clearances 157*a'*, 157*b'* may allow for ease of assembly of the completed multi-band radiator portions 100'. FIG. 4G-4H provide additional views of the ground connection 103' of the multi-band radiator portions 100'.

FIGS. 5A-5J illustrate various views of an antenna assembly 300. Some features of the antenna assembly 300 are similar or identical to features of the antenna assembly 200 in at least FIG. 1A-2E. Thus, reference numerals used to designate the various features or components of the antenna assembly 200 are identical to those used for identifying the corresponding features of the components of the antenna assembly 300 in FIGS. 5A-5J, except that the numerical identifiers for the antenna assembly 300 begin with a “3” instead of a “2”. Therefore, the structure and description for the various features of the antenna assembly 200 and the operation thereof as described in at least FIGS. 1A-2E are understood to also apply to the corresponding features of the antenna assembly 300 in FIG. 5A-5J, except as described differently below.

The antenna assembly 300 differs from the antenna assembly 200 primarily in the number of multi-band radiator portions 100 and dual-band WiFi radiator portions 216 included in the illustrated antenna assembly 300. For example, the illustrated implementation includes two multi-band radiator portions 100 and two dual-band WiFi radiator portions 216. However, other quantities are possible. Additionally, the main body of the antenna assembly 300 (e.g., the cover 302 and radome 304) can have a smaller volume than the antenna assembly 200.

Figure 5B:
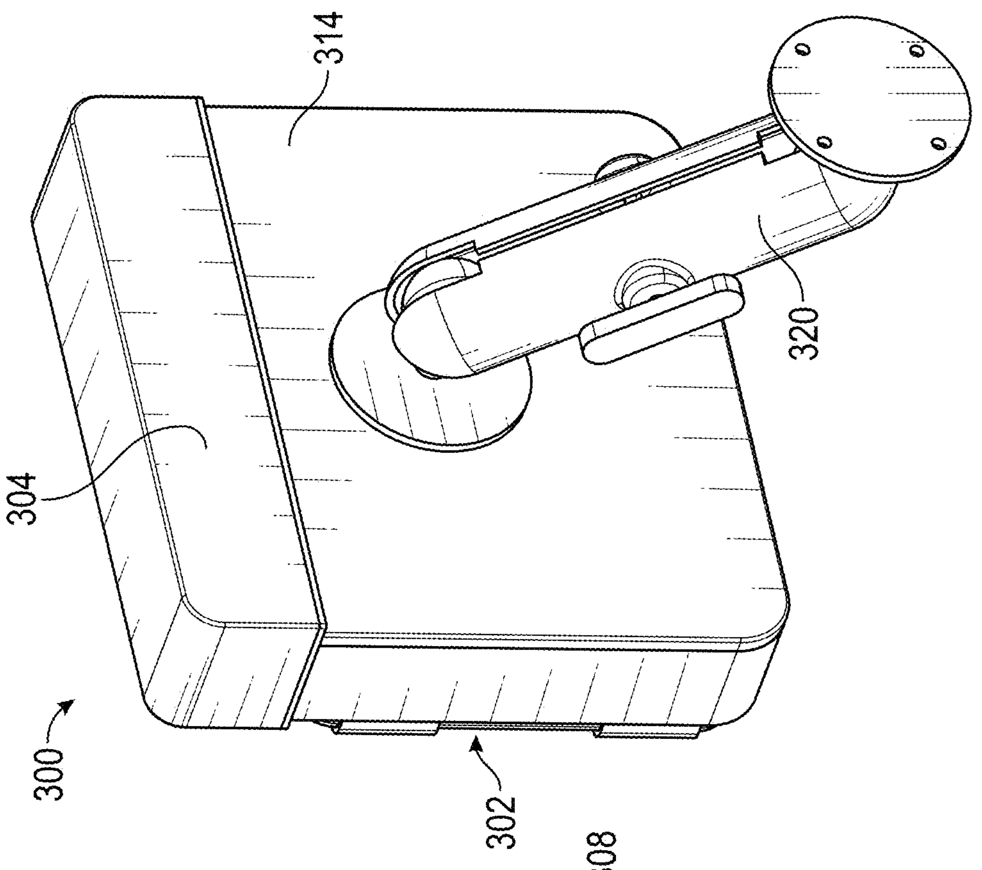
FIGS. 5A-5J illustrate various views of an antenna assembly, with various portions shown at transparent and various components highlighted, in accordance with some aspects of this disclosure.
Figure 5A:
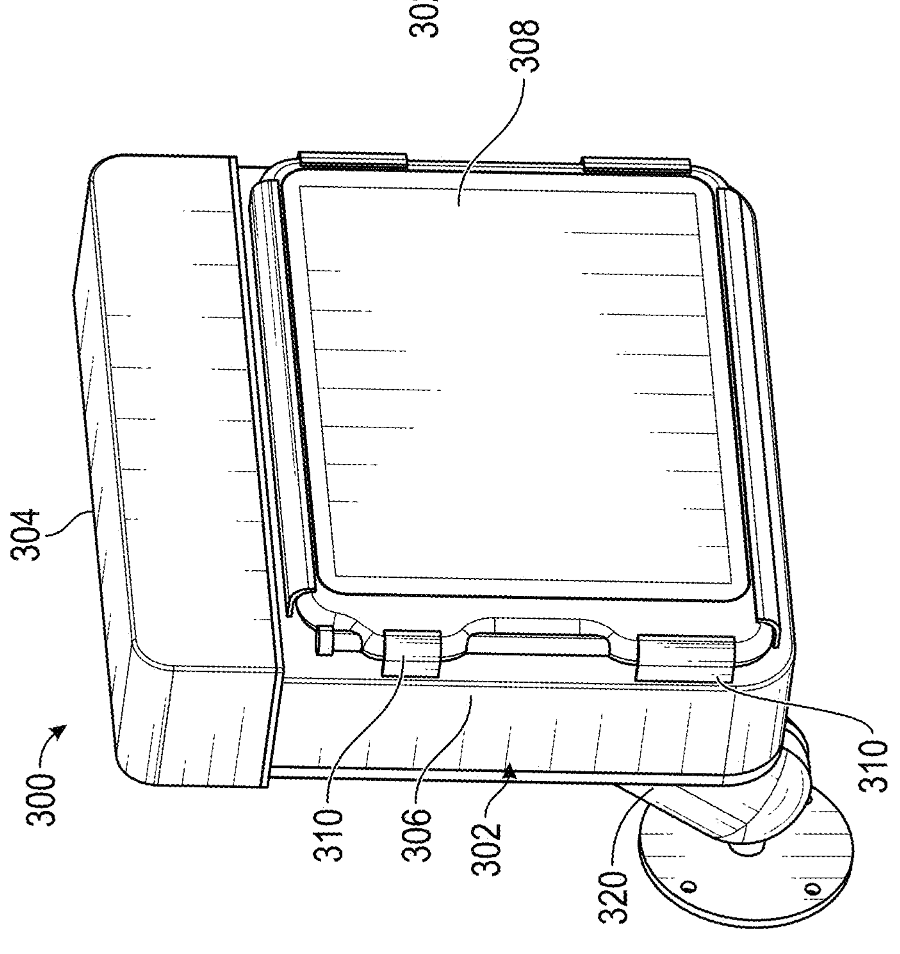

FIGS. 5A and 5B illustrate a front perspective view and a back perspective view of the antenna assembly 300. The antenna assembly 300 can include a cover 302 and/or a radome 304. The cover 302 can form a first housing defining a first internal volume of the antenna assembly 300. The radome 304 can form a second housing defining a second internal volume of the antenna assembly 300. The radome 304 can be coupled to a top side of the cover 302. In some implementations, the radome 304 can form a portion of the cover 302. For example, the cover 302 may define the entire outer body of the antenna assembly 300. As shown in at least FIG. 5E, the cover 302 can include a main body 306 and a door 308. The door 308 can be pivotably connected to the main body 306. For example, the door 308 can be coupled to the main body 306 via one or more hinges 310. This arrangement allows the door 308 to move between an open configuration (not shown), and a closed configuration (e.g., shown in at least FIG. 5A). In the open configuration, the first internal volume of the cover 302 is accessible. In some implementations, the door 308 can be locked to the main body 306 via a lock (not shown). In some implementations, the cover 302 can be used to mount a fan/vented exhaust, which could be used for forced air convection. In some implementations, the antenna assembly 300 can include a display screen 322 (e.g., a screen, touch screen, display, computer, tablet computer, interactive touch screen display and/or the like). In this implementation, the display screen 322, can be mounted to the door 308. In some implementations, the display screen can form the door 308. The display screen 322 may be removably coupled to the door 308. In some cases, the display screen 322 may adjustable relative to the door 308. For example, the display screen 322 may be configured to rotate relative to the door 308. In another example, the display screen 322 may have a pivotable connection to the door 308, such that the display screen 322 can pivot relative to the door 308. Including the display screen 322 can improve data entry for the antenna assembly 300, in some cases. Including the display screen 322 can also simplify installation of the antenna assembly 300. The antenna assembly 300 can include a mounting portion 320. The mounting portion 320 can be used to mount the antenna assembly 300 to various objects (e.g., the dashboard of a vehicle). While not illustrated, the antenna assembly 200 could include a similar mounting portion.

Figure 5C:
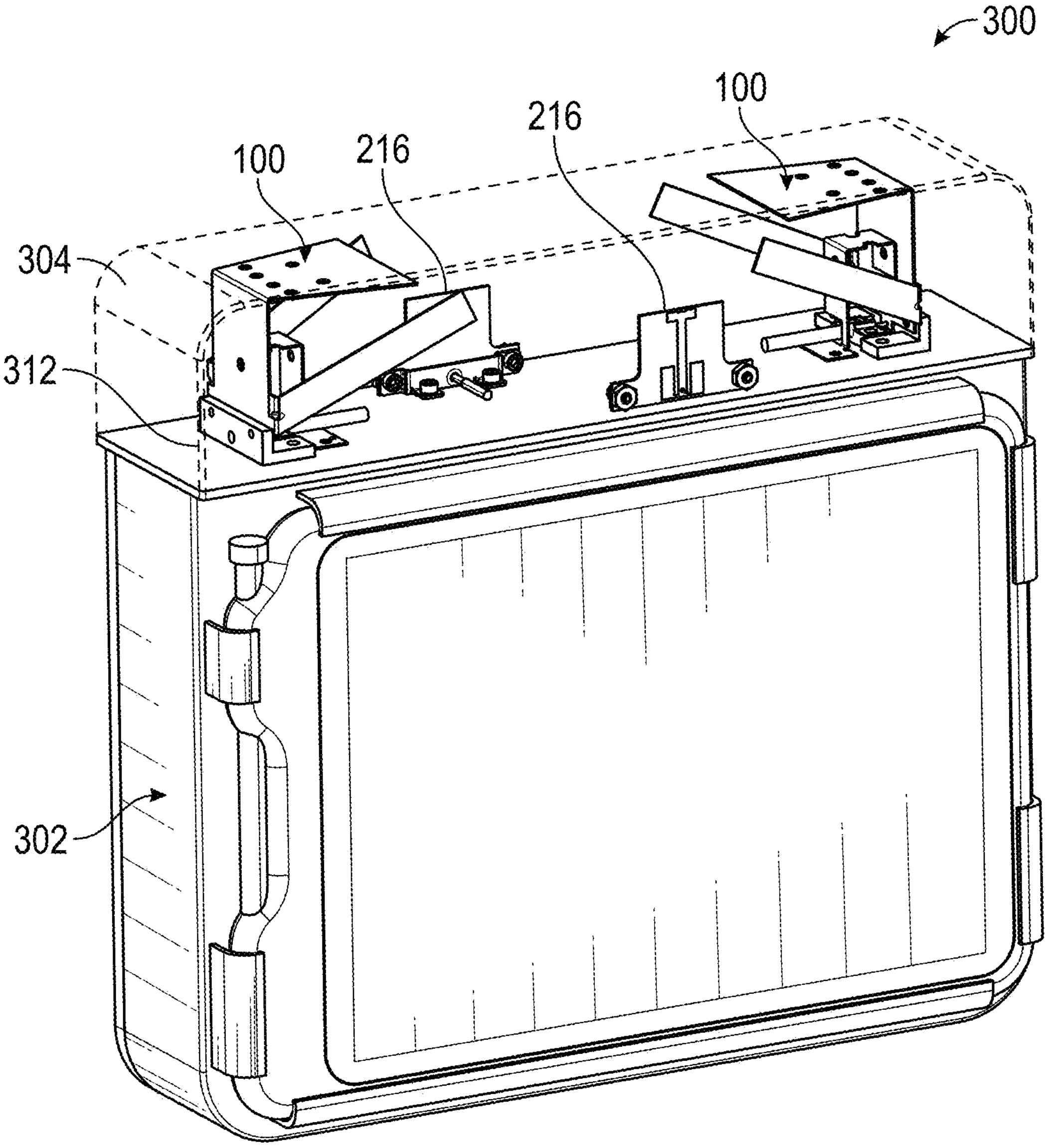
Figure 5D:
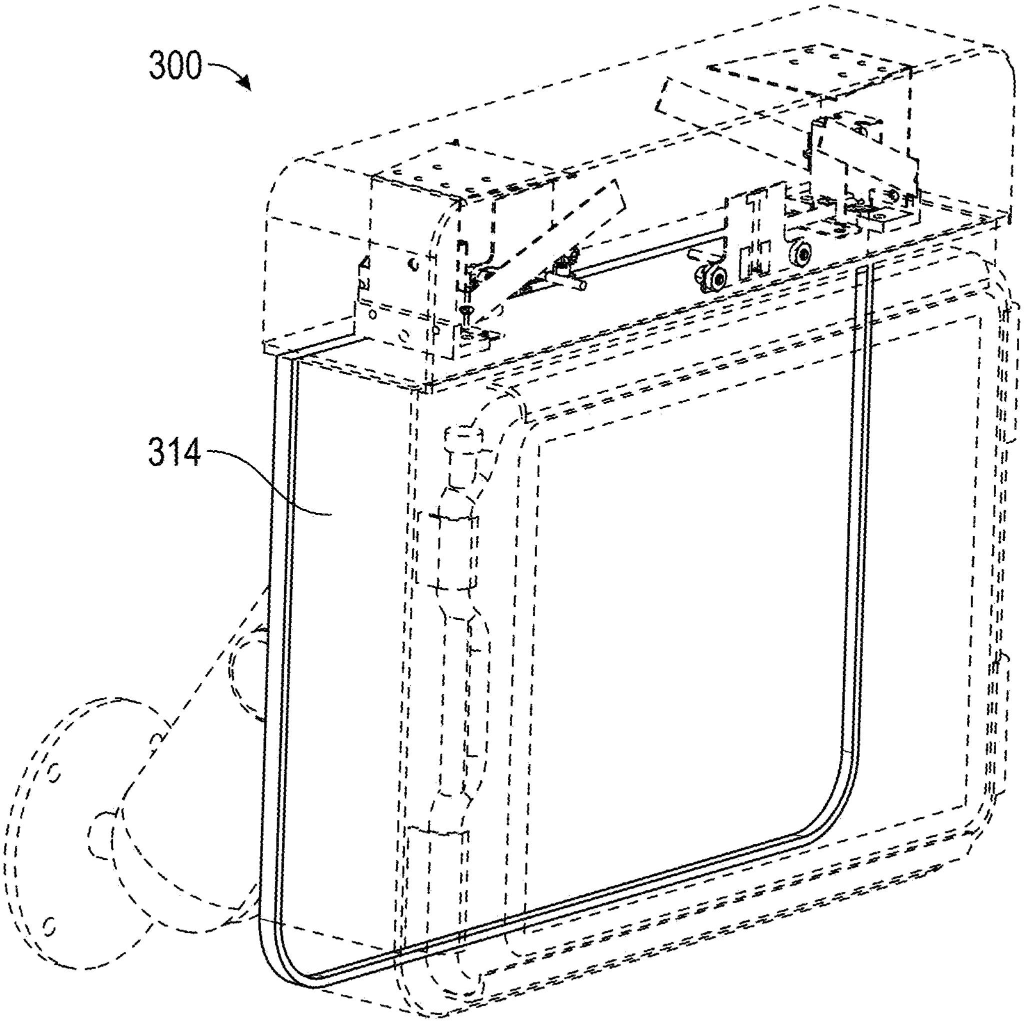
Figure 5E:
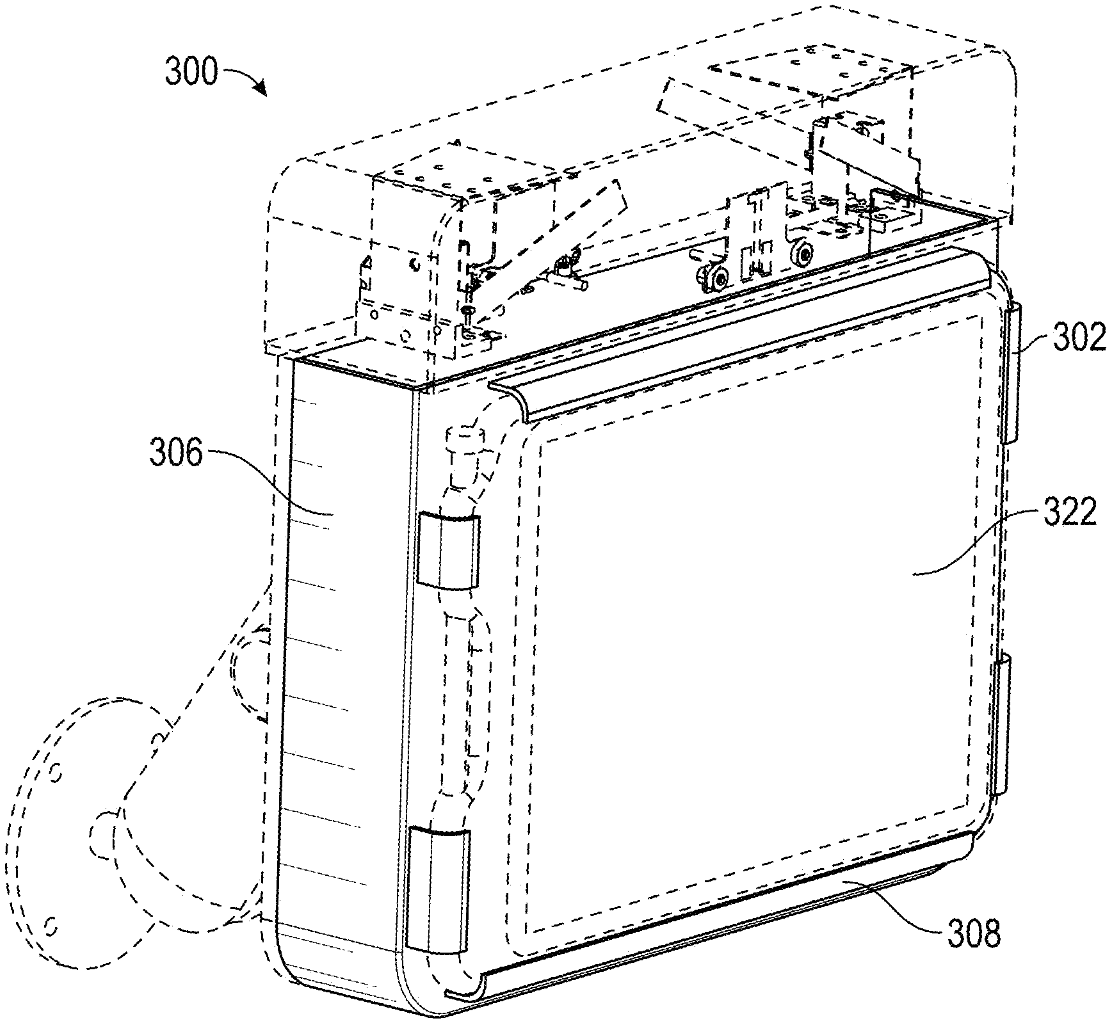
Figure 5F:
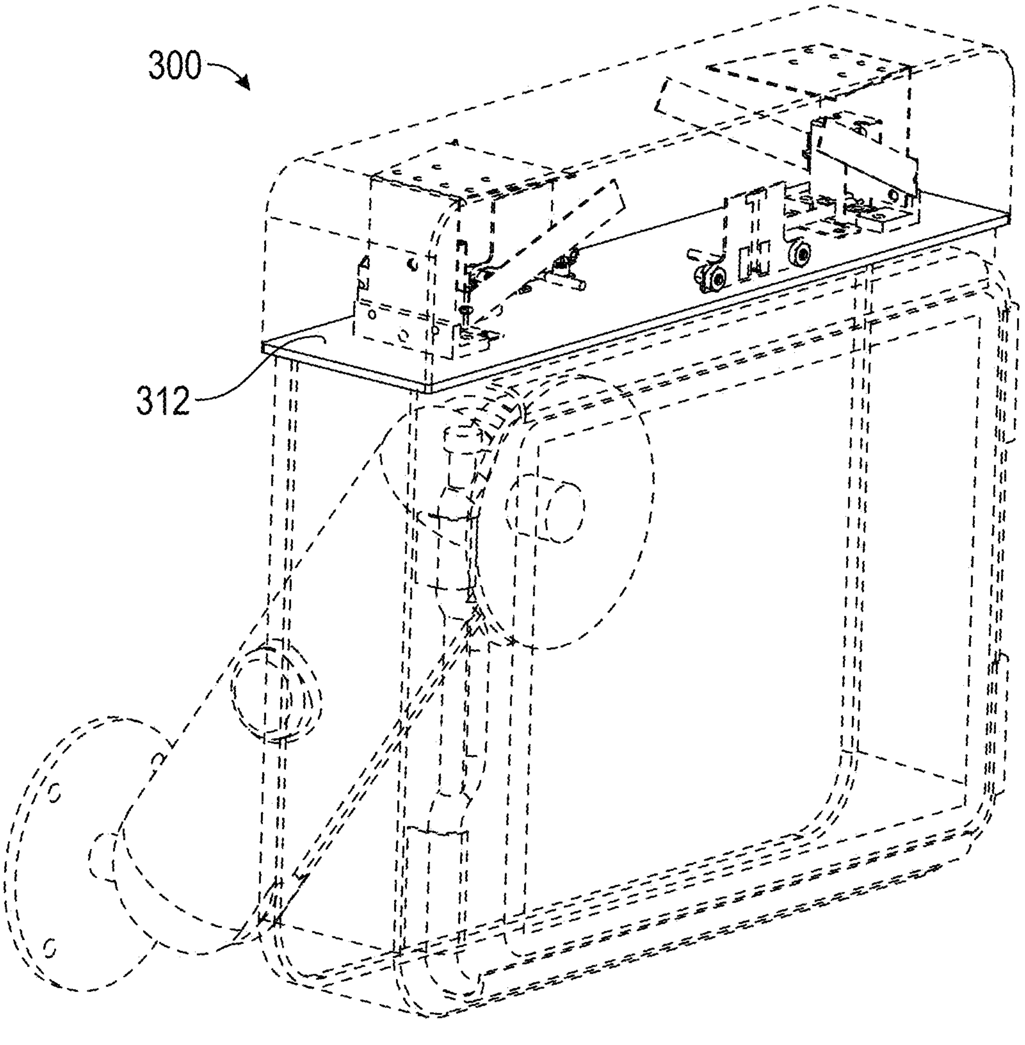
Figure 5G:
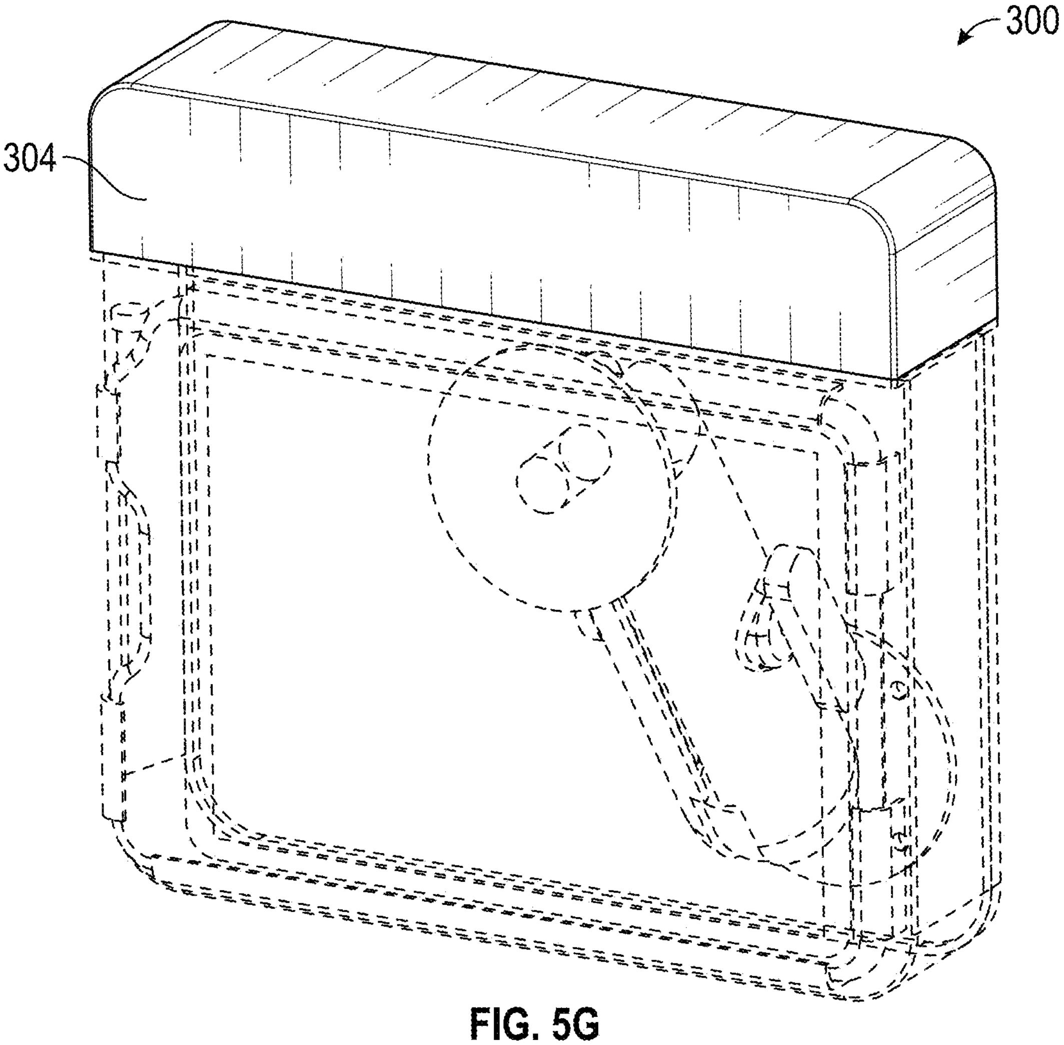
Figure 5H:
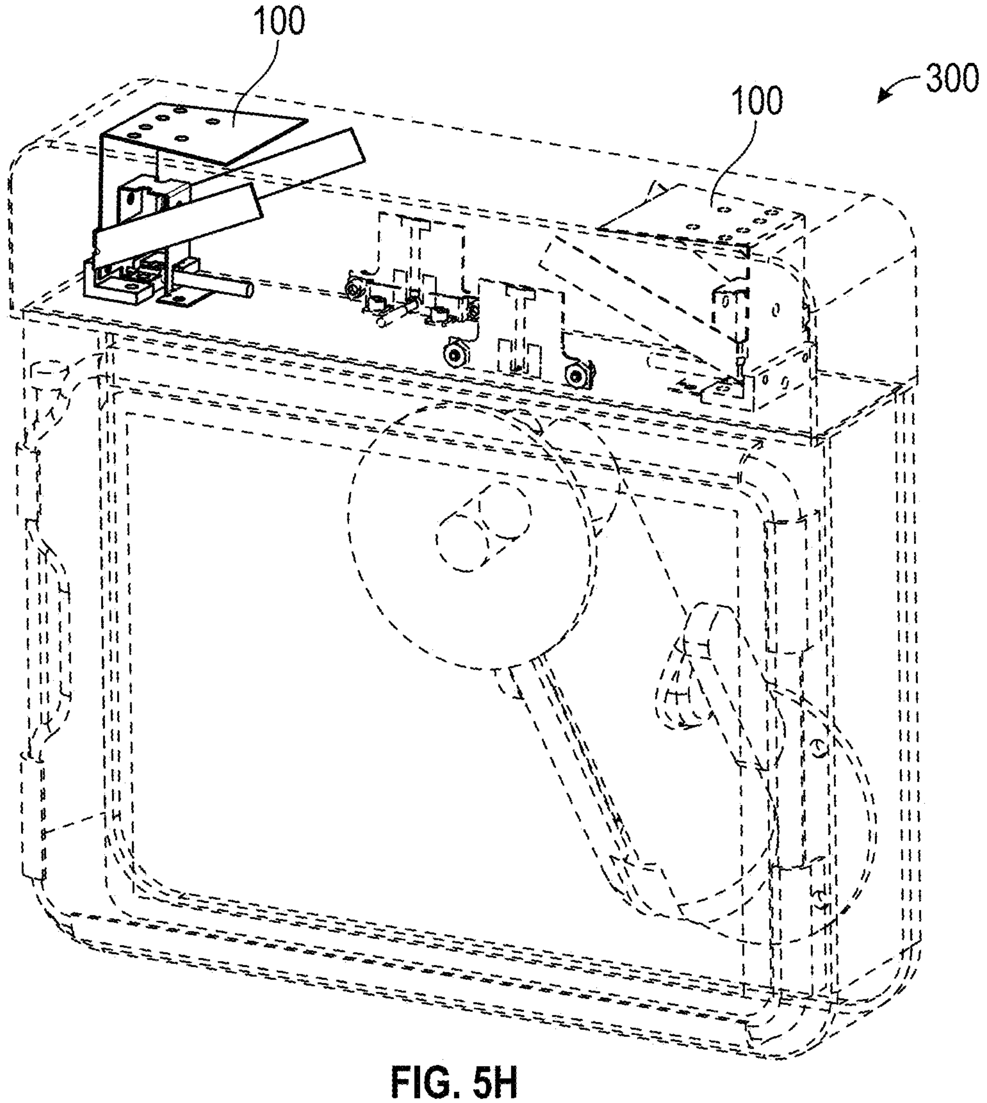
Figure 5I:
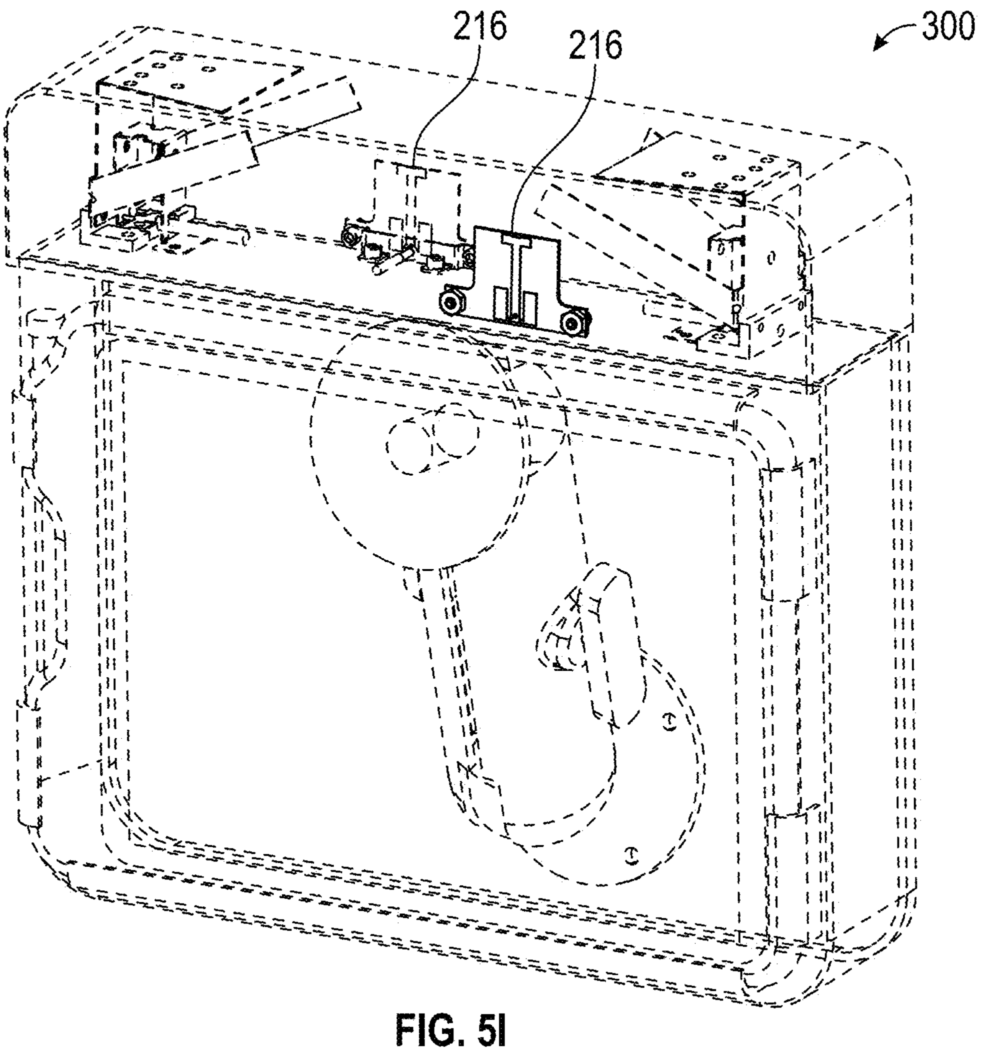
Figure 5J:
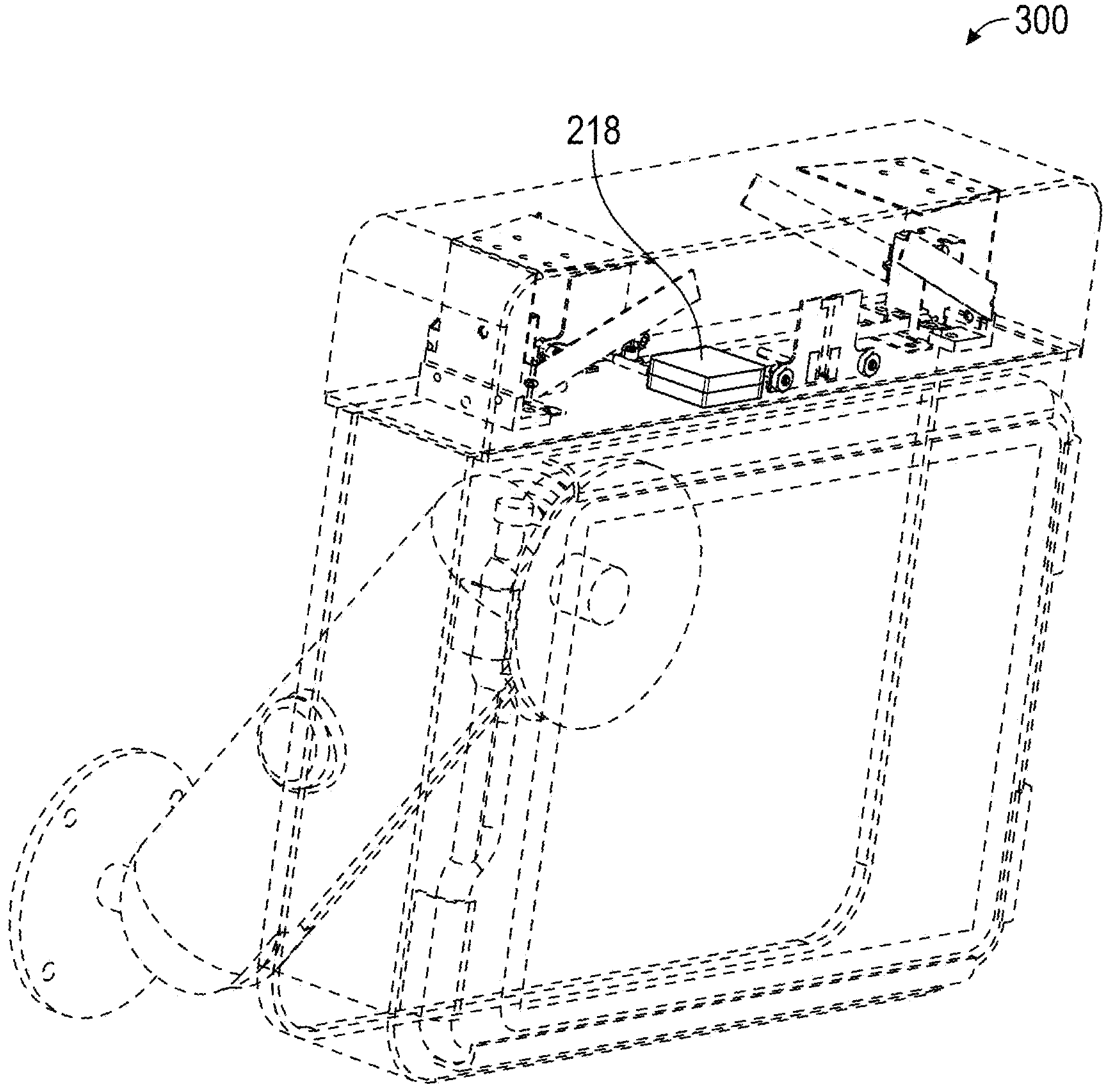

FIG. 5C illustrates a front perspective view of the antenna assembly 300 with the radome 304 shown as transparent for illustrative purposes. FIG. 5D illustrates a front perspective view of the antenna assembly 300, highlighting the second ground plane 314 of the antenna assembly 300. In the antenna assembly 300, the second ground plane 314 can be housed within the cover 302 or may be coupled to a backside of the cover 302. FIG. 5E illustrates a front perspective view of the antenna assembly 300 highlighting the cover 302. FIG. 5F illustrates a front perspective view of the antenna assembly 300 highlighting the first ground plane 312. FIG. 5G illustrates a front perspective view of the antenna assembly 300 highlighting the radome 304. FIG. 5H illustrates a front perspective view of the antenna assembly 300 highlighting the multi-band radiator portions 100. FIG. 5I illustrates a front perspective view of the antenna assembly 300 highlighting the dual-band WiFi radiator portions 216. FIG. 5J illustrates a front perspective view of the antenna assembly 300 highlighting the GPS antenna elements 218.

FIGS. 6A-8 illustrate various views of an antenna assembly 400 and components thereof. Some features of the antenna assembly 400 are similar or identical to features of the antenna assembly 200 in at least FIG. 1A-2E. Thus, reference numerals used to designate the various features or components of the antenna assembly 200 are identical to those used for identifying the corresponding features of the components of the antenna assembly 400 in FIGS. 6A-8, except that the numerical identifiers for the antenna assembly 400 begin with a "4" instead of a "2". Therefore, the structure and description for the various features of the antenna assembly 200 and the operation thereof as described in at least FIGS. 1A-2E are understood to also apply to the corresponding features of the antenna assembly 400 in FIG. 6A-8, except as described differently below.

As described further herein, various alternative antenna elements can also be incorporated into the multi-band multi-element antenna 401 of the antenna assembly 400, in some implementations. For example, any of the multi-band radiator multi-band radiator portions 100, portion 100', multi-band radiator portion 100", dual-band WiFi radiator portions 216, GPS antenna elements 218, multi-band radiator portion 500, multi-band antenna 600, multi-band antenna 700, multi-band antenna 800, multi-band antenna 900, multi-band antenna 1000, stacked patch antenna 1100, and/or multi-band radiator portion 1200 can form part of the multi-band multi-element antenna 401. Additionally, in some implementations, any of the millimeter wave radios 250 described with reference to at least FIGS. 18A-18D can be incorporated into the antenna assembly 400.

Figure 6A:
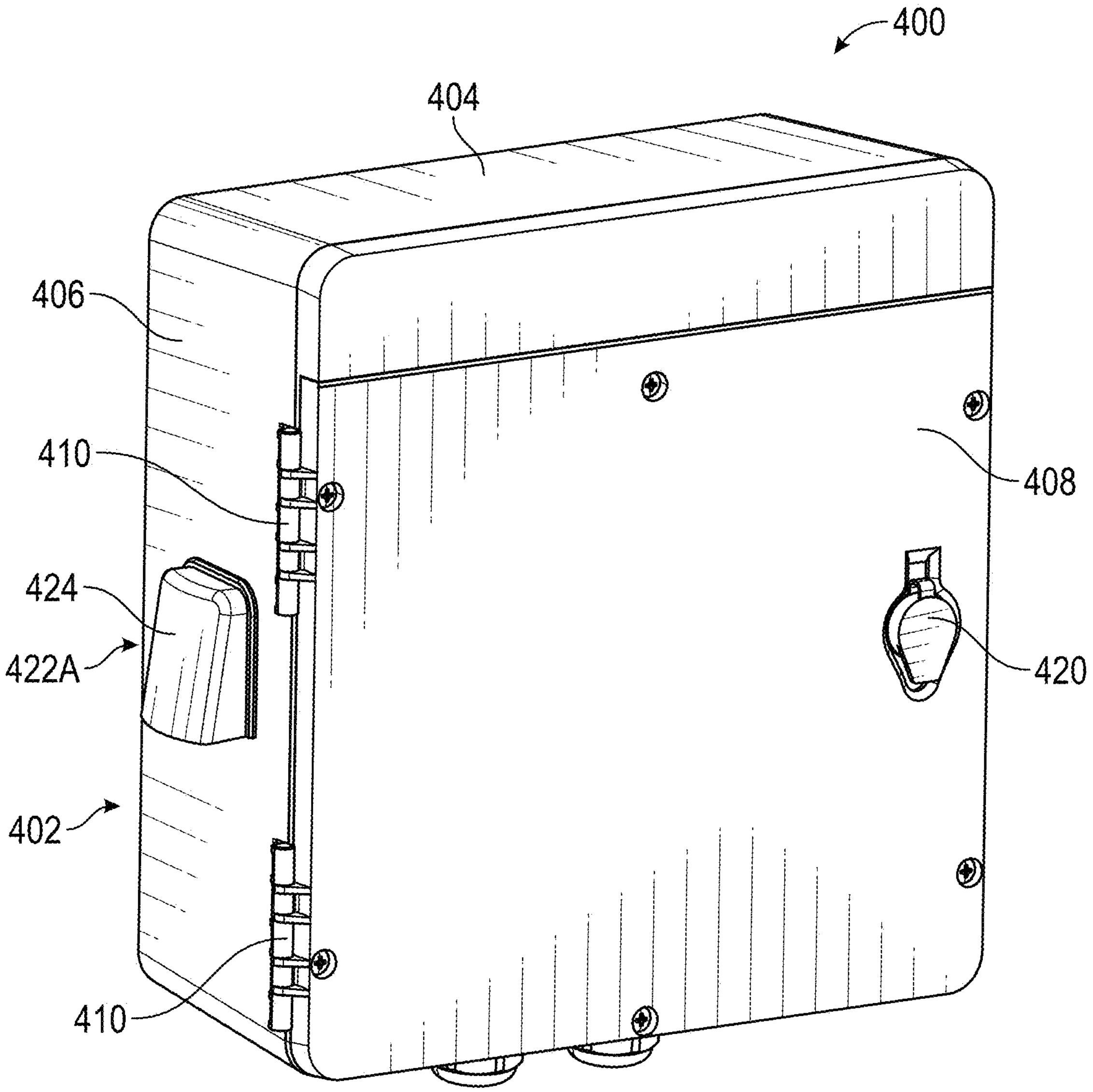
FIG. 6A illustrates a front perspective view of an antenna assembly, in accordance with some aspects of this disclosure.
Figure 6B:
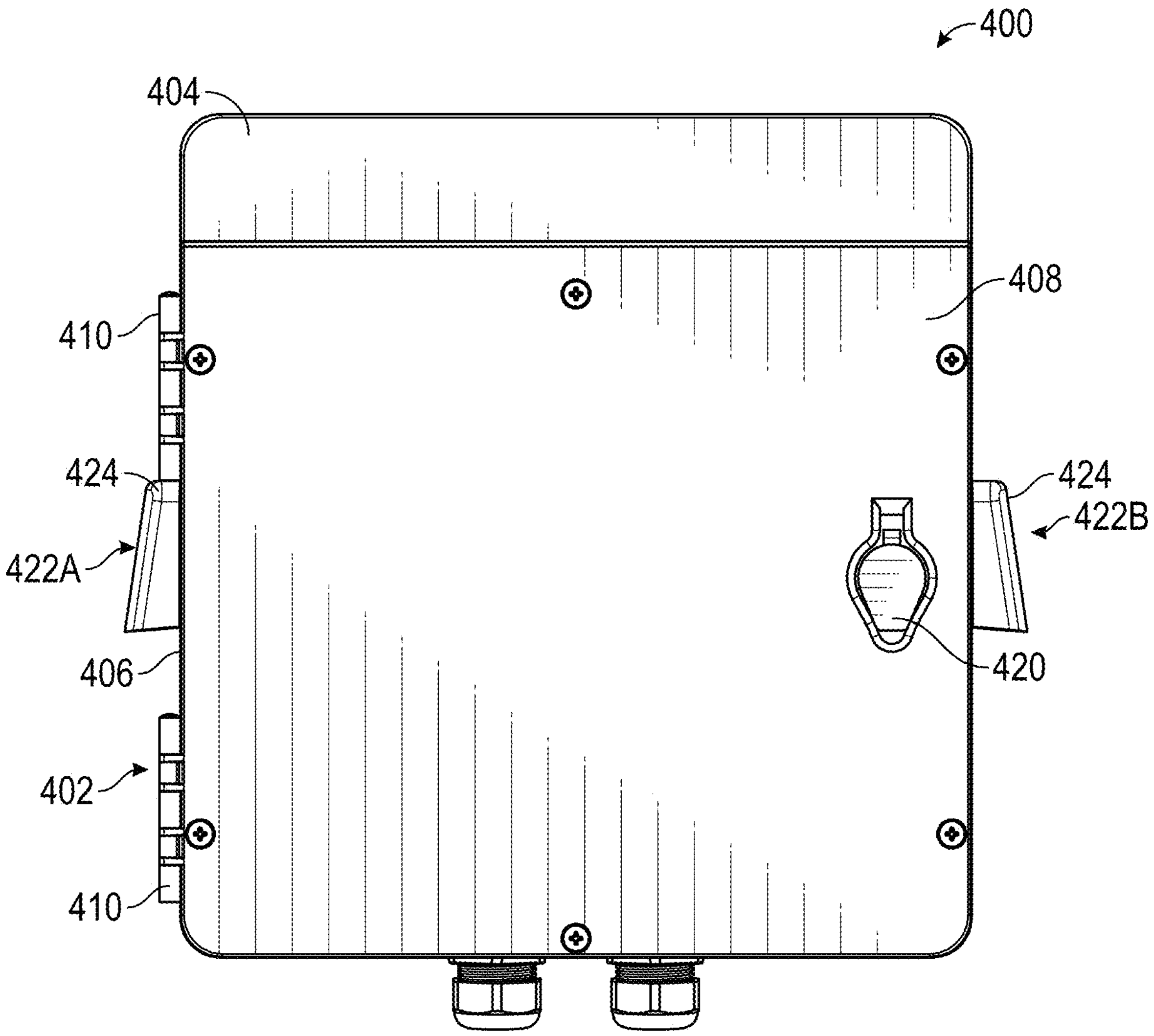
FIGS. 6B and 6C illustrate a front side view and a back side view respectively of the antenna assembly of FIG. 6A, in accordance with some aspects of this disclosure.
Figure 6C:
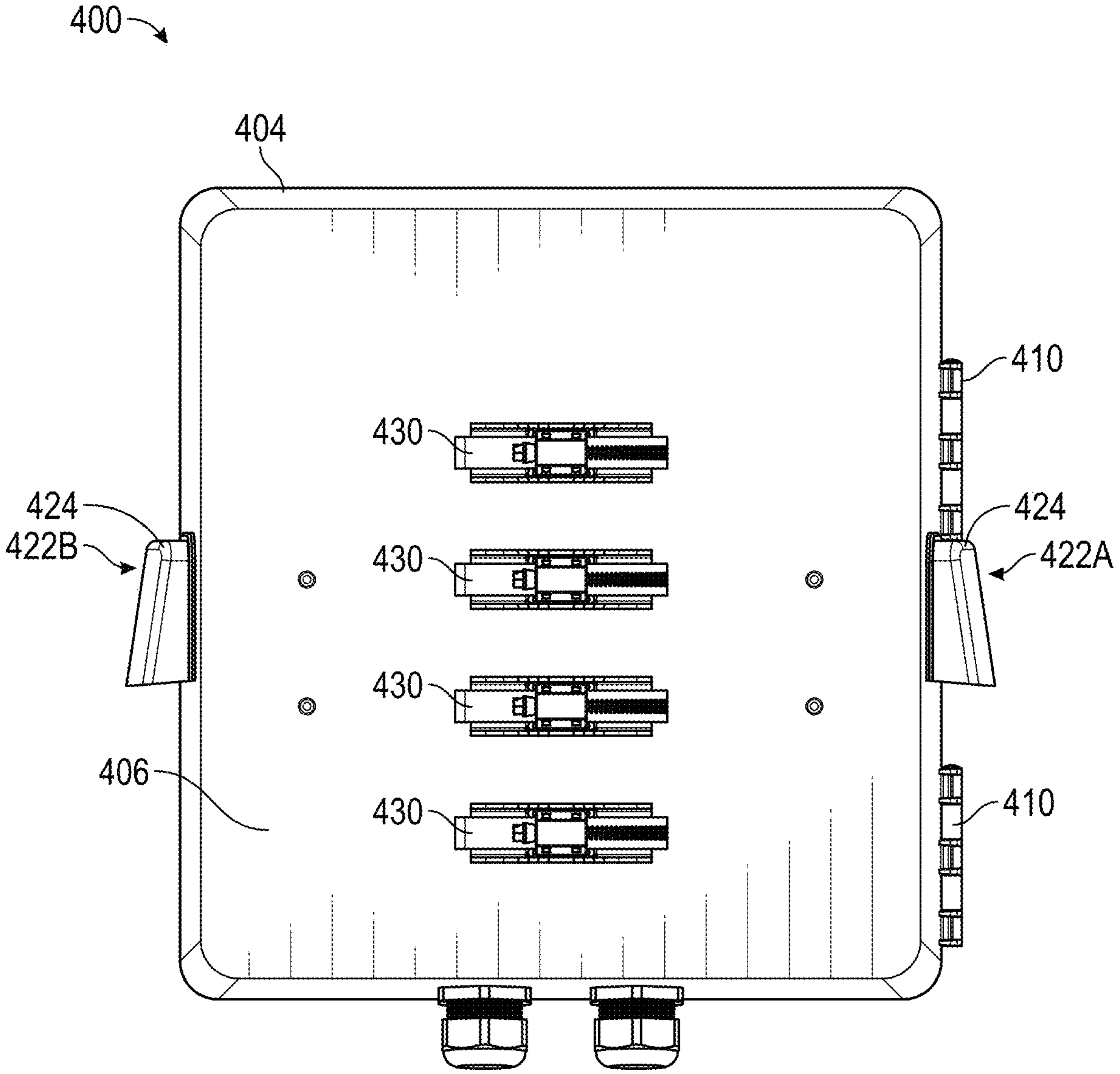
Figure 6D:
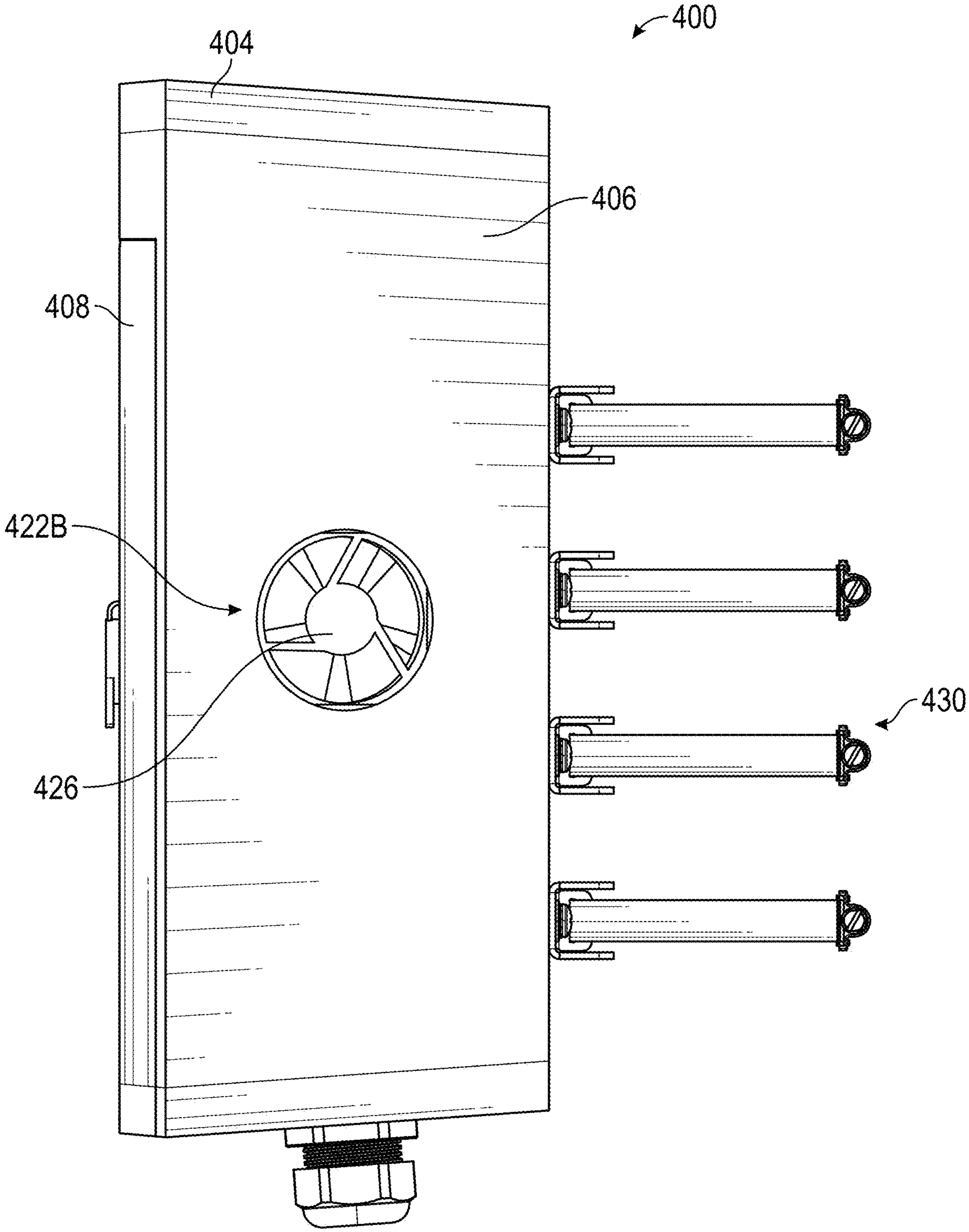
FIG. 6D illustrates a right-side view of the antenna assembly of FIG. 6A, in accordance with some aspects of this disclosure.

FIG. 6A-6D illustrate a front perspective view, a front view, a back view, and a right-side view respectively of the antenna assembly 400. The cover 402 of the antenna assembly 400 may include one or more inlet vents and one of more exhaust vents. For example, as shown in FIGS. 6A-6D, the antenna assembly 400 can include an inlet vent assembly 422A and an exhaust vent assembly 422B. The inlet vent assembly 422A can be formed in a first side wall of the main body 406 and the exhaust vent assembly 422B can be formed in a second opposite side wall of the main body 406. As shown in FIG. 6D, the exhaust vent assembly 422B can include a fan 426. The fan 426 can be configured to pull air out of the first internal volume and exhaust the air to the external environment. The fan 426 can create a negative pressure in the first internal volume that encourages air from the external environment to enter the first internal volume via the inlet vent assembly 422A. In some implementations, the inlet vent assembly 422A can include a screen 428 (see e.g., FIG. 6E) to cover the inlet through the first side wall. The screen 428 can be made of a fine mesh in some cases. The screen 428 can prevent insects and debris from entering the first internal volume. In some cases, the inlet vent assembly 422A and the exhaust vent assembly 422B can include covers 424. The covers 424 can be rain hoods that can provide direct contact resistance to moisture entering the first internal volume from rain, splashing, and/or the like.

Including one or more exhaust and inlet vents 422A, 422B in the antenna assembly 400 can provide a benefit of providing forced air convection for the first internal volume. As explained herein, the first internal volume can be used to support and store various components of the antenna assembly 400, such as batteries, chargers, modems, routers, and/or the like. These components and other components of the antenna assembly 400, such as the multi-band multi-element antenna 401, may generate sufficient heat such that passive convection and conductive cooling may be insufficient for some environments and installations. As such, including the vents 422A, 422B can allow the antenna assembly 400 to operate efficiently in different environments without overheating.

Referring now to FIG. 6C, the antenna assembly 400 can include one or more mounting components 430. The mounting components 430 can be used to mount the antenna system to a wall, a poll, and/or the like. In the illustrated example, the antenna assembly 400 includes four mounting components 430 that are configured as poll clamps. Other numbers of mounting components 430 are possible. The mounting components 430 can be coupled to a back side of the main body 406, which allows the first internal volume of the antenna assembly 400 to be accessed via the door 408 when mounted to a poll or other structure.

Figure 7A:
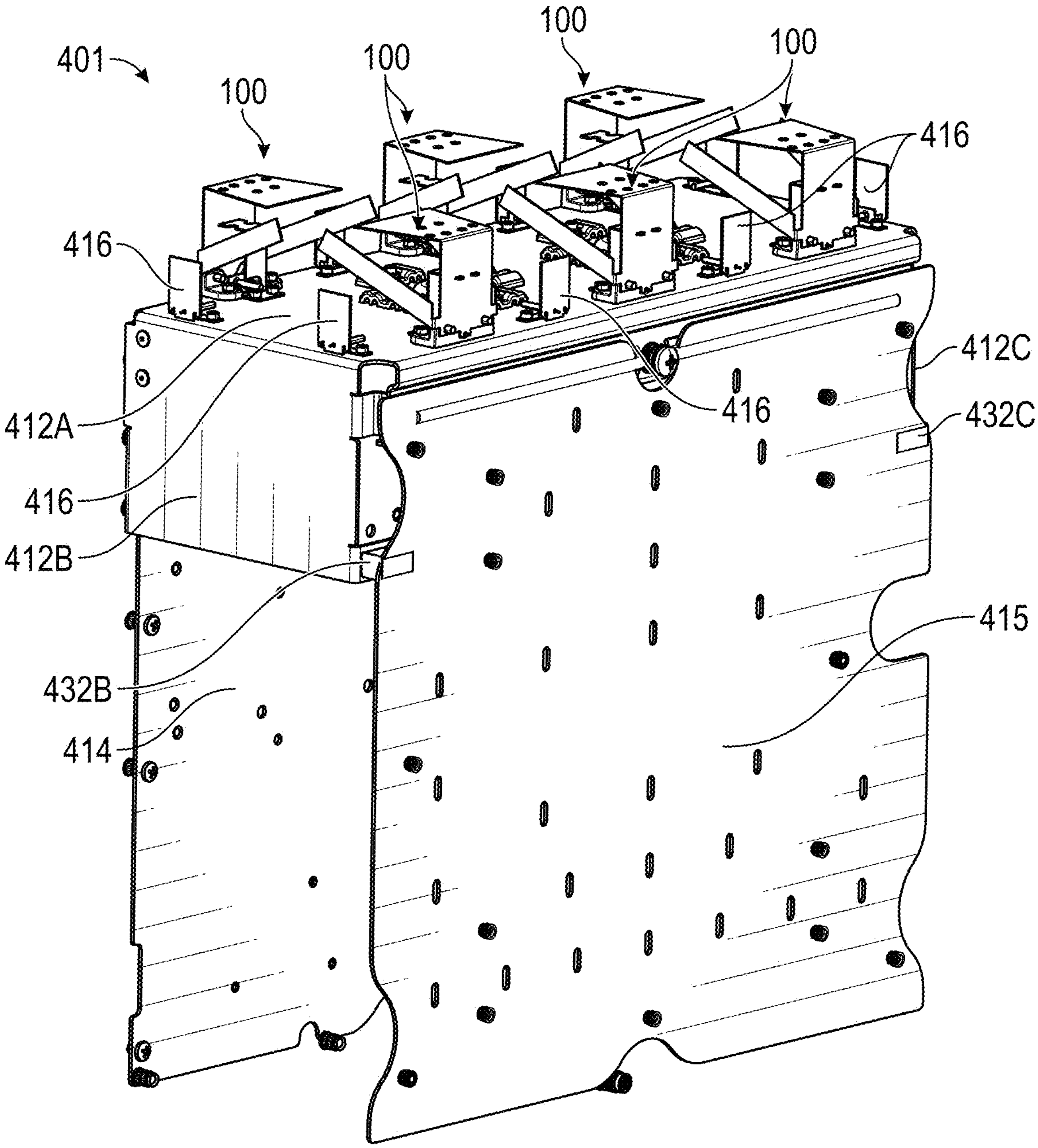
FIG. 7A illustrates a front perspective view of the antenna assembly of FIG. 6A with the cover and radome removed, showing a multi-band multi-element antenna and ground planes of the antenna assembly, in accordance with some aspects of this disclosure.
Figure 7B:
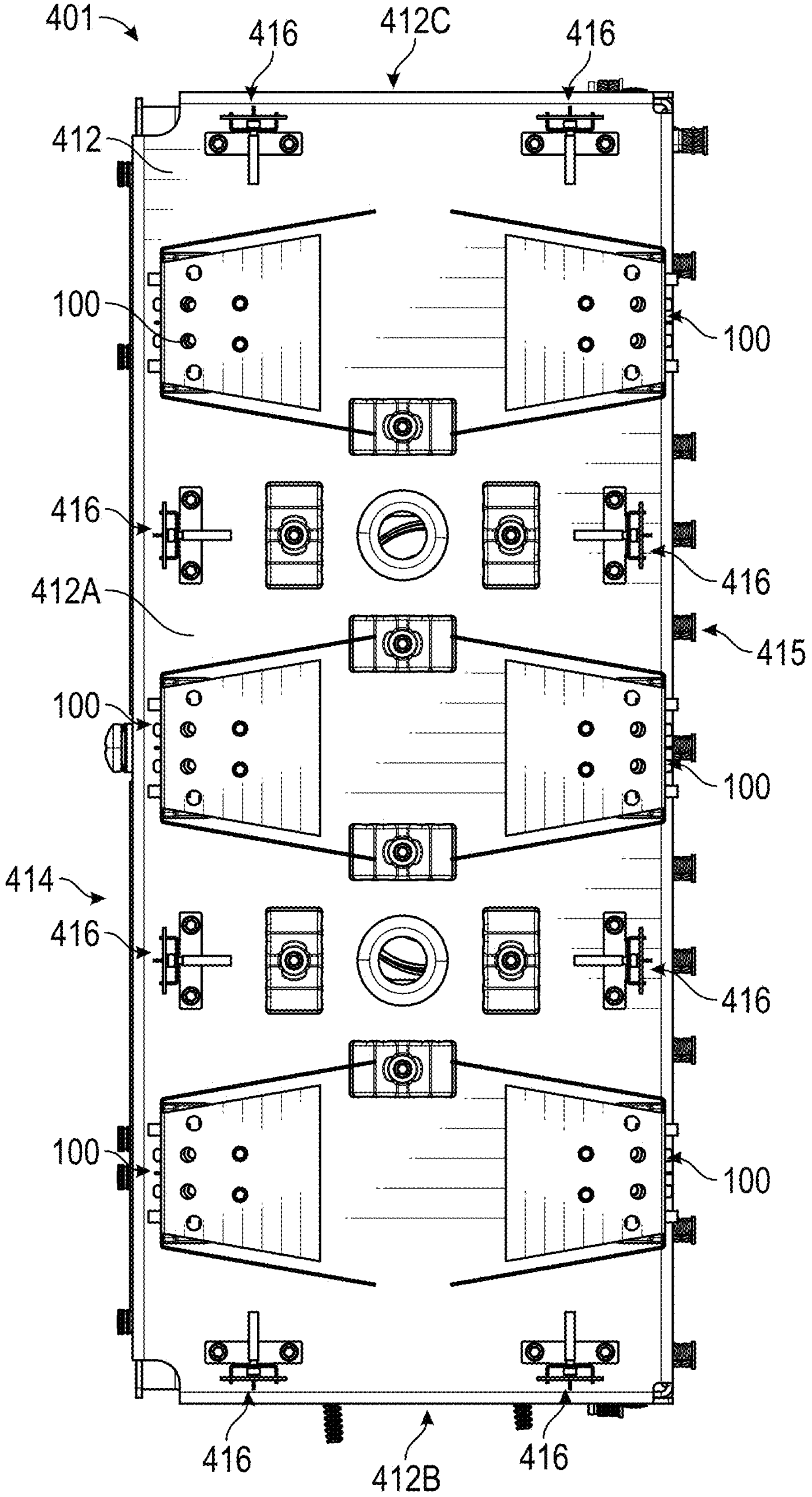
FIG. 7B illustrates a top side view of the multi-band multi-element antenna of the antenna assembly of FIG. 6A, in accordance with some aspects of this disclosure.

Turning now to FIGS. 7A and 7B, a front perspective view and a top view are shown respectively of the antenna assembly 400 with the cover 402 and radome 404 removed to show the multi-band multi-element antenna 401 and the ground planes of the antenna assembly 400. The antenna assembly 400 can include a first ground plane 412, a second ground plane 414, and a third ground plane 415. The multi-band multi-element antenna 401 can be coupled to the first ground plane 412 and housed in the second internal volume within the radome 404. The multi-band multi-element antenna 401 can differ from the multi-band multi-element antenna 201 in the number of first antenna elements 416 and second antenna elements 100 included. For example, as shown in FIGS. 7A and 7B, the multi-band multi-element antenna 401 can include eight first antenna elements 416 and/or six second antenna elements 100. In other implementations, more or fewer antenna elements 100, 416 are possible. The antenna elements 100 can be spaced sufficiently far enough away from one another to allow for independent radiator performance such that six antenna elements 100 can be operating on the first ground plane 412. The antenna assembly 400 can include a GPS antenna (e.g., such as the GPS antenna element 218) housed in the second internal volume. The multi-band radiator portions 100 in FIGS. 7A and 7B each utilize the ground connection 103' (e.g., similar to the multi-band radiator portions 100" of FIG. 3L). As described herein, in other implementations, the ground connection 103' or the ground connection 103" can form part of the multi-band radiator portions 100 or another ground connection can be used to electrically connect the radiating element 101 to the first ground plane 412.

Figure 8:
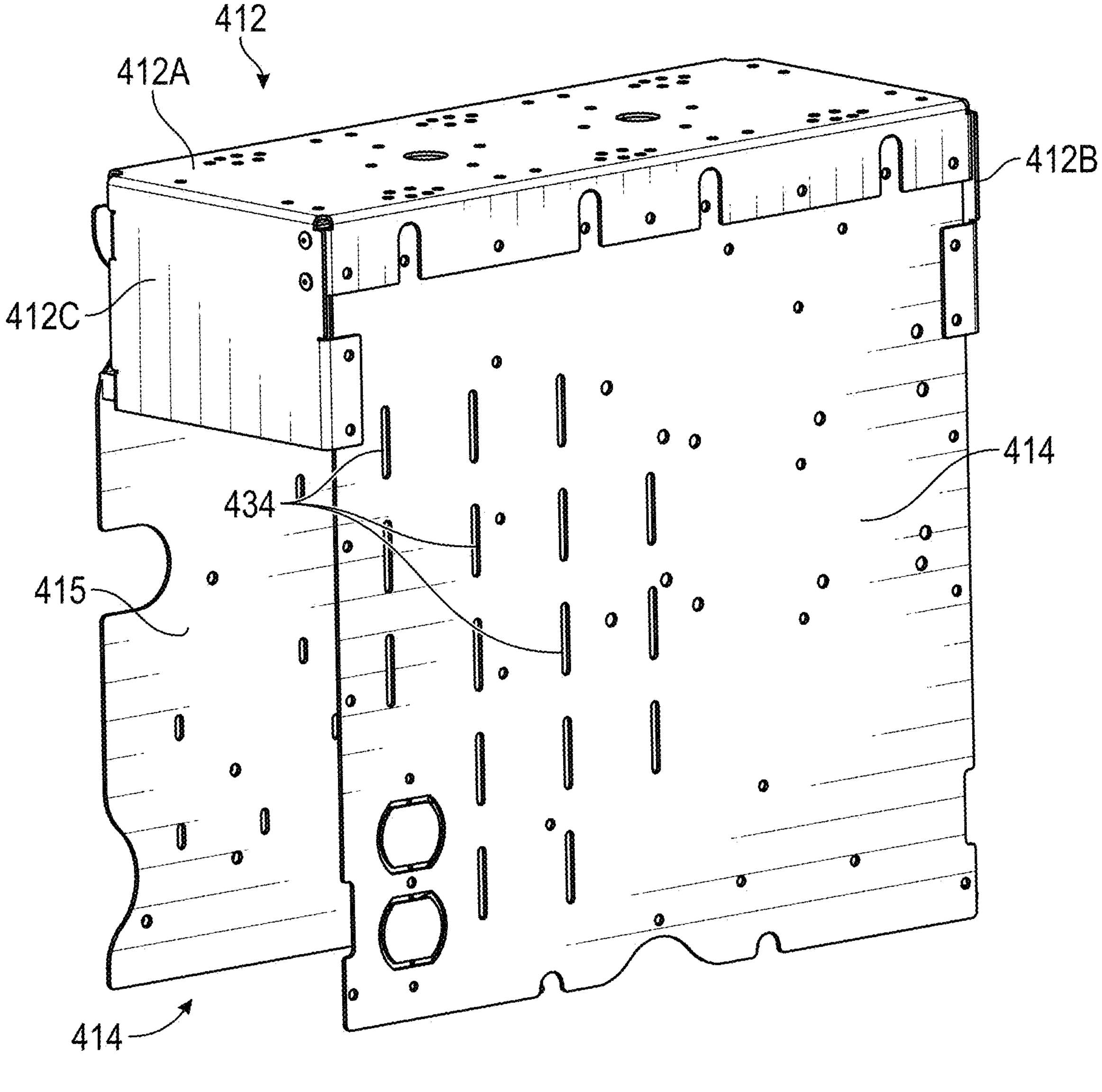
FIG. 8 illustrates a back perspective view of the ground planes of the antenna assembly of FIG. 6A, in accordance with some aspects of this disclosure.

FIG. 8 shows a back perspective view of the ground planes 412, 414, 415. As explained herein, the multi-band multi-element antenna 201 can be mounted to the first ground plane 412. The first ground plane 412 can be the divider between the first internal volume and the second internal volume. The first ground plane 412 can be coupled to and/or electrically connected to the second ground plane 414 and the third ground plane 415. As such, the second ground plane 414 and the third ground plane 415 can be secondary ground planes for multi-band multi-element antenna 401. The first ground plane 412 can include a top portion 412A, a left side portion 412B, and a right-side portion 412C. The right and left side portions 412B, 412C can extend downwardly from the top portion 412A (e.g., away from the radome 404). The second ground plane 414 can be coupled to the main body 406. The second ground plane 414 can be electrically connected to the first ground plane 412 via one or more contact portions (not shown). The contact portions for the second ground plane 414 can be similar or identical to the contact portions 432B, 432C for the third ground plane 415 described further herein. For example, the contact portions can be conductive compressible portions that enable the first ground plane 412 and the second ground plane 414 to be electrically connected when the contact portions are compressed therebetween and easily separated. For example, the first ground plane 412 may be removable from the antenna assembly 400 for servicing of the multi-band multi-element antenna 401. In some implementations, the router(s) (not shown) can be mounted to the second ground plane 414. For example, the second ground plane 414 can include a plurality of mounting slots 434 for mounting the router(s) and/or other components (e.g., wires). Accordingly, the second ground plane 414 can be a router mount plate. Gaps and slots 434 in the second ground plane 414 can be sized to be less than or significantly less than half a wavelength in size at the desired frequency of operation and may not be significant to the performance metrics of the radiator portions of the multi-band multi-element antenna 401. For example, the slots 434 may be less than 1.5 inches in length.

Figure 6E:
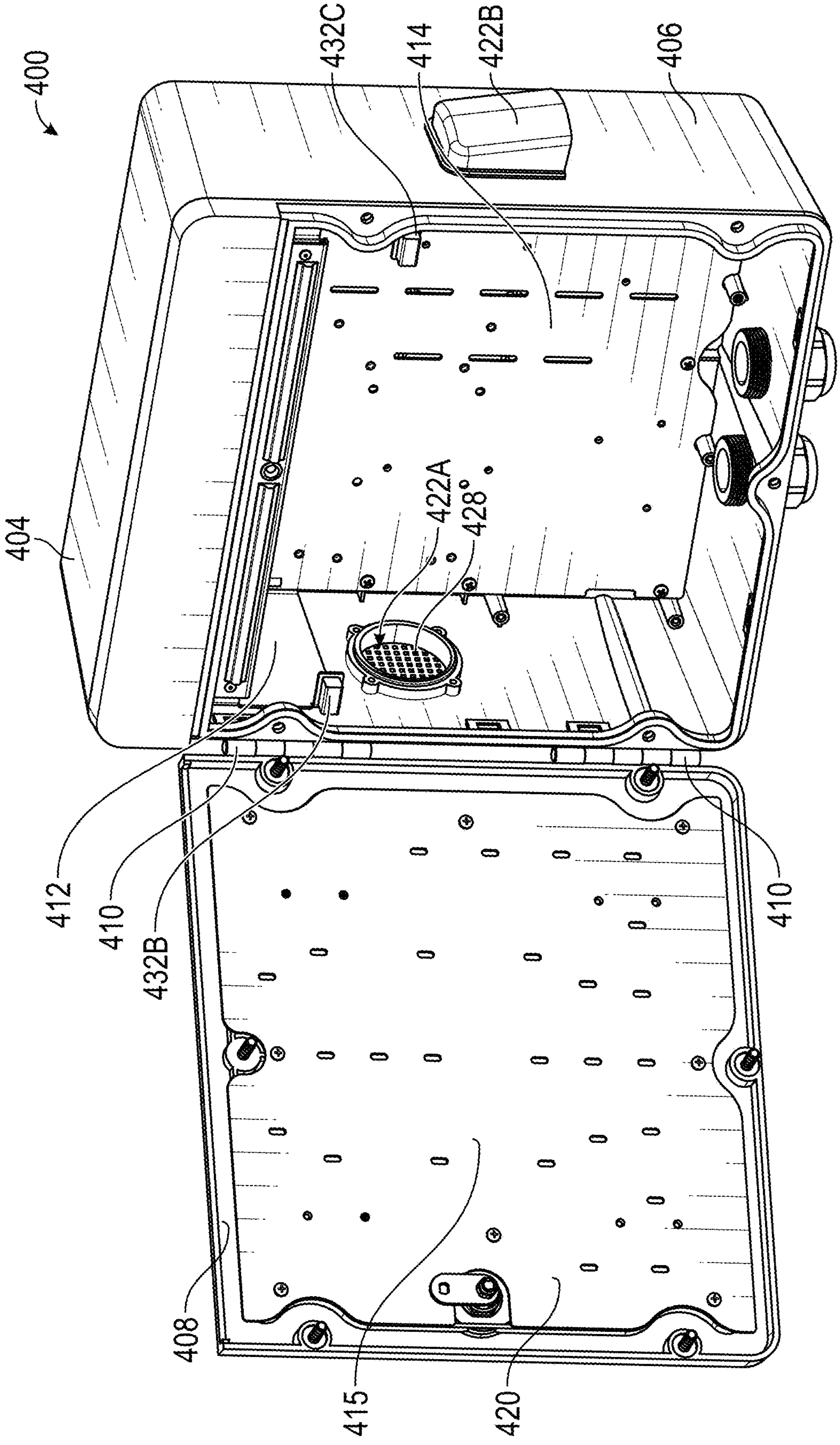
FIG. 6E illustrates a front side view of the antenna assembly of FIG. 6A with a door of a cover of the antenna assembly in an open configuration, in accordance with some aspects of this disclosure.

As shown in at least FIG. 6E, the third ground plane 415 can be coupled to the door 408. As such, when the door 408 is open (e.g., as shown in FIG. 6E), the third ground plane 415 may not be in contact with the first ground plane 412. Conversely, when the door 408 is closed, the third ground plane 415 can be in contact with the first ground plane 412. As shown in FIG. 7A, in some implementations, the first ground plane 412 can include one or more contact portions for connecting the first ground plane 412 to the third ground plane 415. For example, the left side portion 412B can include a first contact portion 432B and the right-side portion 412C can include a second contact portion 432C. The contact portions 432B, 432C are shown through the third ground plane 415 for illustrative purposes. The contact portions 432B, 432C can be compressible and electrically conducive. For example, the contact portions 432B, 432C can be made of a foam or other compressible material covered in a conductive fabric or other conductive material. In other implementations, the contact portions 432B, 432C can be finger stock. When the door 408 is closed, the contact portions 432B, 432C can engage the third ground plane 415, which allows the first ground plane 412 to be in contact with the third ground plane 415. In this arrangement, the first ground plane 412, the second ground plane 414, and the third ground plane 415 form a five-sided box ground plane for the multi-band multi-element antenna 401. The multi-band multi-element antenna 401 can have improved performance when the door 408 is closed and the first ground plane 412, second ground plane 414, and third ground plane 415 are forming the five-side box ground plane, compared to when the door 408 is open.

FIGS. 9A-9F illustrate various views of an antenna assembly 400'. Some features of the antenna assembly 400' are similar or identical to features of the antenna assembly 400 in at least FIGS. 6A-8. Therefore, the structure and description for the various features of the antenna assembly 400 and the operation thereof as described in at least FIGS. 6A-8 are understood to also apply to the corresponding features of the antenna assembly 400' in FIG. 9A-9F, except as described differently. In one example, the antenna assembly 400' can differ from the antenna assembly 400 in the overall size of the main body. For example, the antenna assembly 400' can be a smaller or miniature version of the antenna assembly 400. In some cases, the antenna assembly 400' may include a multi-band multi-element antenna with fewer antenna elements than the antenna assembly 400. In other cases, the antenna assembly 400' may include the same number of antenna elements as the antenna assembly 400.

FIGS. 10A-10J illustrate various views of components of a multi-band radiator portion 500, in accordance with some aspects of this disclosure. Some features of the multi-band radiator portion 500 are similar or identical to features of the multi-band radiator portion 100' in at least FIGS. 4A-4H. Thus, reference numerals used to designate the various features or components of the multi-band radiator portion 100' are identical to those used for identifying the corresponding features of the components of the multi-band radiator portion 500 in FIGS. 10A-10J, except that the numerical identifiers for the multi-band radiator portion 500 begin with a "5" instead of a "1" and do not end with a "prime". Therefore, the structure and description for the various features of the multi-band radiator portion 100' and the operation thereof as described in at least FIGS. 4A-4H are understood to also apply to the corresponding features of the multi-band radiator portion 500 in FIGS. 10A-10J, except as shown and described differently. Additional disclosure regarding antenna systems and assemblies including the multi-band radiator portions 500 of FIGS. 10A-10H is further described in U.S. Provisional Application No. 63/637,247, filed Apr. 22, 2024, entitled "Antenna Systems," the entire contents of which is hereby incorporated by reference herein in its entirety. The disclosure and Figures in U.S. Provisional Application No. 63/637,247 can be used in connection with the disclosure and Figures described and shown herein.

One or more multi-band radiator portions 500 can form part of any of the multi-band multi-element antennas described herein (e.g., the multi-band multi-element antenna 201 of the antenna assembly 200, the multi-band multi-element antenna of the antenna assembly 300, the multi-band multi-element antenna 401 of the antenna assembly 400, the multi-band multi-element antenna of the antenna assembly 400', etc.). In FIGS. 10A-10H, particular reference is made to various components of the antenna assembly 400 and how those components interact with the multi-band radiator portion 500. However, it is recognized that one or more multi-band radiator portions 500 may be integrated into any of the antenna assemblies 200, 300, 400, and/or 400'. In particular, one or more of the multi-band radiator portions 100' and/or multi-band radiator portions 100 of the antenna assemblies 200, 300, 400, and/or 400' may be replaced with one or more of the multi-band radiator portions 500.

Figure 9A:
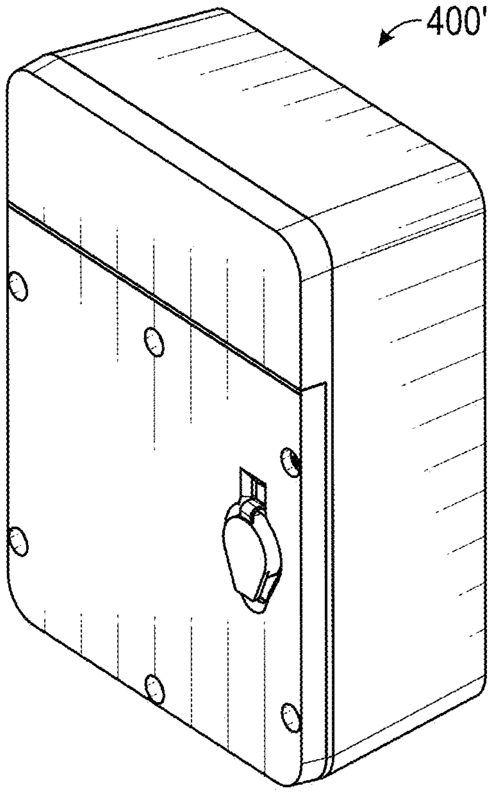
FIGS. 9A-9F illustrate various views of an antenna assembly, in accordance with some aspects of this disclosure.
Figure 9B:
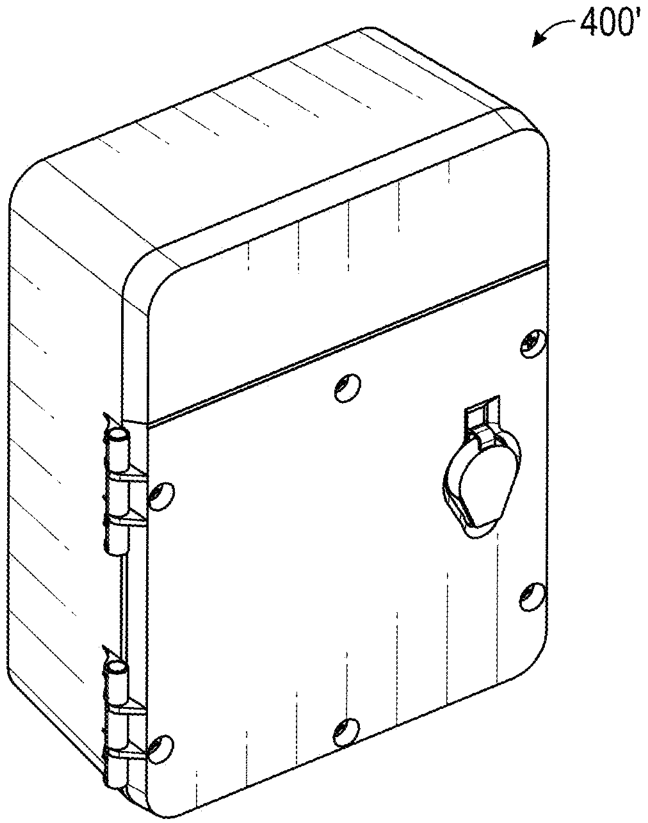
Figure 9C:
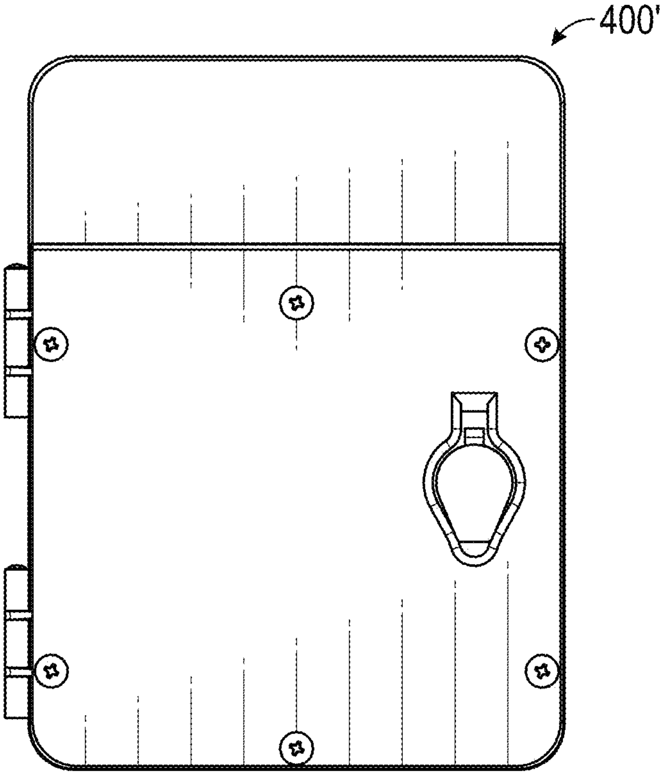
Figure 9D:
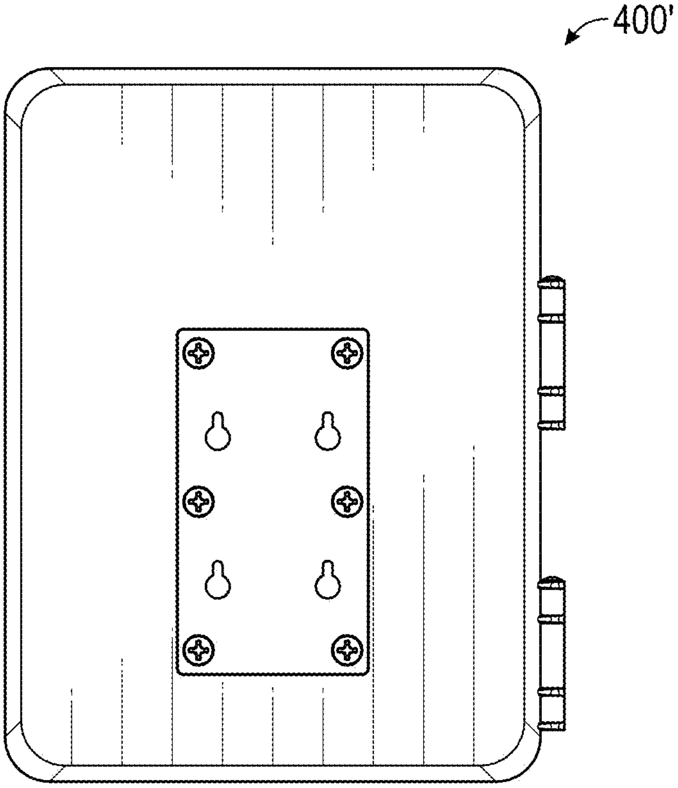
Figure 9E:
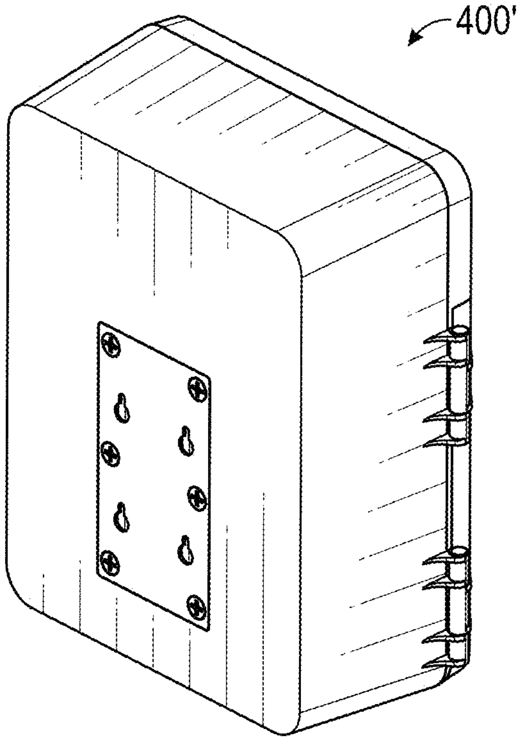
Figure 9F:
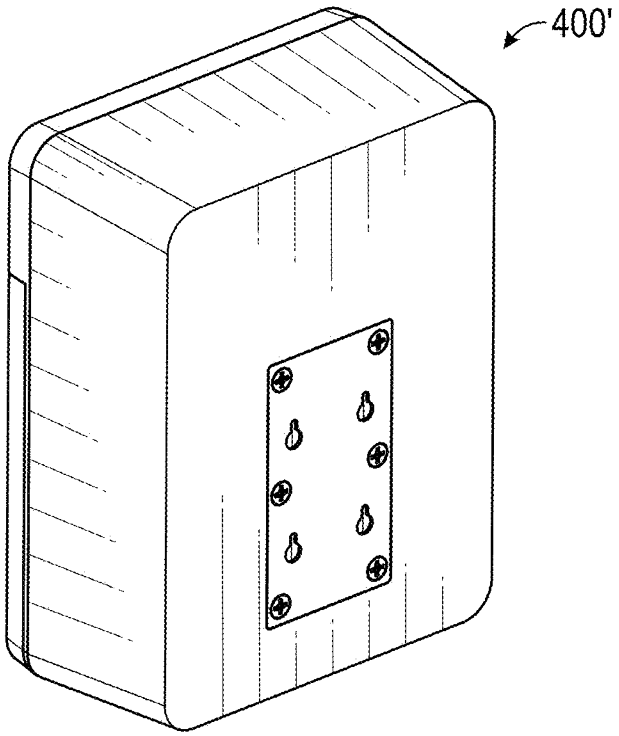
Figure 10B:
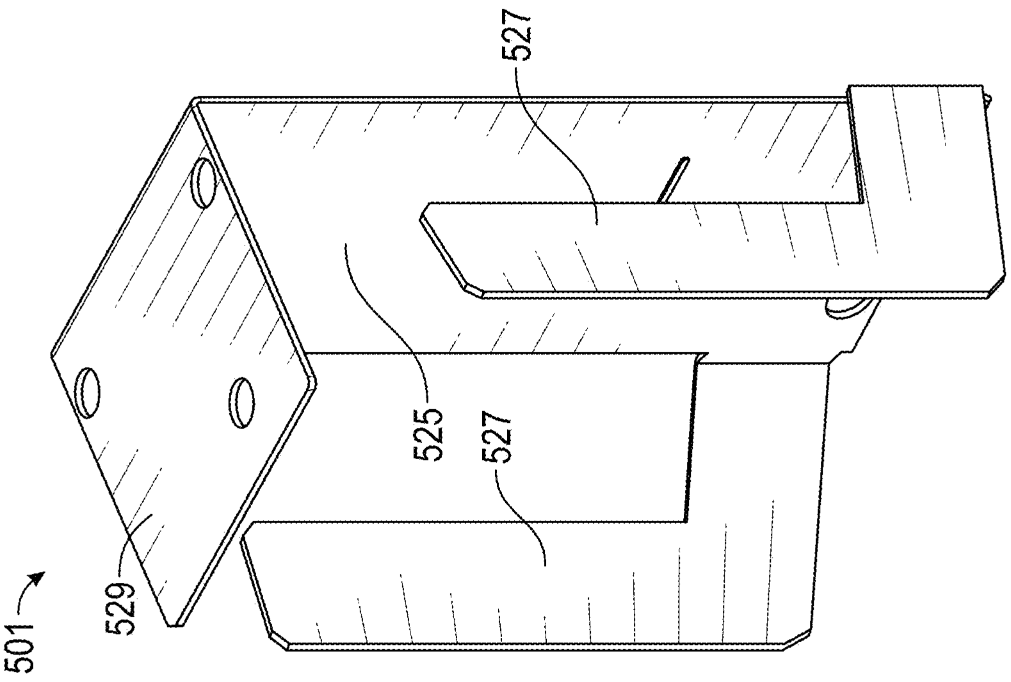
FIGS. 10A-10J illustrate various views of components of another implementation of a multi-band radiator portion that can be included in any antenna assembly described herein, in accordance with some aspects of this disclosure.
Figure 10A:
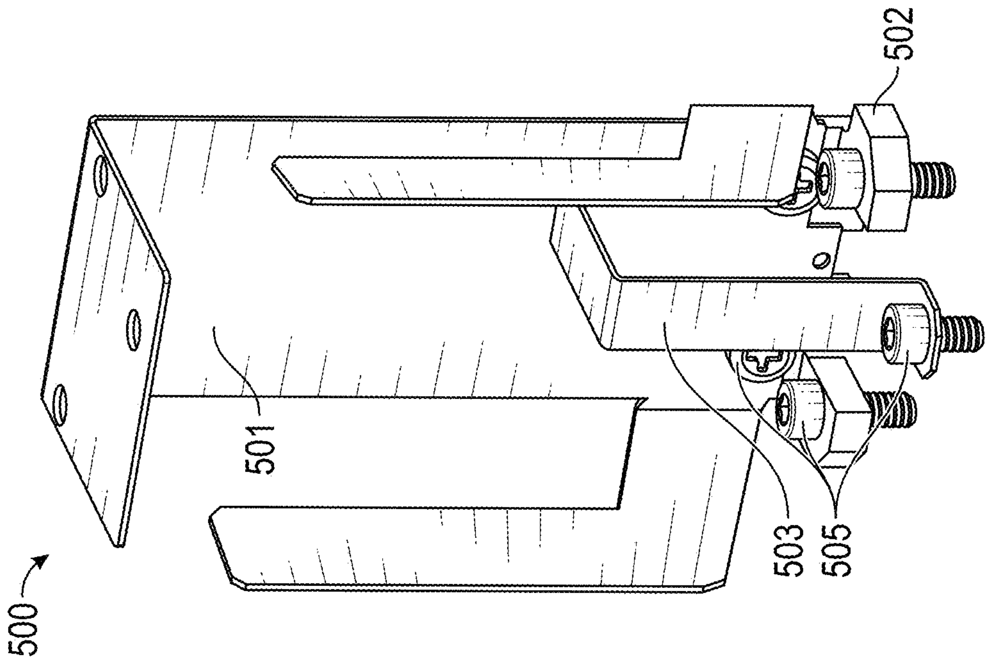

Each multi-band radiator portion 500 can include a multi-band radiating element 501 and a ground connection 503 (also referred to herein as a "grounding portion"). The ground connection 503 is configured to couple multi-band radiating element 501 a ground plane, such as the first ground plane 412 of the antenna assembly 400. FIG. 10A shows a perspective view of the multi-band radiating element 501 and the ground connection 503 coupled together and secured to a mounting portion 502. As shown in FIG. 10A, fasteners 505 can be used to secure the multi-band radiating element 501 to the mounting portion 502. The fasteners 505 can also be used to secure the mounting portion 502 and the ground connection 503 to the first ground plane 412. FIGS. 10B0-10F illustrate assorted views of the multi-band radiating element 501. FIGS. 10G-10J illustrate assorted views of the ground connection 503. It is recognized that the multi-band radiator portion 500 described herein is just one example of multi-band radiator portions that can be included in the antenna assemblies described herein. In other implementations, different multi-band radiator portions can be included. In the illustrated implementation, the radiating element 501 and the ground connection 503 are constructed of metal (e.g., a conductive sheet). In some cases, the conductive sheet can have a thickness between 0.01 inches and 0.03 inches. In other implementations, the radiating element 501 and/or ground connection 503 could be constructed out of several rigid PCB portions or a single flex circuit PCB (e.g., supported by the radome 404 or another RF-transparent supporting structure). For example, the formed three-dimensional multi-band radiator portions 500 described with reference to FIGS. 10A-10J can be supported by PCB structures, sheet metal, or other conductive surfaces that hold their three-dimensional shape, configured and adapted to be housed within the radome 404 along with other multi-band radiator portions (e.g., other multi-band radiator portions 500). The three-dimensional multi-band radiator portions can be paired with one or more formed ground plane(s), such as the first ground plane 412, that can permit a frequency range of 450 MHz to 8 GHz, which can provide a wider range of frequencies than antenna systems currently known in the art, with improved cost effectiveness and simplicity of manufacture. The multi-band radiator portion 500 allow for the antenna to be compact, making it ideal for compact 3GPP or other telecommunication transmitters, in some implementations.

According to some implementations, when the multi-band radiator portion 500 are configured as PCB portions, a tab and slot configuration in the PCB material is used to mechanically locate the individual PCB portions. When appropriate, in some implementations the tab and slot arrangements are then soldered. The soldering process can be used to provide a mechanical and/or electrical connection between the individual PCB portions or one or more sheet metal portions. In some implementations, there are electrically conducting features on one surface of the PCB support material. In other implementations, both sides of the PCB support material are used to for supporting the electrically conducting features. The same surface of any one particular surface of the PCB support material can have separate electrically conducting features that perform different functions for the multi-band antenna system or for an individual multi-band radiating element. In other implementations, one or more sheet metal portions can be configured with optional portions of electrically non-conductive material to provide a similar form and function to that of a PCB portion. The use of mechanical threaded fasteners, heat stakes, keyhole slots, pressure sensitive adhesive, soldering, interlocking, and other coupling techniques may be exploited to couple portions of the multi-element multi-band antenna 402. These coupling techniques are used to firmly hold structures and components in place and/or in contact with one another. In some implementations, the coupling techniques provide an important role in establishing and maintaining a direct electrical connection between two components. In other implementations, the coupling techniques are used to establish firm contact between two surfaces that are electrically conductive. In some implementations, the coupling techniques provide structural integrity between one or more components where one or more portions is electrically non-conductive. In some implementations, one or more of the radiating elements are electromagnetically excited by an individual coaxial transmission line (e.g., one coaxial transmission line for each of the radiating elements). In other implementations, the one or more of the radiating elements are electromagnetically excited by a microstrip, stripline, conductor backed coplanar waveguide, parallel plate, twin lead, wire above a groundplane, or other suitable microwave or telecommunication transmission line.

Referring first to FIGS. 10B-10F, various views of the multi-band radiating element 501 are shown. The multi-band radiating element 501 can define a three-dimensional radiating portion that includes several unique portions. The geometry of these unique portions are configured in a way that the radio frequency energy that is radiated by the multi-band radiator portion 500 has an intended direction that is nearly parallel to a groundplane that the multi-band radiator portion 500 is coupled to (e.g., the first ground plane 412). When one or more multi-band radiator portions 500 are incorporated into the multi-band multi-element antenna 401, a radiation intensity that is somewhat stable around its circumference is a typical requirement for the radiation profile for antennas servicing customer premises equipment. This is radiation that is in the same plane or only slightly above the plane of the first groundplane 412 and of somewhat equal intensity at a fixed radial distance away from multi-element multi-band antenna 401 of FIG. 7A in the plane of the first groundplane 412. This type of radiation pattern is known as omni-directional for those familiar with wireless telecommunication technology.

Figure 10C:
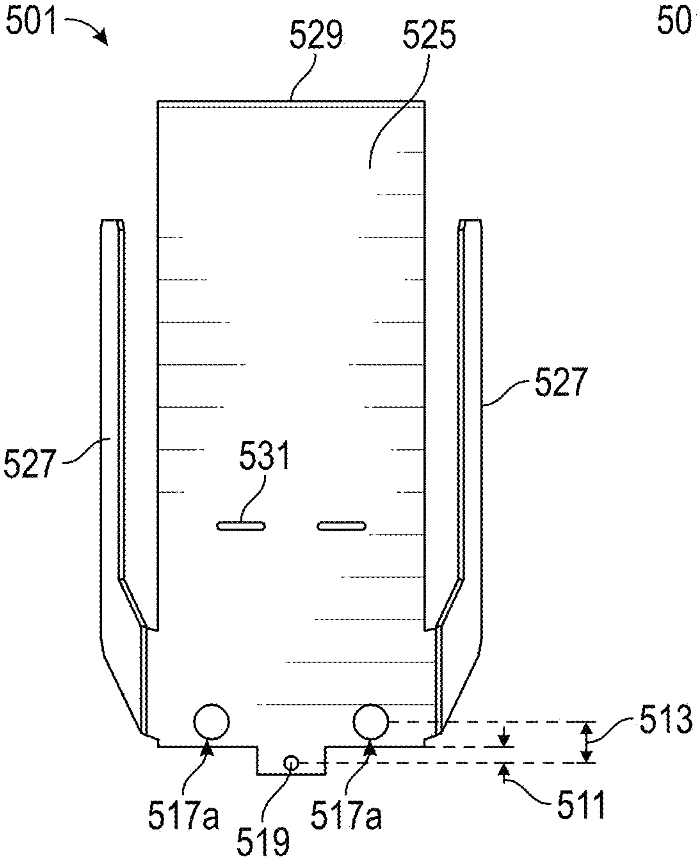

With continued reference to FIGS. 10B-10F, the geometry of the multi-band radiator portion 500 can allow for close proximity spacing of other radiating elements of the multi-band multi-element antenna 401 on the first ground plane 412. To accommodate this close spacing, the height of the multi-band radiating element 501 can be greater than other three-dimensional inverted F antennas. For example, the multi-band radiating element 501 may have a greater height than the radiating element 101 of at least FIG. 3A and/or the radiating element 101' of at least FIG. 4A. To obtain close proximity spacing between the radiating elements of the multi-band multi-element antenna 401 on the first ground plane 412, the geometry of the multi-band radiating element 501 has several unique features. As shown in FIG. 10C, the multi-band radiating element 501 of the multi-band radiator portion 500 can include a feed portion 519, a first low-band radiating portion 525 and/or a second low-band radiating portion 529. The multi-band radiating element 501 can also include one or more arms 527. The one or more arms 527 can be configured to radiate above the low-band. Accordingly, the arms 527 may be referred to as "high-band radiating portions". For example, the one or more arms 527 can be configured for radiation in the mid-band and/or in the C-band. In the illustrated example, the multi-band radiating element 501 includes two arms 527. In other implementations, more or less arms 527 are possible. Further, in other implementations, the arms 527 or additional/alternative arms can be included in the radiating element 501 and configured for radiation in the high band Wi-Fi band. The illustrated example of the multi-band radiating element 501 does not include secondary arms. However, in some implementations, the multi-band radiating element 501 may include additional arms that are similar or identical to the secondary arms 137' of the radiating element 101' of at least FIG. 4A. The feed portion 519 can extend from the bottom of the first low band radiating portion 525. The first low band radiating portion 525 can include one or more mounting features 517*a* (e.g., holes) to facilitate mounting the multi-band radiating element 501 to the first ground plane 412. For example, as shown in FIG. 10A, the holes 517*a* can receive fasteners 505 to couple the multi-band radiating element 501 to the mounting portion 502. The mounting portion 502 can then be coupled to the first ground plane 412 (e.g., using additional fasteners). The first low band radiating portion 525 can extend substantially vertically from the ground plane 412. Accordingly, in some implementations, the first low band radiating portion 525 can be an upright portion of the radiating element 501. The upright portion 525 can have a smaller width than other antennas. For example, the upright portion 525 may have a smaller width that the upright low band radiation portion 125 of the radiating element 101 of FIG. 3A and/or a smaller width that the upright low-band radiation portion 125' of the radiating element 101' of FIG. 4A. The upright portion 525 can have a larger height than width. In some implementations, the upright portion 525 can have a height to width ratio that is 2:1 or greater. The upright portion 525 can include a coupling point 531. The coupling point 531 can be used to couple the radiating element 501 to the ground portion 503 (e.g., in a similar or identical manner as the slots 131' of the multi-band radiator portion 100'). The upright portion 525 can be used for all portions of the desired frequency band of operation to support the radio frequency requirements for the desired frequency band of operation.

Figure 10D:
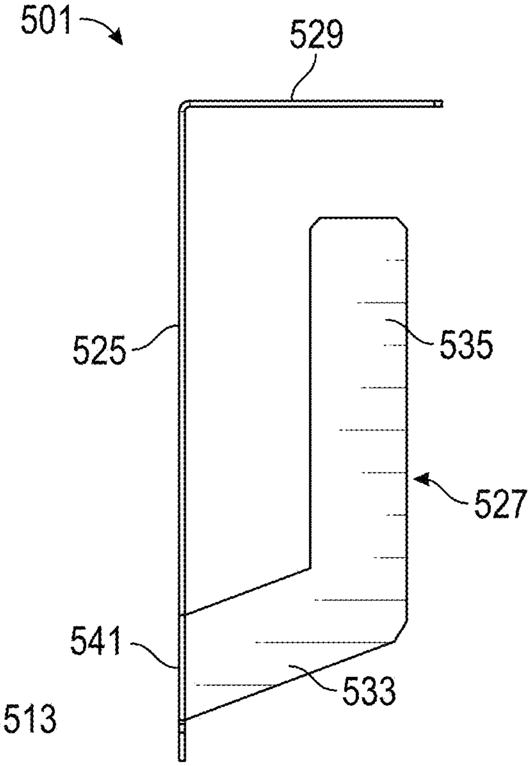
Figure 10E:
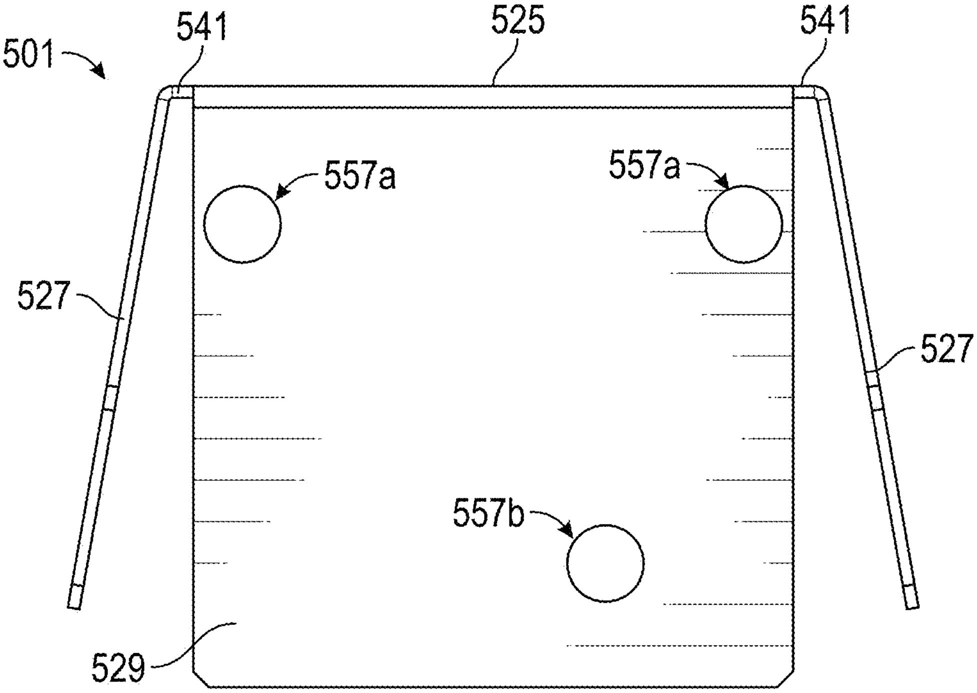
Figure 10F:
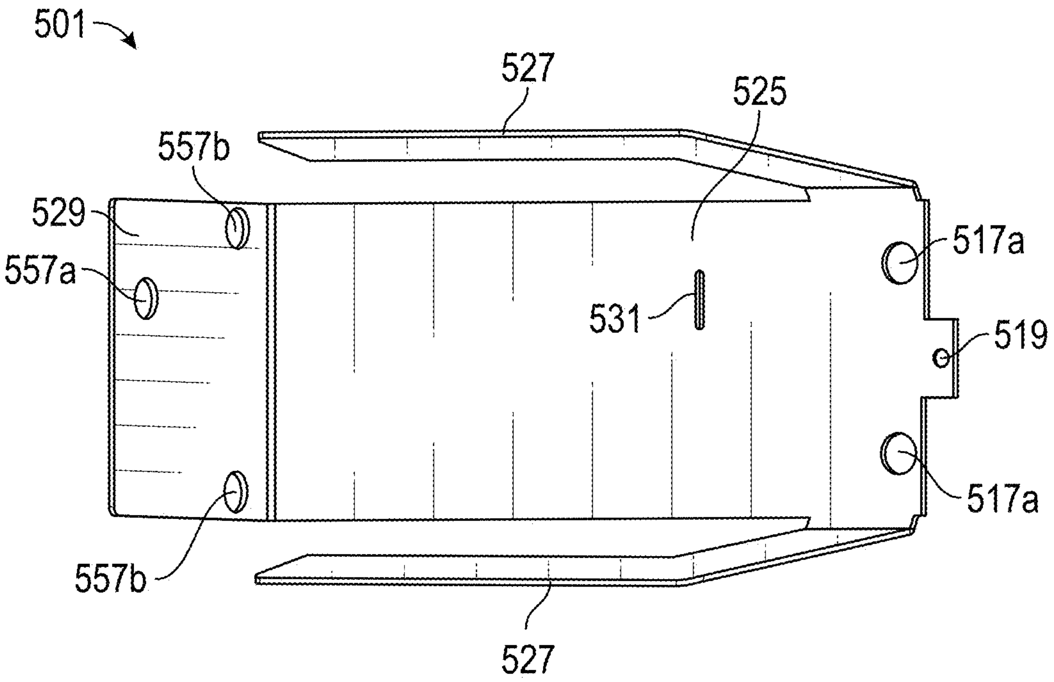
Figure 10G:
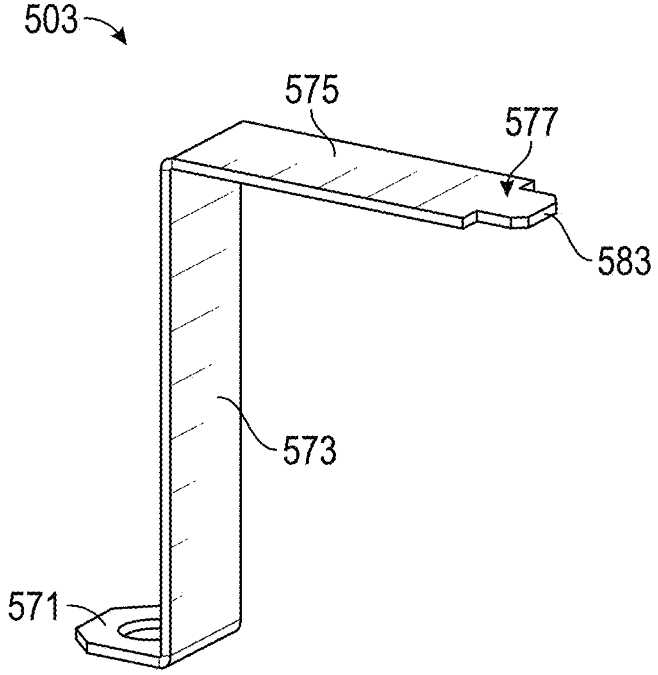
Figure 10H:
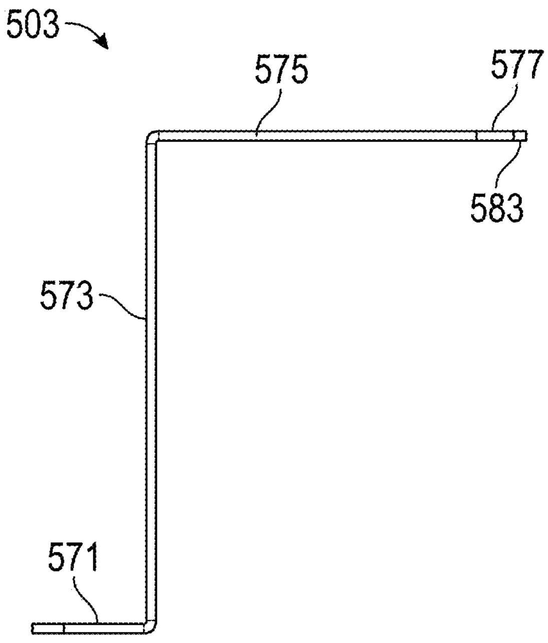
Figure 10I:
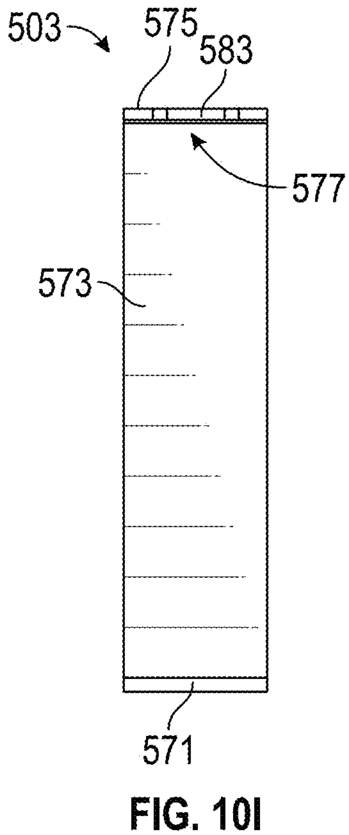
Figure 10J:
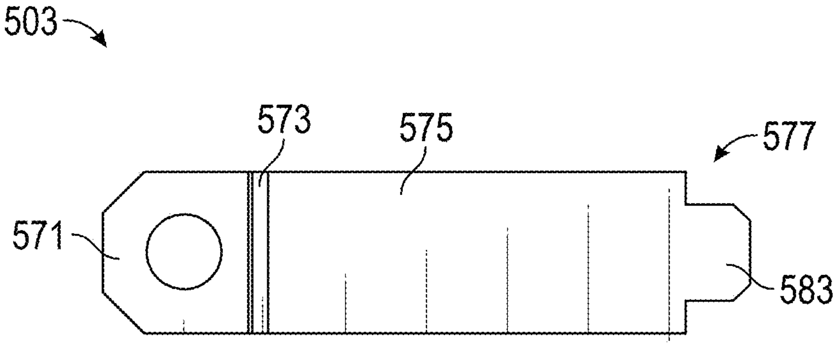

The radiating element 501 can include one or more connecting portions 541 for connecting the upright portion 525 to the arms 527. For example, the radiating element 501 can include a first connecting portion 541 for connecting a left arm 527 to the upright portion 525 and a second connecting portion 541 for connecting a right arm 527 to the upright portion 525. With reference to FIG. 10E, the connecting portions 541 can extend a short distance from the upright portion 525 to reduce the overall width of the radiating element 501. In the illustrated example, the arms 527 extend away from the upright portion 525. For example, a greater than 90-degree angle is defined between each arm 527 and the upright portion 525. The arms 527 can extend in substantially the same direction that the upright portion 525 faces. In some implementations, the arms 527 can extend at an angle away from the upright portion 525. The arms 527 can initially extend substantially horizontally from the upright portion 525. The arms 527 can include one or more bend portions. For example, as shown in FIG. 10D, each arm 527 can include a first arm portion 533 that extends from the connecting portion 541 and a second arm portion 535 that extends from the first arm portion 533. The second arm portion 535 can extend approximately vertically from the first arm portion 533. When multiple arms 527 are included, as in the illustrated example, the arms 527 can be similar or identical except that the left arm 527 extends from the left side of the upright portion 525 and the right arm 525 extends from the right side of the upright portion 525. The arms 527 may have a shorter height than the upright portion 525. The second arm portion 535 of the arms 527 can be used to collectively support radiation in the 1.6 GHz to 8 GHz frequency band for the arms 527.

The radiating element 501 can optionally include the second low band radiator portion 529 to aid in accomplishing radiation in the low-band (e.g., approximately 600 MHz to 900 MHZ). The second low band radiating portion 529 can extend from the top of the upright portion 525. In some implementations, the second low band radiating portion 529 can be a head radiating element and can extend at a substantially perpendicular angle from the upright portion 525. The length of low band radiator portion 529 is significantly shorter than other radiating structures to accommodate the closer spacing of neighboring antenna elements. For example, the second low band radiating portion 529 may have a shorter length that the second low band radiation portion 129 of the radiating element 101 of FIG. 3A and/or a shorter length that the second low-band radiation portion 129' of the radiating element 101' of FIG. 4A. The additional height of upright portion 525 allows for a shorter than typical second low band radiating portion 529. The ratio and orientation of all portions of radiating element 501 allow for both dominate and higher order modes to support a somewhat omni-directional radiation characteristic for the multi-band radiator portion 500.

Referring now to FIGS. 10G-10J, various views of the ground connection 503 of the multi-band radiator portion 500 are shown. In the illustrated examples, the grounding portion 503 is made of sheet metal. In other implementations, one or more PCB portions with electrically conducting surfaces on one or more sides or layers may be used for the ground connection 503. In this implementation, coupling points 571 and 5843 are present to electrically couple to the ground plane (e.g., the first ground plane 412) and radiating element 501, respectively. The width, thickness and height of portions 573 and 575 are selected so that the desired radiation pattern characteristics are maintained while providing an impedance match between the multi-band radiating element 501 and the characteristic impedance of the radio frequency transmission lines that connect the radio that is part of the 5G wireless communication link to the multi-element multi-band antenna 401 of FIG. 7A. The ground connection 503 can function in a similar manner as the ground connection 103' of the multi-band radiator portion 100' of FIG. 4B.

In some implementations, different antennas may be incorporated into any of the antenna assemblies described herein. For example, an off-the-shelf antenna in its full package (e.g., with a radome and secured to a base and/or ground plane) can replace the multi-band multi-element antenna (e.g., the multi-band multi-element antenna 401) of the antenna assemblies described herein, typically resulting in reduced performance. Such an off-the-shelf antenna could be positioned or secured to a ground plane (e.g., the first ground plane 412) and positioned beneath a radome of the respective antenna assembly (e.g., the radome 404).

FIGS. 11A-15B illustrate various views of different multi-band antennas that can form part of any of the multi-band multi-element antennas described herein (e.g., the multi-band multi-element antenna 201 of the antenna assembly 200, the multi-band multi-element antenna of the antenna assembly 300, the multi-band multi-element antenna 401 of the antenna assembly 400, the multi-band multi-element antenna of the antenna assembly 400', etc.). In FIGS. 11A-15B, particular reference is made to various components of the antenna assembly 400 and how those components interact with the various multi-band antennas. However, it is recognized that multi-band antennas of FIGS. 11A-15B may be integrated into any of the antenna assemblies 200, 300, 400, and/or 400'. In particular, one or more of the multi-band radiator portions 100' and/or multi-band radiator portions 100 of the antenna assemblies 200, 300, 400, and/or 400' may be replaced with one or more of multi-band antennas of FIGS. 11A-15B.

Figure 11A:
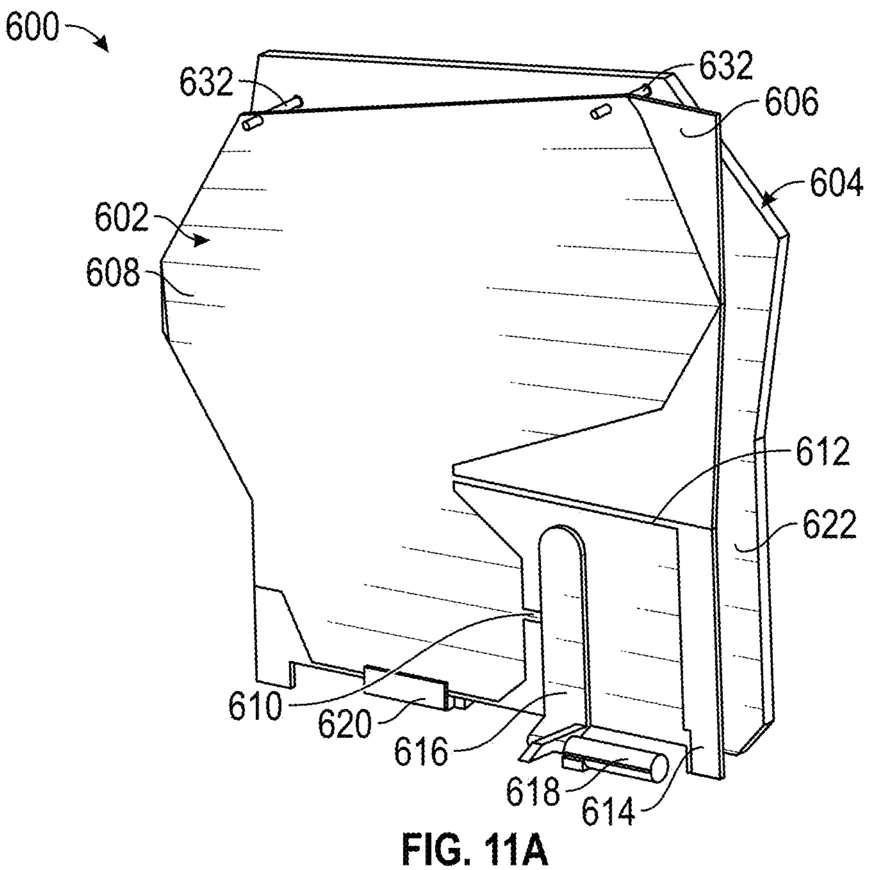
FIGS. 11A-11C illustrate various views of an implementation of a multi-band antenna that can be included in any antenna assembly described herein, in accordance with some aspects of this disclosure.
Figure 11B:
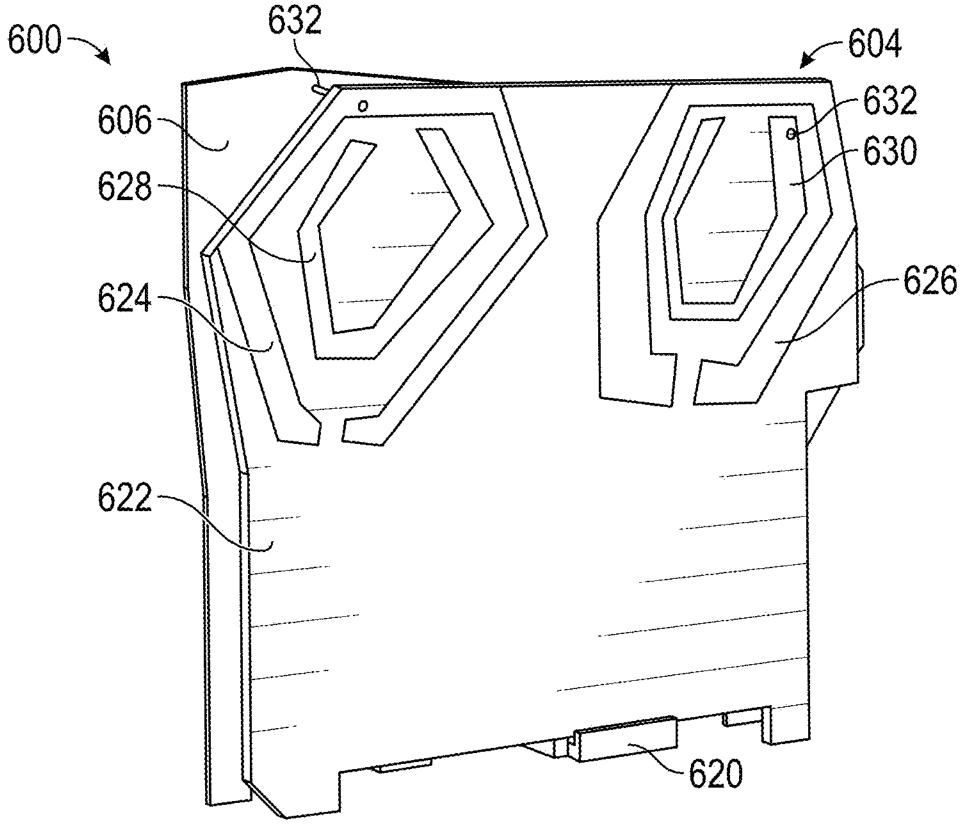
Figure 11C:
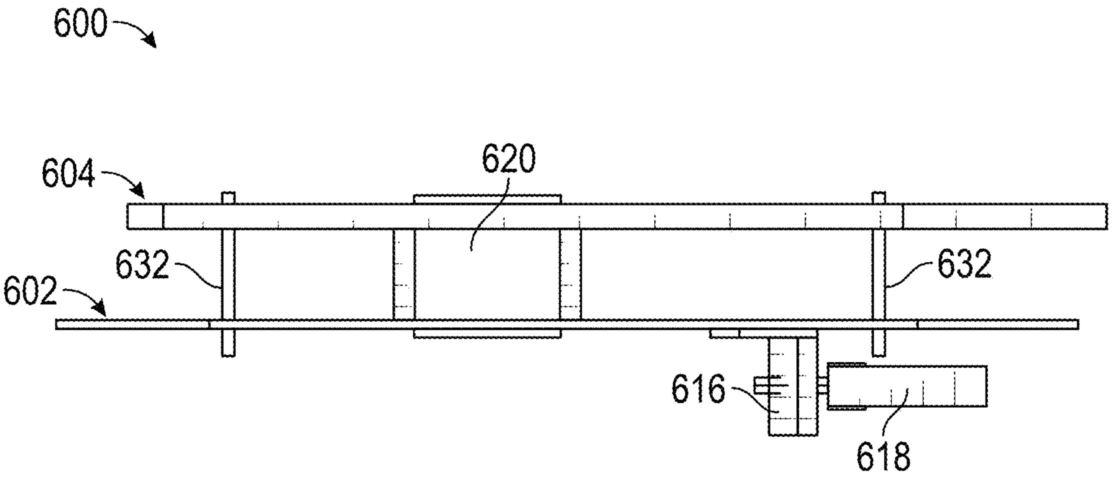

FIGS. 11A-11C illustrate various views of a multi-band antenna 600 that can be included in any of the antenna assemblies described herein, in accordance with some aspects of this disclosure. The multi-band antenna 600 can be mounted to the first ground plane 412. The multi-band antenna 600 can be a 3D or 2.5D inverted F antenna configured to be utilized with a ground reference, such as the first ground plane 412. The multi-band antenna 600 can include a first radiating portion 602 and a second radiating portion 604. In the illustrated example, the first radiating portion 602 is in the form of a first conductive portion 608 etched onto a first PCB portion 606. In other implementations, the first radiating portion 602 and/or the second radiating portion 604 can be sheet metal (e.g., with plastic supports). The multi-band antenna 600 can include a grounding portion configured to connect the first radiating portion 602 to the first ground plane 412. The grounding portion can be defined by a first grounding portion 612 that extends from the first conductive portion 608 in the horizontal direction and a second grounding portion 614 that extends from the first grounding portion 612 in the vertical direction along the first PCB portion 606 to the first ground plane 412. As such, the grounding portions 612, 614 can electrically connect the first conductive portion 608 to the groundplane 412.

As shown in at least FIG. 11B, the second radiating portion 604 can be in the form of a plurality of conductive portions 624, 626, 628, and 630 etched onto a second PCB portion 622. The conductive portions 624 and 630 of the second radiating portion 604 can be electrically connected to the first conductive portion 608 of the first radiating portion 602. For example, shorting pins 632 can be used to establish the electrical connection from the first PCB portion 606 to the second PCB portion 622 (see e.g., FIG. 11C). The shorting pins 632 can be in the form of electrically conductive cylinders. The additional conductive portions 626 and 628 can be electromagnetically coupled to their neighboring conductive portions, for example, the conductive portion 630 and the conductive portions 624 respectively. The conductive portions 626, 628 can provide additional radiation that may not always be required.

Referring back to FIG. 11A, the multi-band antenna 600 can include a feed arm 616. The feed arm 616 can be in the form of an electrically conductive sheet metal portion, that forms the initial portion of the radiating portion of the multi-band antenna 600. The feed arm 616 can be electrically connected to the first conductive portion 608 of the first radiating portion 602 via feed line 610. The multi-band antenna 600 can be configured to connect to a coaxial cable 618. For example, the center conductor of the coaxial cable 618 can be electrically coupled to the multi-band antenna 600 via the feed arm 616. The outer conductor of the coaxial cable 618 can be electrically connected to a coax feed point of the first ground plane 412. In the illustrated example, the multi-band antenna 600 is supported by a non-conductive support portion 620, which can be mechanically coupled to the first ground plane 412.

Figure 12A:
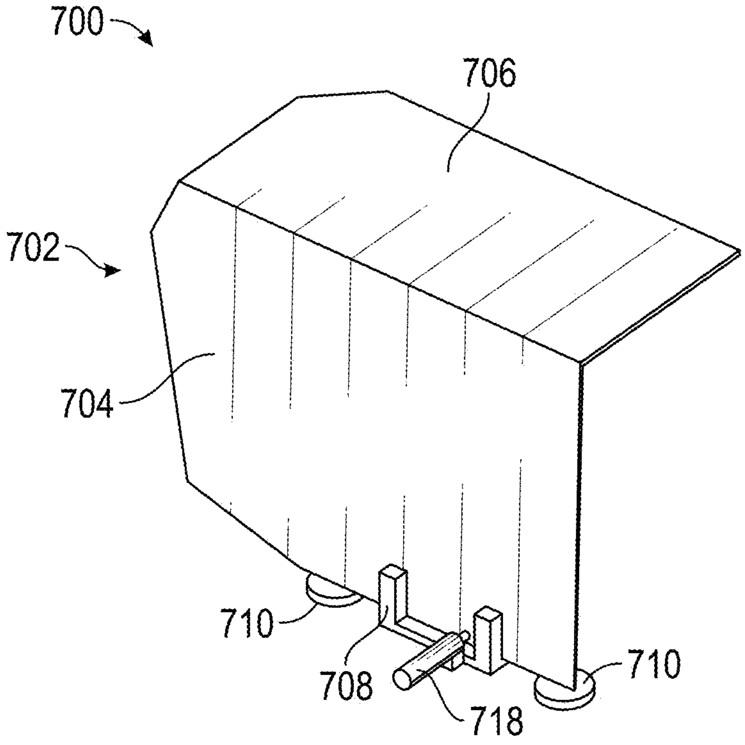
FIGS. 12A-12B illustrate various views of another implementation of a multi-band antenna that can be included in any antenna assembly described herein, in accordance with some aspects of this disclosure.
Figure 12B:
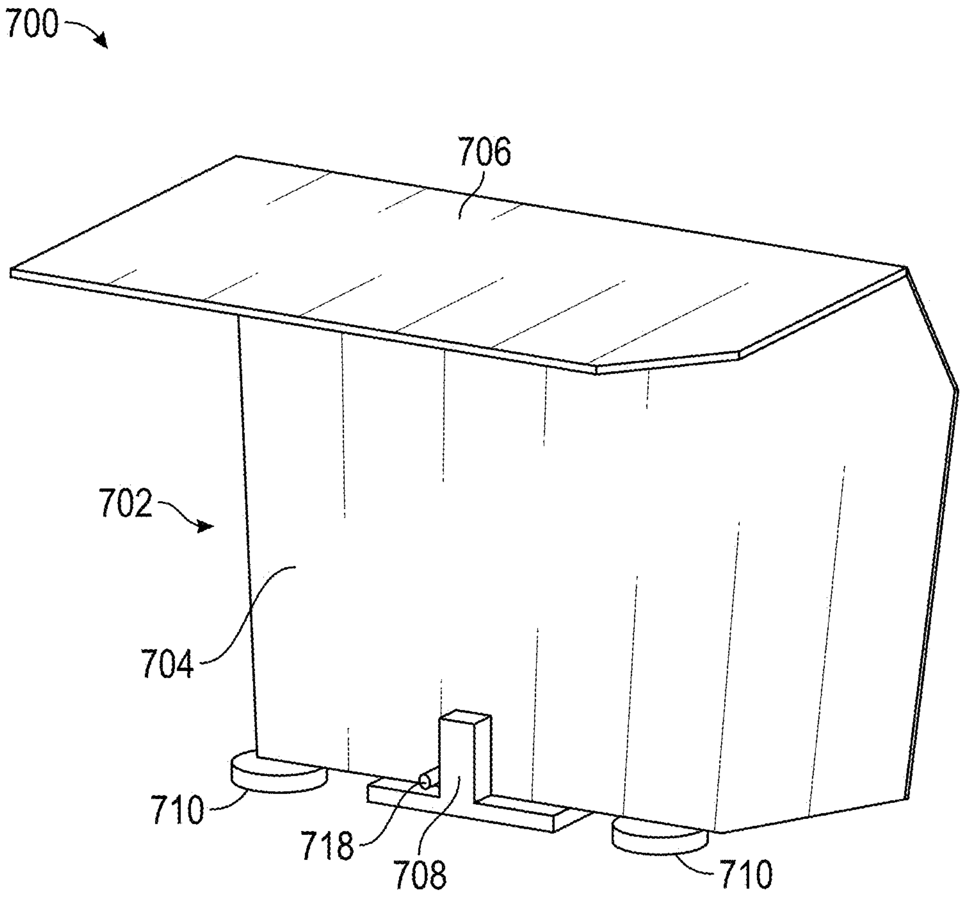

FIGS. 12A-12B illustrate various views of a multi-band antenna 700 that can be included in any of the antenna assemblies described herein, in accordance with some aspects of this disclosure. The multi-band antenna 700 can be a bent monopole antenna configured to be mounted to a ground plane (e.g., the first ground plane 412). The multi-band antenna 700 includes a radiating element 702. The radiating element 702 can be bent to define an upright portion 704 and a head portion 706. The bend in the radiating element 702 can allow the multi-band antenna 700 to fit under a fixed radome height. When the multi-band antenna 700 is incorporated into the multi-band multi-element antenna 401, the first ground plane 412 may be modified to accommodate the multi-band antenna 700. For example, the ground plane 412 may include openings configured to receive mechanical supports 710. As such, the openings in the first ground plane 412 can have a similar shape to the mechanical supports 710 (e.g., circular). The mechanical supports 710 can be non-conductive. The mechanical supports 710 can be coupled to a lower edge of the upright portion 704 of the radiating element 702 to electrically insulate the radiating element 702 from the first ground plane 412. The multi-band antenna 700 can be configured to connect to a coaxial cable 718. For example, the center conductor of the coaxial cable 718 can be electrically coupled to the radiating element 702. The outer conductor of the coaxial cable 718 can be electrically connected to a coax feed point of the first ground plane 412. In the illustrated example, the multi-band antenna 700 is further supported by a non-conductive support portion 708, which can be mechanically coupled to the first ground plane 412.

Figure 13A:
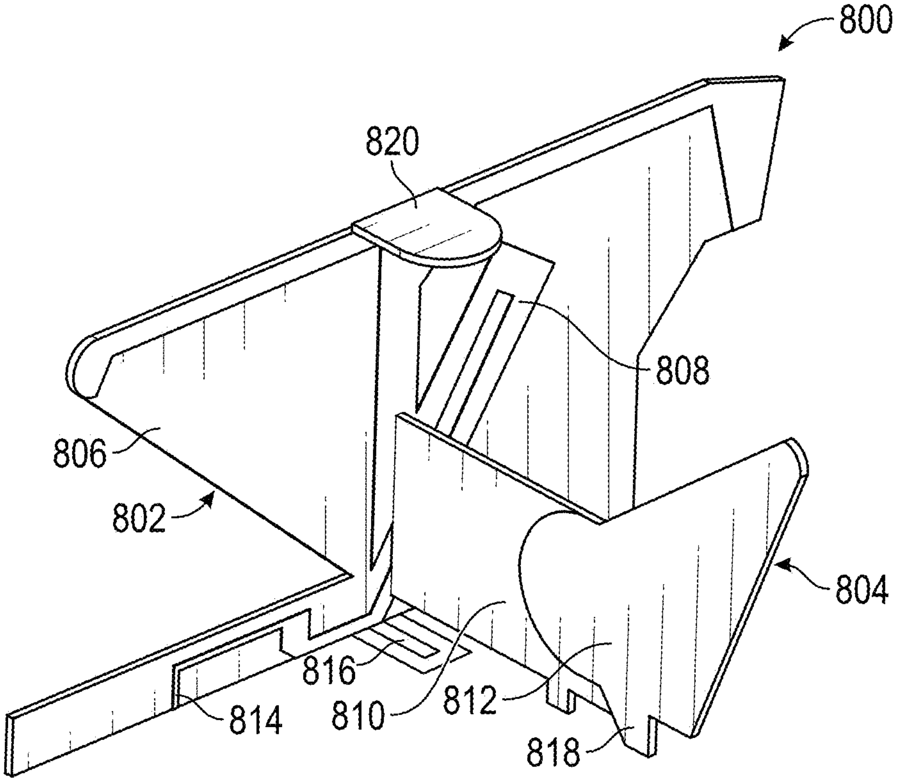
FIGS. 13A-13C illustrate various views of another implementation of a multi-band antenna that can be included in any antenna assembly described herein, in accordance with some aspects of this disclosure.
Figure 13B:
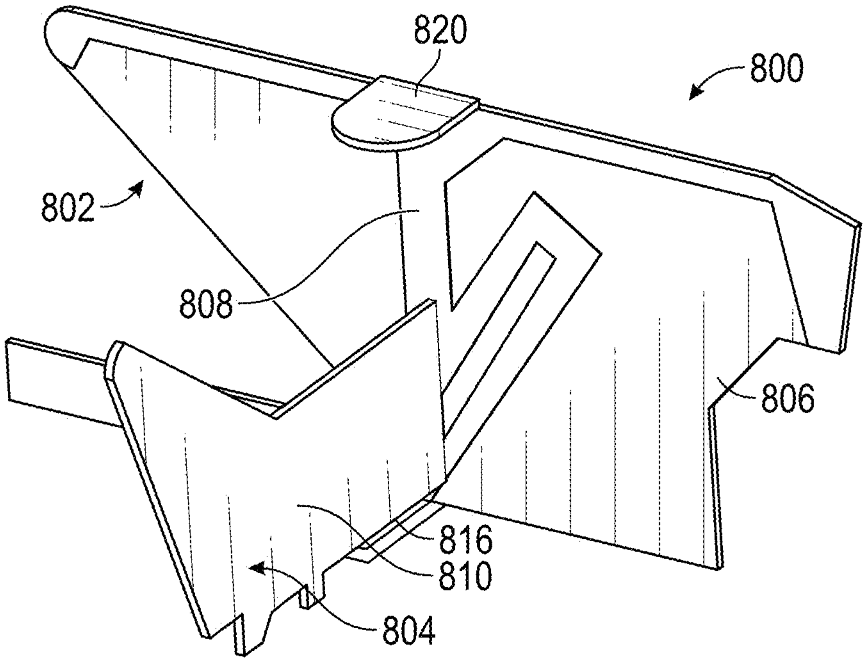
Figure 13C:
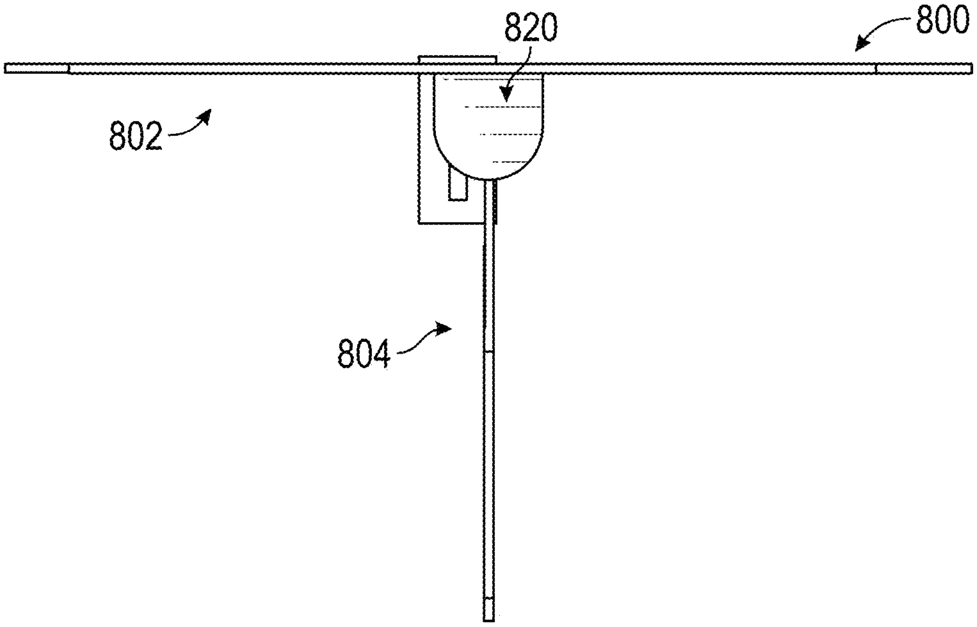

FIGS. 13A-13C illustrate various views of a multi-band antenna 800 that can be included in any of the antenna assemblies described herein, in accordance with some aspects of this disclosure. The multi-band antenna 800 can be mounted to the first ground plane 412. The multi-band antenna 800 can be a printed inverted F antenna (“PIFA”). The multi-band antenna 800 can include a first radiating portion 802 and a second radiating portion 804. In the illustrated example, the first radiating portion 802 is in the form of a first conductive portion 808 etched onto a first PCB portion 806. In other implementations, the first radiating portion 802 and/or the second radiating portion 804 can be sheet metal (e.g., with plastic supports). The first radiating portion 802 can be the directly fed portion of the PIFA. For example, a grounding portion 814 can extend from the first conductive portion 808 to electrically connect the first conductive portion 808 to the first ground plane 412. A microstrip line 816 can extend from the radio attaching the grounding portion 814 to the multi-band antenna 800. The first radiating portion 802 can include a top portion 820. The top portion 820 can extend orthogonally to the first PCB portion 806. A lower surface (not shown) of the top portion 820 can include a conductive portion that, along with the unequal length arms of the first conductive portion 808 along the first PCB portion 806, can allow for increased impedance bandwidth by having complementary higher order mode performance due to the unequal length arms of the first conductive portion 808.

The second radiating portion 804 can be electromagnetically coupled to the first radiating portion 802. In the illustrated example, the second radiating portion 804 is in the form of a second conductive portion 812 etched onto a second PCB portion 810. The second conductive portion 812 can be electrically coupled to the first ground plane 412 at the ground connection 818. The second conductive portion 812 of the second radiating portion 804 can be orthogonal to both the first conductive portion 808 and the top portion 820 of the first radiating portion 802. The second conductive portion 812 can assist with the high-band performance of the multi-band antenna 800.

Figure 14A:
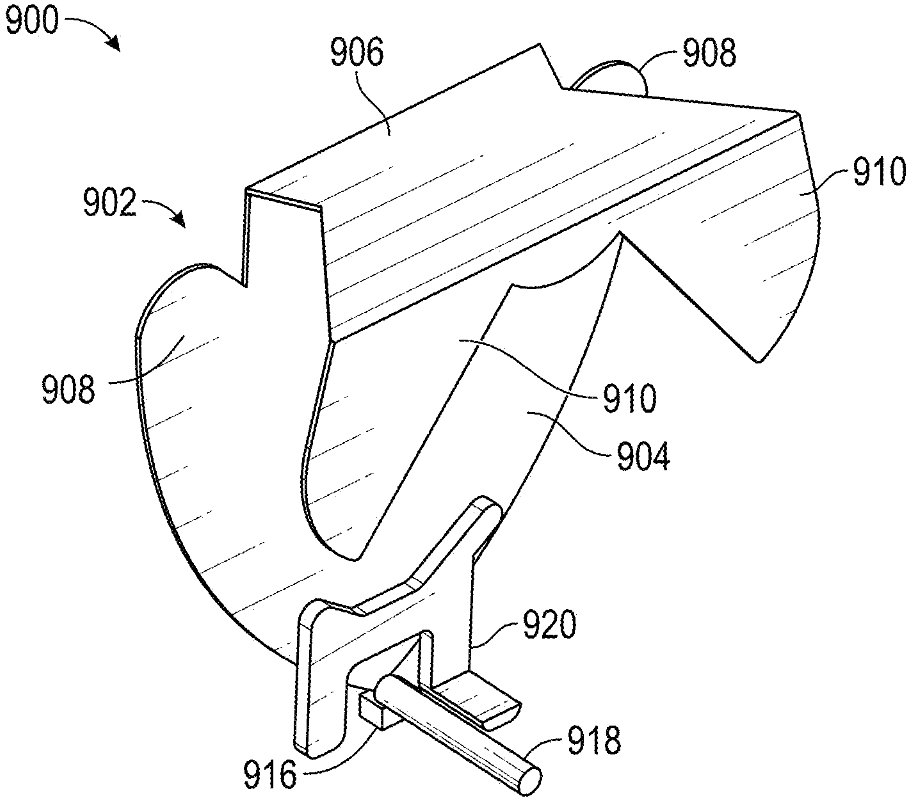
FIGS. 14A-14D illustrate various views of another implementation of a multi-band antenna that can be included in any antenna assembly described herein, in accordance with some aspects of this disclosure.
Figure 14B:
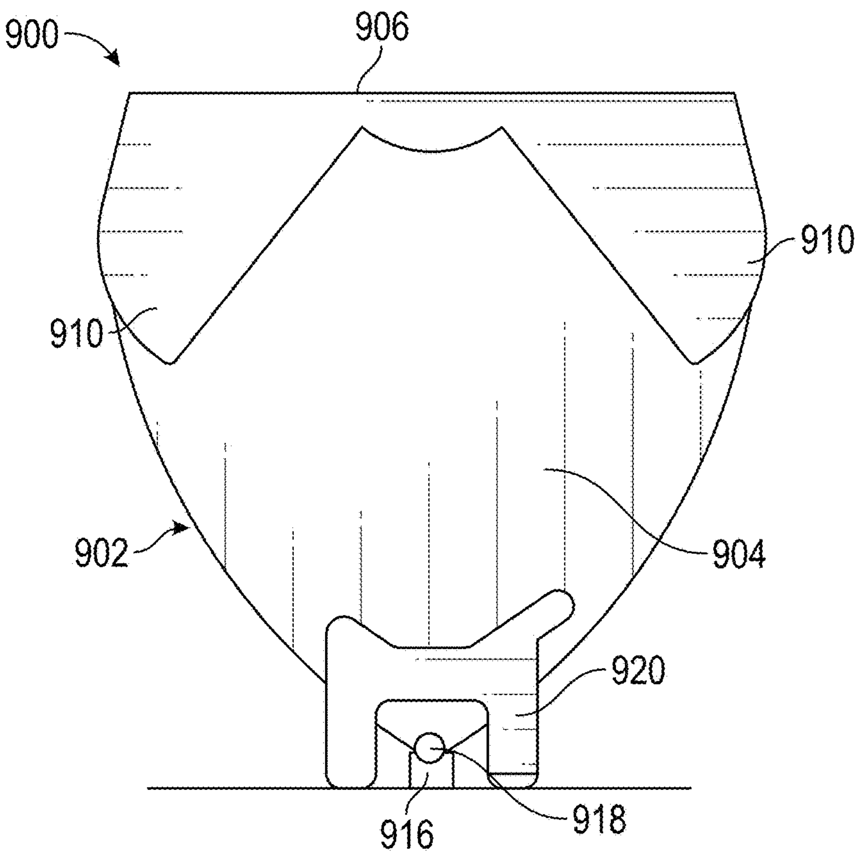
Figure 14C:
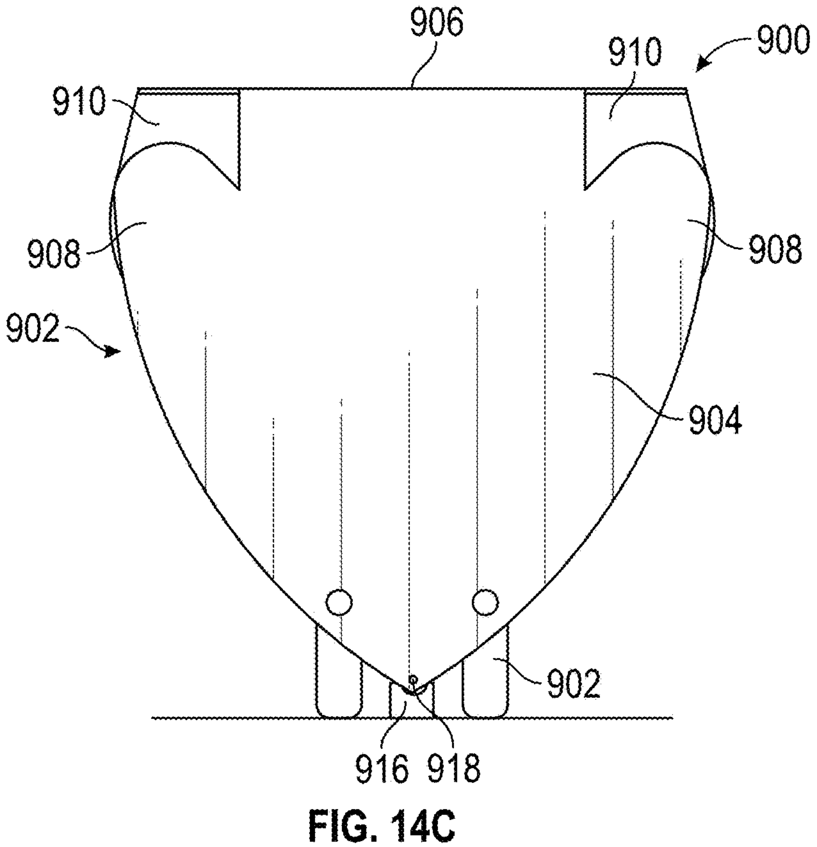
Figure 14D:
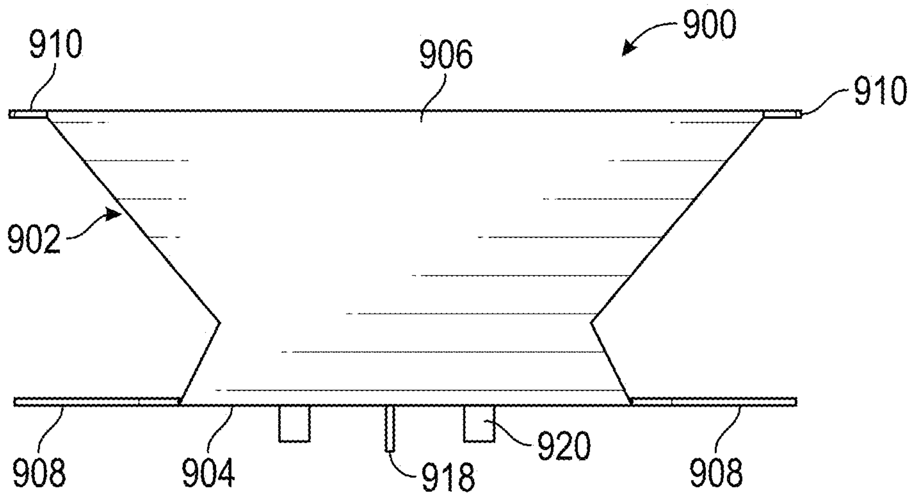

FIGS. 14A-14D illustrate various views of a multi-band antenna 900 that can be included in any of the antenna assemblies described herein, in accordance with some aspects of this disclosure. The multi-band antenna 900 can be a bent monopole antenna configured to be mounted to a ground plane (e.g., the first ground plane 412). The multi-band antenna 900 includes a radiating element 902. The radiating element 902 can be bent to define an upright portion 904 and a head portion 906. The bend in the radiating element 902 can allow the multi-band antenna 900 to fit under a fixed radome height. The bend can still allow the radiating element 902 to resonate down to 600 MHz. The radiating element 902 can include one or more first arms 908. The first arms 908 can extend from or form part of the upright portion 904. In some implementations, the first arms 908 can be co-planar to the upright portion 904. The radiating element 902 can include one or more second arms 910. The second arms 910 can extend from or form part of the head portion 906. As shown in FIG. 14D, in the illustrated example, the one or more second arms 910 can extend parallel to the upright portion 904 and may be at an angle and/or orthogonal to the head portion 906. The first arm 908 and the second arms 910 can assist with the input impedance at higher portions of the frequency band. The multi-band antenna 900 can be configured to connect to a coaxial cable 918. For example, the center conductor of the coaxial cable 918 can be electrically coupled to the radiating element 902 at its feed point. The outer conductor of the coaxial cable 918 can be electrically connected to a coax feed point of the first ground plane 412. In the illustrated example, the multi-band antenna 900 is supported by a non-conductive support portion 920, which can be mechanically coupled to the first ground plane 412. The support portion 920 can include heat stake posts that extend into corresponding openings in the upright portion 904.

Figure 15A:
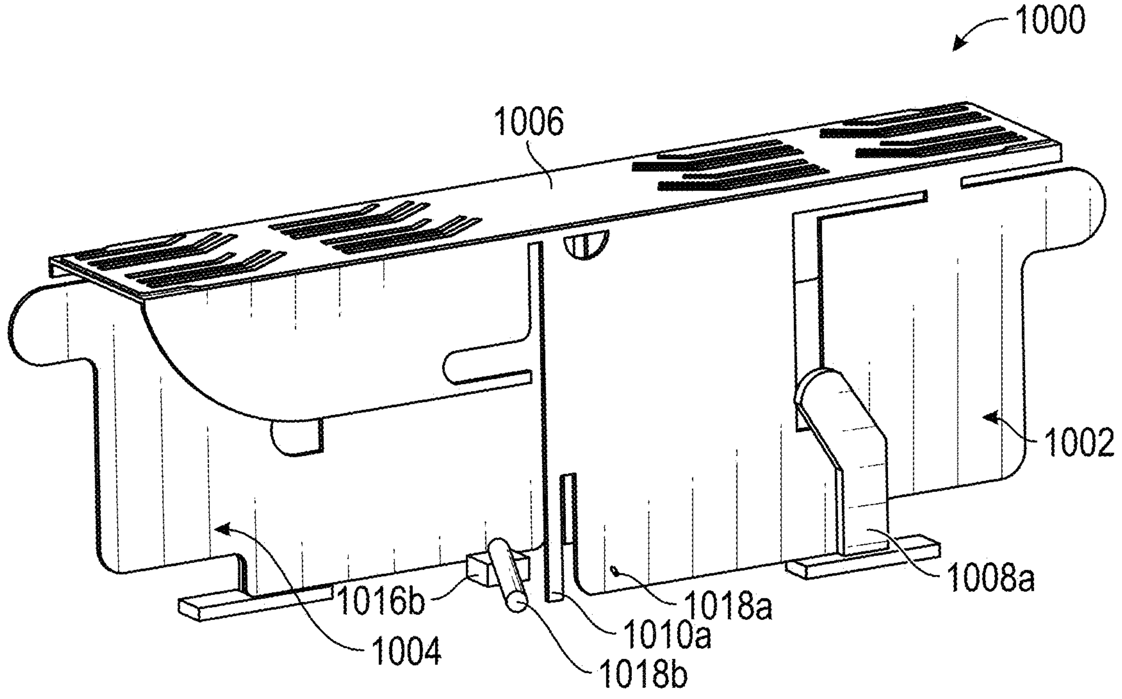
FIGS. 15A-15B illustrate various views of another implementation of a multi-band antenna that can be included in any antenna assembly described herein, in accordance with some aspects of this disclosure.
Figure 15B:
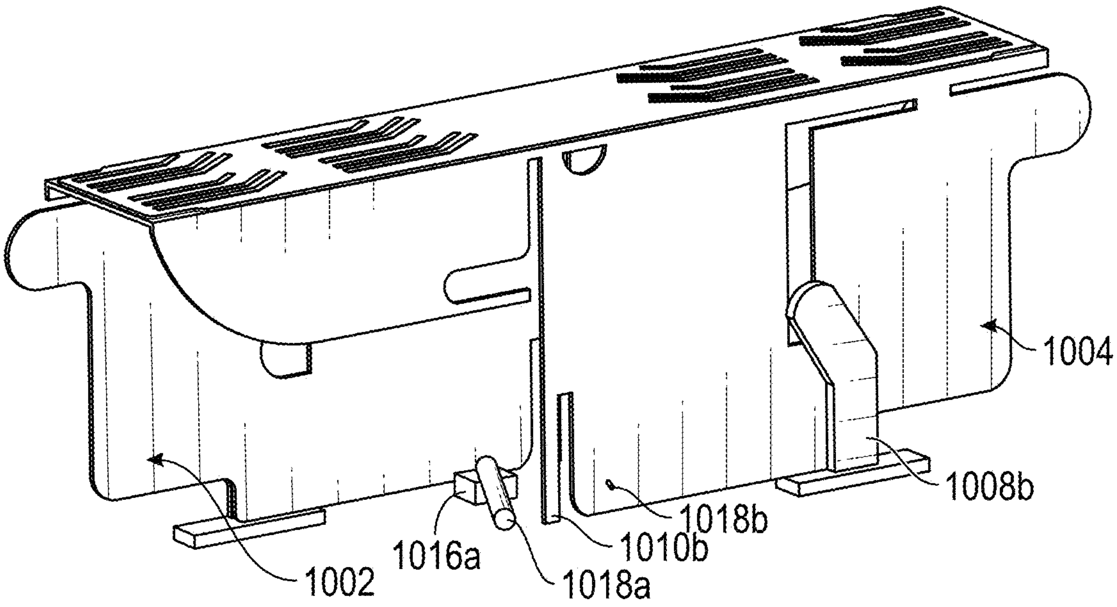

FIGS. 15A-15B illustrate various views of a multi-band antenna 1000 that can be included in any of the antenna assemblies described herein, in accordance with some aspects of this disclosure. The multi-band antenna 1000 can be mounted to the first ground plane 412. The multi-band antenna 1000 can comprise two 3D inverted F antennas. For example, the multi-band antenna 1000 can include a first inverted F antenna 1002 and a second inverted F antenna 1004. The first inverted F antenna 1002 and the second inverted F antenna 1004 can be similar or substantially identical to each other. The multi-band antenna 1000 can include a PCB support 1006 that can be coupled to the tops of and provide mechanical support for both inverted F antennas 1002, 1004. The first inverted F antenna 1002 can be further supported by a non-conductive support **1008*a*. Similarly, the second inverted F antenna 1004 can be further supported by a non-conductive support 1008*b*. The multi-band antenna 1000 can be configured to connect to coaxial cables 1018. For example, the center conductor of a first coaxial cable 1018*a* can be electrically coupled to the first inverted F antenna 1002 at its feed point and the center conductor of a second coaxial cable 1018*b* can be electrically coupled to the second inverted F antenna 1004 at its feed point. The outer conductors of the coaxial cables 1018*a*, 1018*b* can be electrically connected to coax feed points of the first ground plane 412. Each of the inverted F antennas 1002, 1004 can include a grounding point 1010*a*, 1010*b* respectively that can be electrically connected to the first ground plane 412**.

FIGS. 17A-17G illustrate various views of components of a multi-band radiator portion 1200, in accordance with some aspects of this disclosure. Some features of the multi-band radiator portion 1200 are similar or identical to features of the multi-band radiator portion 100' in at least FIGS. 4A-4H. Thus, reference numerals used to designate the various features or components of the multi-band radiator portion 100' are identical to those used for identifying the corresponding features of the components of the multi-band radiator portion 1200 in FIGS. 17A-17G, except that the numerical identifiers for the multi-band radiator portion 1200 begin with a "12" instead of a "1" and do not end with a "prime". Therefore, the structure and description for the various features of the multi-band radiator portion 100' and the operation thereof as described in at least FIGS. 4A-4H are understood to also apply to the corresponding features of the multi-band radiator portion 1200 in FIGS. 17A-17G, except as shown and described differently. Additional disclosure regarding antenna systems and assemblies including the multi-band radiator portions 1200 of FIGS. 17A-17G is further described in U.S. Provisional Application No. 63/638,330, filed Apr. 24, 2024, entitled "Antenna Systems," and U.S. Provisional Application No. 63/676,268, filed Jul. 26, 2024, entitled "Antenna Systems." The entire contents of both are hereby incorporated by reference herein in their entireties. The disclosure and Figures in U.S. Provisional Application No. 63/638,330 and is U.S. Provisional Application No. 63/676,268 can be used in connection with the disclosure and Figures described and shown herein.

One or more multi-band radiator portions 1200 can form part of any of the multi-band multi-element antennas described herein (e.g., the multi-band multi-element antenna 201 of the antenna assembly 200, the multi-band multi-element antenna of the antenna assembly 300, the multi-band multi-element antenna 401 of the antenna assembly 400, the multi-band multi-element antenna of the antenna assembly 400', etc.). In FIGS. 17A-17G, particular reference is made to various components of the antenna assembly 400 and how those components interact with the multi-band radiator portion 1200. However, it is recognized that one or more multi-band radiator portions 1200 may be integrated into any of the antenna assemblies 200, 300, 400, and/or 400'. In particular, one or more of the multi-band radiator portions 100' and/or multi-band radiator portions 100 of the antenna assemblies 200, 300, 400, and/or 400' may be replaced with one or more of the multi-band radiator portions 1200. In some implementations, the multi-band radiator portion 1200 may be incorporated into a different portion of the antenna assembly 400 that the multi-band radiator portions 100/100'. For example, one or more multi-band radiator portions 1200 may be mounted to the third ground plane 415 that is supported by the door 408.

Figure 17A:
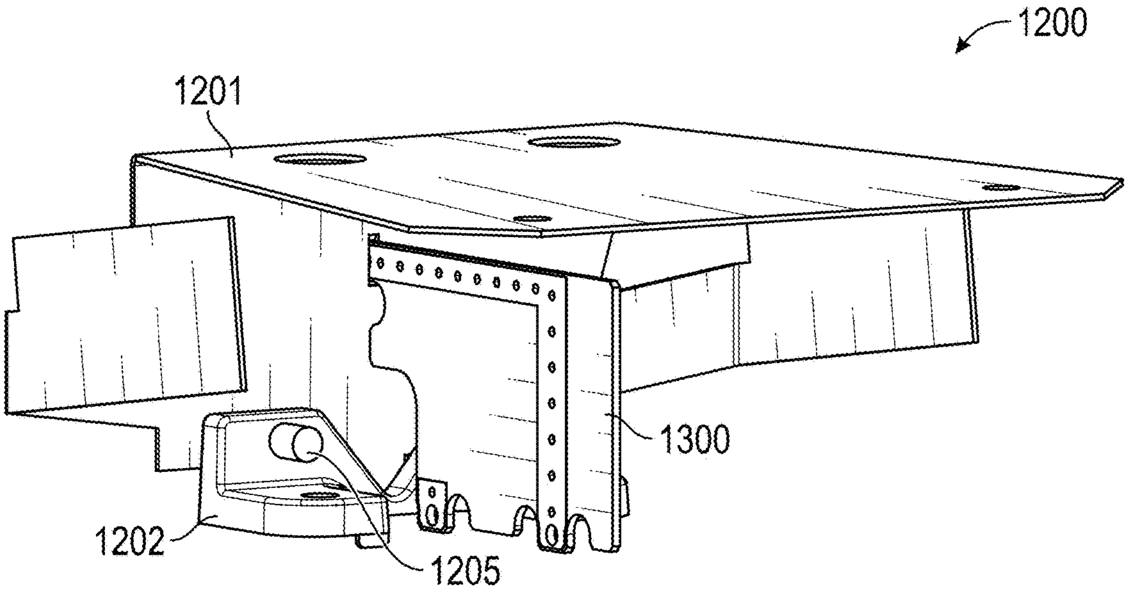
FIGS. 17A-17G illustrate various views of components of another implementation multi-band radiator portion that can be included in any antenna assembly described herein, in accordance with some aspects of this disclosure.
Figure 17B:
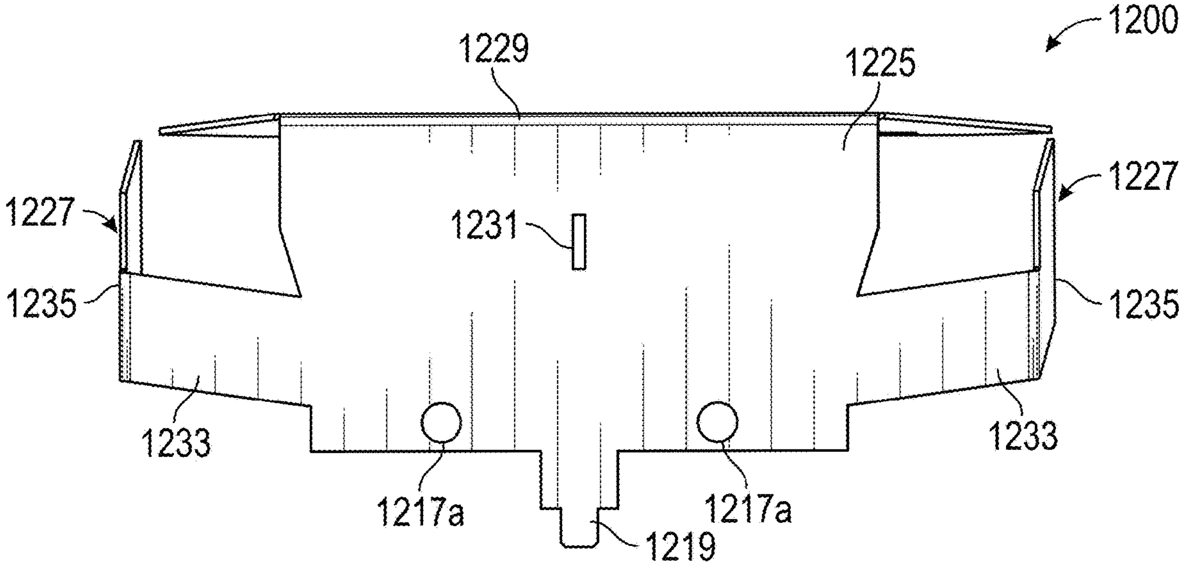
Figure 17C:
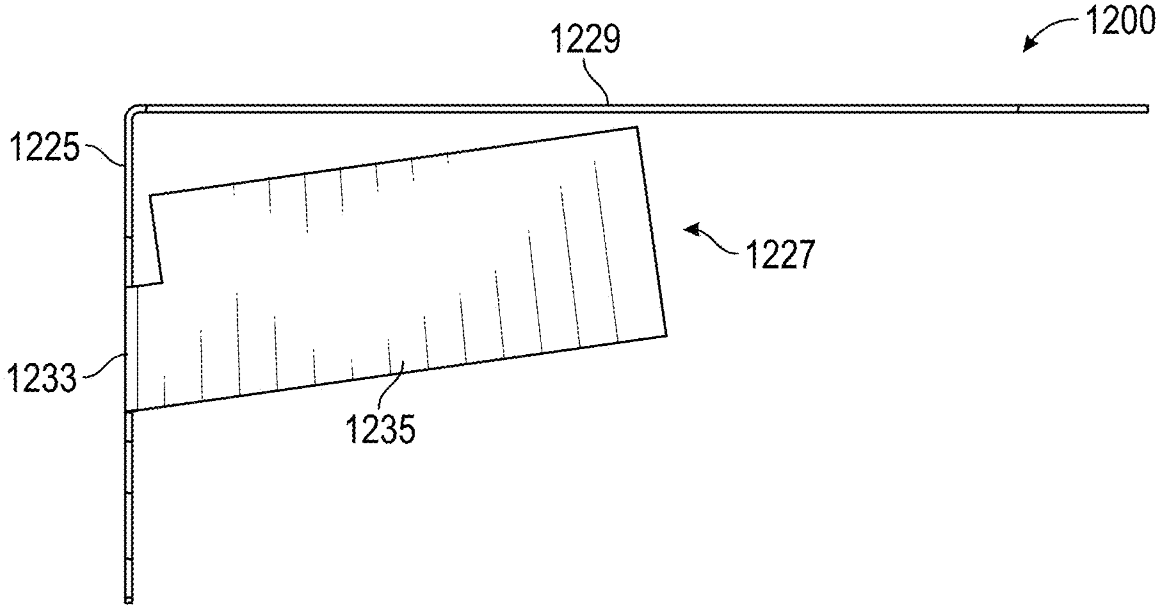
Figure 17D:
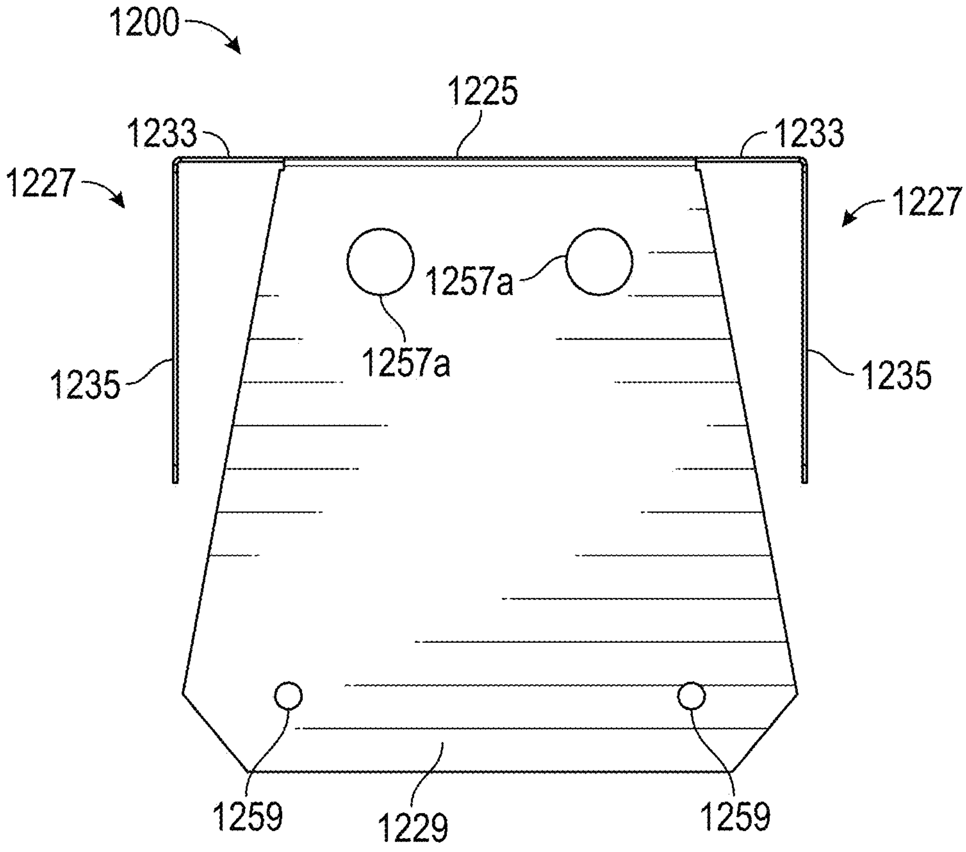
Figure 17E:
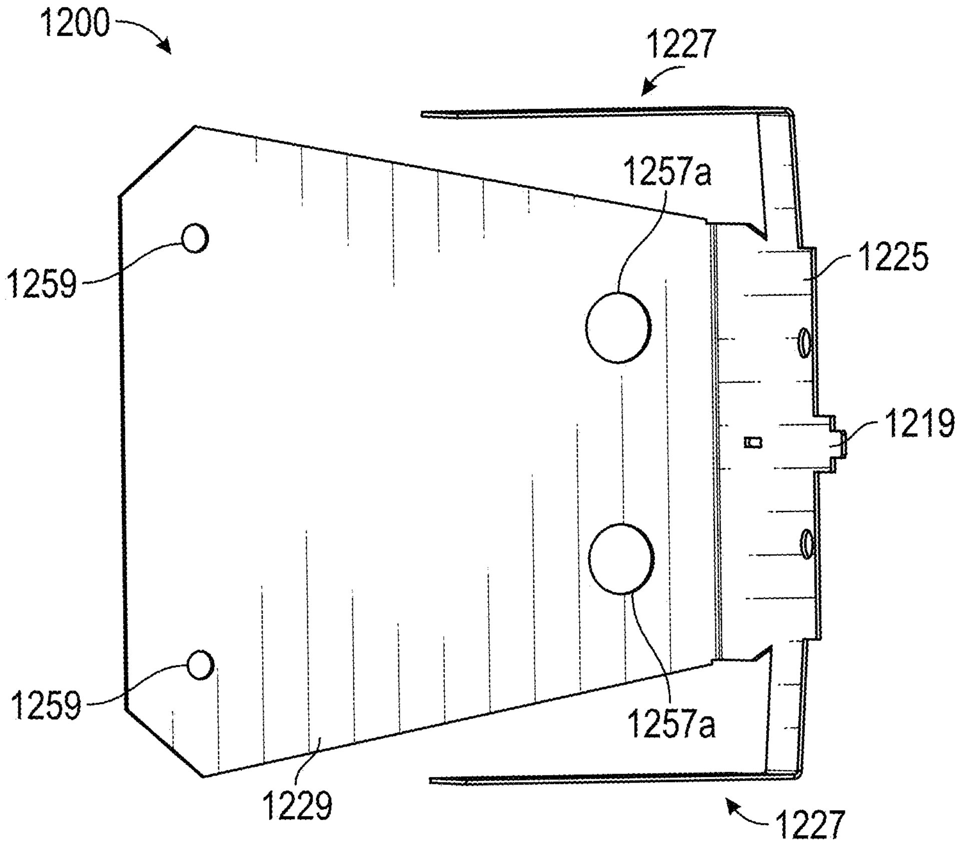
Figure 17F:
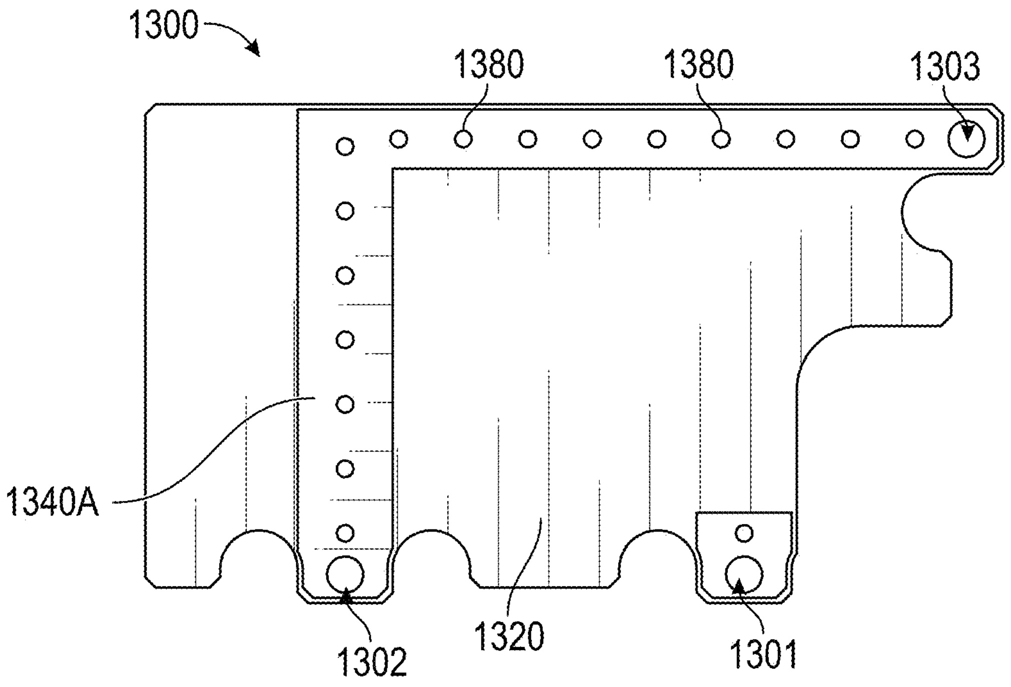
Figure 17G:
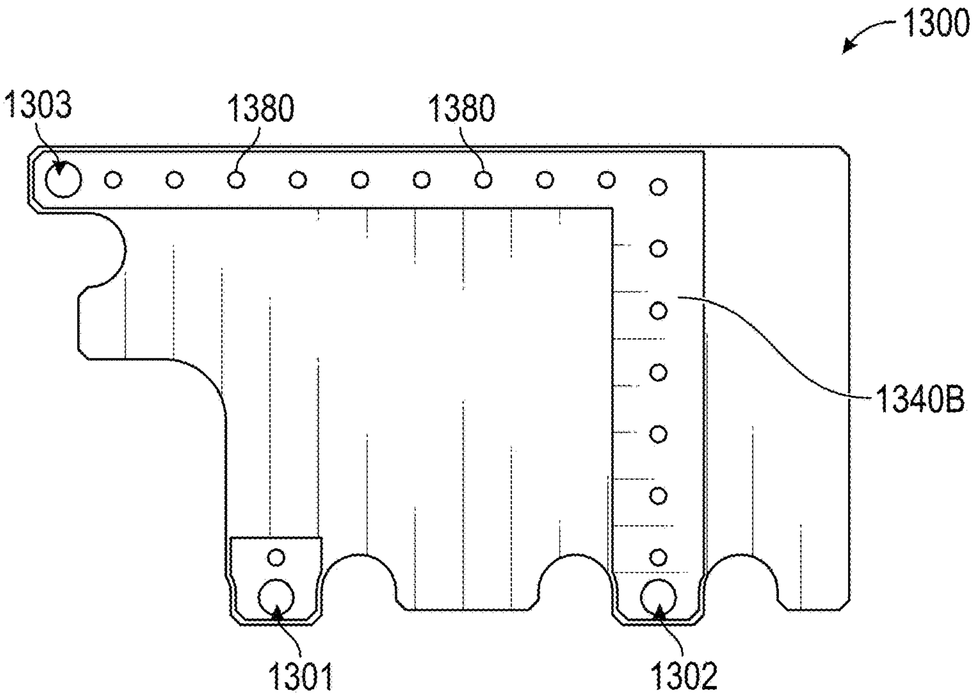

Each multi-band radiator portion 1200 can include a multi-band radiating element 1201 and a ground connection 1300 (also referred to herein as a "grounding portion"). The ground connection 1300 is configured to couple the multi-band radiating element 1301 to a ground plane, such as the first ground plane 412 or the third ground plane 415 of the antenna assembly 400. The multi-band radiator portion 1200 differs from the illustrated example of the multi-band radiator portion 100' in that the ground connection 1300 is formed on a PCB 1320, as described further below. FIG. 17A shows a perspective view of the multi-band radiating element 1201 and the ground connection 1300 coupled together and secured to a mounting portion 1202. As shown in FIG. 17A, fasteners 1205 can be used to secure the multi-band radiating element 1201 to the mounting portion 1202. The fasteners 1205 can also be used to secure the mounting portion 1202 to the associated ground plane 412/415. FIGS. 17B-17E illustrate assorted views of the multi-band radiating element 1201. FIGS. 17F and 17G illustrate a first side view and a second side view the ground connection 1300. It is recognized that the multi-band radiator portion 1200 described herein is just one example of multi-band radiator portions that can be included in the antenna assemblies described herein. In other implementations, different multi-band radiator portions can be included. In the illustrated implementation, the radiating element 1201 is constructed of metal (e.g., a conductive sheet). In some cases, the conductive sheet can have a thickness between 0.01 inches and 0.03 inches. In other implementations, the radiating element 1201 could be constructed out of several rigid PCB portions or a single flex circuit PCB (e.g., supported by the radome 404 or another RF-transparent supporting structure). For example, the multi-band radiator portion 1200 may be constructed of PCB material, sheet metal, metalized plastic, or other such materials that can be configured and adapted to be used for communication between about 450 MHz to about 8 GHz.

As noted above, the multi-band radiator portion 1200 can be configured for use with a ground plane, such as the first ground plane 412 or the third ground plane 415. In some implementations, the associated ground plane 412/415 can be constructed from one or more types of PCB material, sheet metal with non-conductive spacers of plastic, foam, ceramic, and metalized plastic. Transmission lines utilized with the multi-band radiator portion 1200 can be microstrip, stripline, conductor back co-planar waveguide, parallel plate waveguide, wire above a groundplane, coaxial cables or other such materials of construction that can be configured and adapted to be used for communication between about 450 MHz to about 8 GHz. According to some implementations, the non-conductive support portions and/or PCB portions of the groundplanes and/or radiating elements can be made of FR4, fiberglass reinforced epoxy, polyester reinforced epoxy, or other similar PCB support material that may have high performance radio frequency properties and that can support electrically conductive features of one or more radiating portions for one or more elements on its structure on one or both side of the support material.

According to some implementations, a tab and slot configuration in the PCB material can be used to mechanically locate the individual PCB portions, sheet metal portions, and/or other electromagnetic structures of the multi-band radiator portion 1200. When appropriate, in some implementations, the tab and slot arrangements are then soldered. The soldering process is used to provide a mechanical and electrical connection between the individual PCB portions. Any sheet metal portion(s) of the multi-band radiator portion 1200 may be supported with non-conductive material for the spacing and mechanical support between the sheet metal and the groundplane. In some implementations, the etched electrically conducting features can be on one surface of the PCB support material. In other implementations, both sides of the PCB support material are used for supporting the electrically conducting features. In other implementations, sheet metal or other construction material that is electrically conductive that is supported by non-conductive material to support the electrically conducting features is used in the multi-band radiator portion 1200.

In some implementations, mechanical threaded fasteners can be used with the multi-band radiator portion 1200 or to couple the multi-band radiator portion 1200 to another structure (e.g., the ground plane 412/415). The fasteners can be used to firmly hold structures and components in place and in contact with one another. Some of the mechanical features of the antenna assemblies described herein can be formed with a heat staking process to couple different portions together. In some implementations, the mechanical fasteners provide an important role in establishing and maintaining a direct electrical connection between two components. In other implementations, the mechanical fasteners are used to establish firm contact between two surfaces that are electrically conductive. In some implementations, the mechanical fasteners provide structural fastening between one or more components that have wholly non-conductive components. The use of mechanical threaded fasteners, heat stakes, keyhole slots, pressure sensitive adhesive, soldering, interlocking, and other coupling techniques may be utilized to couple portions of the multi-element multi-band antennas described herein. These coupling techniques are used to firmly hold structures and components in place and in contact with one another.

When multiple multi-band radiator portions 1200 are included in the antenna assembly 400, the various multi-band radiator portions 1200 may be rotated in orientation to provide radiation in different polarizations with reference to the direction normal to the groundplane (e.g., the first ground plane 412 or the third ground plane 415). For example, the orientation of the multi-band radiator portions 1200 may correspond with a 45-degree polarization with respect to vertical (or other types of polarizations as applicable).

In some implementations, the multi-band radiator portion 1200 can be configured to be utilized with one or more ground planes that can be rigid PCBs with independent conductor back co-planar waveguide transmission lines that are electrically coupled to individual multi-band radiator portions 1200. In some implementations, the multi-band radiator portions 1200 can be mechanically coupled to the associated ground plane 412/415 through a plurality of electrically non-conductive connector portions (not shown). For example, as shown in FIG. 17D, the multi-band radiating element 1201 can include one or more openings 1259 in the second low-band radiation portion 1229 configured to receive the non-conductive connector portions. The connector portions can be secured to the multi-band radiating element 1201 with a heat staking process, in one example. The coupling of the connector portions may be accomplished with other manufacturing processes such as a snapping process, threaded fastener process, a key-hole process, an interference staking process, or other suitable mechanical coupling process. The coupling of multi-band radiating element 1201 to the groundplane 412/415 (e.g., via the connector portions) provides a secure connection that enables a reliable mechanical connection to facilitate a stable electrical connection between the multi-band radiator portions 1200 and their associated transmission line excitations.

In the illustrated example, the multi-band radiator portion 1200 includes a multi-band radiating element 1201 comprised of a sheet metal portion as well as ground connection 1300 comprising a PCB with electrically conductive features on both surfaces. For example, FIGS. 17F and 17G illustrate both sides of the ground connection 1300. The ground connection 1300 may function as an impedance matching component and assist with the radiation characteristics of the fundamental resonance as well as higher order modes. The ground connection 1300 may be made of one or more rigid substrate materials (e.g., FR4) that act as the non-conductive support material and may include an electrically conductive portion on one or more sides or other suitable electrically conductive material for the electrically conductive features on the desired sides or surfaces. As such, the ground connection 1300 may be a one layer or a two layer or a multi-layer PCB of standard processing for the PCB industry. The ground connection 1300 may provide one portion of a multi-portion structure for the multi-band radiator portion 1200. In some implementations, a sheet metal portion may be used to realize the ground connection 1300 (e.g., similar to the ground connection 103, the ground connection 103', and/or the like).

Referring back to FIGS. 17B-17E, the multi-band radiating element 1201 is comprised of several unique portions. The geometry of these unique portions is configured in a way that the radio frequency energy that is radiated by the multi-element multi-band antenna including the multi-band radiator portion 1200 (e.g., the multi-band multi-element antenna 401) has an intended direction that is normal/perpendicular to groundplane the multi-band radiating element 1201 is coupled to. Accordingly, it may be desirable to mount one or more of the multi-band radiator portions 1200 to a ground plane of the door 408, such as the third ground plane 415. Having this predominate radiation direction or orientation for the multi-band radiator portions 1200 may provide certain benefits and differs from traditional multi-band multi-element antennas. The typical radiation direction is in a directional that is the same as, co-planar, or only slightly above the plane of the groundplane. To obtain the radio frequency radiation direction that is normal to the groundplane or otherwise, known as a directional radiation pattern, the geometry of the radiator portion multi-band radiating element 1201 has been adjusted compared to the other multi-band radiating elements described herein (e.g., the radiating element 101, the radiating element 101', and/or the like). In the illustrated implementation, the feed portion 1219 has been adjusted (e.g., compared to the feed points 119, 119' of the radiating elements 101, 101') to accommodate the transmission line feed from a conductor backed co-planar waveguide. The feed portion 1219 can be adjusted to accommodate the feed from a microstrip, coax, stripline, parallel plate, a waveguide of various cross sections, twin lead, wire above a groundplane, and/or other transmission line structures in the telecommunications and microwave industries. In FIG. 17B, upright portion 1225 can be used for all portions of the desired frequency band of operation to support the radio frequency radiation. In some examples, the upright portion 1225 has a greater width than height. For example, the upright portion 1225 can have a width to height ratio of 2:1 or greater and may be a compact radiating structure when compared to other embodiments of three-dimensional inverted F antennas. Such a compact radiating structure can provide numerous advantages, including reducing the overall height of an antenna assembly incorporating the multi-band radiator portion 1200, as the height of the multi-band radiator portions can be a limiting factor in terms of total assembly height. Reduced height can be desirable for visual appearance, operations in high wind loads, etc. The upright portion 1225 may include one or more mounting features. The one or more mounting features can be configured to allow the upright portion 1225 to be coupled to the desired ground plane. The upright portion 1225 may include a slot 1231 that can be configured to receive the grounding portion 1300. Upright portion 1225 also supports mounting features 1217*a* for support portion 1202. As shown in FIGS. 17B and 17C, the multi-band radiating element 1201 can include two arms 1227. The arms can include main arm portions 1235 and connecting portions 1233. The connecting portions 1233 provide coupling between upright portion 1225 and main arm portions 1235 to assist in radiation in the 1 GHz to 8 GHz frequency band. As shown in at least FIG. 17C, main arm portions 1235 can have a significantly shorter length and can be positioned closer to the groundplane than the other antennas. For example, the arms 1227 can have a shorter length than arms 127 of the radiating element 101 and/or a shorter length than the arms 127' of the radiating element 101'. Additionally, the second low-band radiation portion 1229 of the multi-band radiating element 1201 can be significantly longer in the length and closer to the groundplane than the other antennas. For example, compared to second low band radiation portion 129 of the radiating element 101 and/or the second low-band radiation portion 129' of the radiating element 101'. Grounding portion 1300 is thinner, rotated in orientation, and further away from the groundplane than the ground connection in other antennas (e.g., the ground connection 103 of FIG. 3B, the ground connection 103' of FIG. 4B, etc.). These arrangements can contribute to accomplishing the change in predominate radiation direction. This change in the ratio of lengths between the high band and low band portions impacts the higher order mode radiation from the portions of the three-dimensional radiating element 1200 and allows for the dramatic change in the direction of predominate radio frequency radiation. In this manner, when one or more multi-band radiator portions 1200 are incorporated into the antenna assembly 400 (e.g., mounted to the third ground plane 415 on the door 408), the antenna assembly 400 may be configured to produce a radiation pattern perpendicular to the ground plane 415. In some examples, such an implementation of the antenna assembly 400 may produce a radiation pattern that is either omni-directional or directional when the antenna assembly 400 is configured in accordance with a desired radiation performance criterion based on the geometry considerations of the multi-band radiating element 1201 and ground connection 1300. As shown in FIG. 17D, the second low-band radiation portion 1229 includes two openings 1259 for receiving the aforementioned connectors and clearance features 1257*a*.

Referring now to FIGS. 17F and 17G, side views of the ground connection 1300 are shown. In this embodiment, the grounding portion 1300 is a PCB 1320 with electrically conducting surfaces 1340 on both sides. For example, the first side shown in FIG. 17F includes conducting surface 1340A and the second side shown in FIG. 17G includes conducting surface 1340B (collectively referred to as conducting surfaces 1340). In other implementations, only one side of the PCB 1320 might have an electrically conducting surface 1340 or the PCB 1320 could be a multi-layer PCB with three or more conducting surfaces 1340, or conducting surface 1340 could be a sheet metal portion that may or may not be supported by a non-conducting portion. For example, depending on the particular ground plane, it may be desirable for the ground connection 1300 to be constructed wholly of sheet metal, similar to the ground connection 103 of FIG. 3B or the ground connection 103' of FIG. 4B. In this implementation, several plated through holes 1380 are present to electrically connect the two conducting surfaces 1340A, 1340B of the ground portion 1300. The ground connection 1300 can also include coupling points 1301 and 1302 that can be used to establish electrical connection between ground portion 1300 and the associated ground plane 412/415. In some implementations, the coupling points 1301, 1302 may extend through the associated groundplane (e.g., the third ground plane 415) and an electrical connection may be established between one or both sides of the ground plane and the coupling points 1301, 1302. The ground connection 1300 can include a coupling point 1303 that establishes an electrical connection between ground portion 1300 and multi-band radiating element 1201 (e.g., coupling point 1303 can be received within slot 1231 of the multi-band radiating element 1201). In some examples, the coupling points 1301 and 1302 and/or the coupling point 1303 may be of a size and shape to pass buss wire through. In this manner, the buss wire may pass through one or more of the coupling points 1301, 1302, 1303 to provide electrical connection and/or structural support.

The width, length and height of conductive surfaces 1340 are selected to provide an impedance match and also assist with the radiation characteristics of the fundamental resonance as well as the higher order modes for the radiating element multi-band radiating element 1201 and the characteristic impedance of the radio frequency transmission lines that connect the radio that is part of the 5G wireless communication link to the multi-element multi-band antenna including the multi-band radiator portion 1200 (e.g., the multi-band multi-element antenna 401) as well as the individual radiation elements. In some implementations, the width of the conductive surfaces 1340 may include a first width and a second width. The first width may be positioned along a length portion of the conductive surfaces 1340. The second width may be positioned along the height portion of the conductive surfaces 1340. Each of the first width and the second width may be between about 0.01 centimeters (cm) and about 10.0 cm. The first width and the second width each may be equal to or smaller than about 10 cm. In some implementations, the first width and the second width may be between approximately 0.0 cm and approximately 10.0 cm, for example, between approximately 0.5 cm and approximately 9.5 cm, between approximately 1.0 cm and approximately 9.0 cm, between approximately 1.5 cm and approximately 8.5 cm, between approximately 2.0 cm and approximately 8.0 cm, between approximately 2.5 cm and approximately 7.5 cm, between approximately 3.0 cm and approximately 7.0 cm, between approximately 3.5 cm and approximately 6.5 cm, between approximately 4.0 cm and approximately 6.0 cm, between approximately 4.5 cm and approximately 5.5 cm, between approximately 5.0 cm and approximately 5.0 cm, or any value or range between any of these values or ranges or any value or range bounded by any combination of these values, although values or ranges outside these values or ranges can be used in some cases. In some examples, the first width may be a different value than the second width. For example, the first width may be wider than the second width.

A ratio of the first width to the second width (or of the second width to the first width) can be between approximately 1 and approximately 5, for example, between approximately 1.5 and approximately 4.5, between approximately 2 and approximately 4, between approximately 2.5 and approximately 3.5, between approximately 2 and approximately 2.5, or between approximately 3.5 and approximately 4, or any value or range between any of these values or ranges or any value or range bounded by any combination of these values, although values or ranges outside these values or ranges can be used in some cases.

In some implementations, the height and the length of the conductive surfaces 1340 may be between about 0.0 cm and about 10.0 cm. The height and the length may be equal to or smaller than about 10 cm. In some implementations, the height and the length of the conductive surfaces 1340 may be between approximately 0.0 cm and approximately 10.0 cm, for example, between approximately 0.5 cm and approximately 9.5 cm, between approximately 1.0 cm and approximately 9.0 cm, between approximately 1.5 cm and approximately 8.5 cm, between approximately 2.0 cm and approximately 8.0 cm, between approximately 2.5 cm and approximately 7.5 cm, between approximately 3.0 cm and approximately 7.0 cm, between approximately 3.5 cm and approximately 6.5 cm, between approximately 4.0 cm and approximately 6.0 cm, between approximately 4.5 cm and approximately 5.5 cm, between approximately 5.0 cm and approximately 5.0 cm, or any value or range between any of these values or ranges or any value or range bounded by any combination of these values, although values or ranges outside these values or ranges can be used in some cases. In some examples, the length and the height of the conductive surfaces 1340 may be different values. For example, the height may be greater than the length.

A ratio of the height to the length (or of the length to the height) of the conductive surfaces 1340 can be between approximately 1 and approximately 5, for example, between approximately 1.5 and approximately 4.5, between approximately 2 and approximately 4, between approximately 2.5 and approximately 3.5, between approximately 2 and approximately 2.5, or between approximately 3.5 and approximately 4, or any value or range between any of these values or ranges or any value or range bounded by any combination of these values, although values or ranges outside these values or ranges can be used in some cases.

In some instances, the plated through holes 1380 may be configured to equalize electrical potential across both sides of the ground connection 1300. For example, the grounding portion 1300 may include conductive material on both sides (e.g., conducting surface 1340A on the first side shown in FIG. 17F and conducting surface 1340B on the second side shown in FIG. 17G). In this manner, the conductive material forming the conducting surfaces 1340 may direct a current. When the current flows along the conductive material of the conducting surfaces 1340 of the ground connection 1300, there may be potential difference between both sides of the ground connection 1300. The plated through holes 1380 may allow for the current to pass through for any potential difference to equalize.

In some implementations, when multiple multi-band radiator portions 1200 are included in the antenna assembly 400, one or more of multi-band radiator portions 1200 can be arrayed together. In such a configuration, fewer RF ports may be required, and this allows for the possibility of a higher antenna gain for the remaining ports. For example, if the eight multi-band radiator portions 1200 were included in the antenna assembly 400 and are arrayed in pairs, the antenna assembly 400 can include four RF ports instead of eight for the multi-band radiator portions 1200. Such a configuration can also result in enhanced performance in a desired direction.

Figure 16:
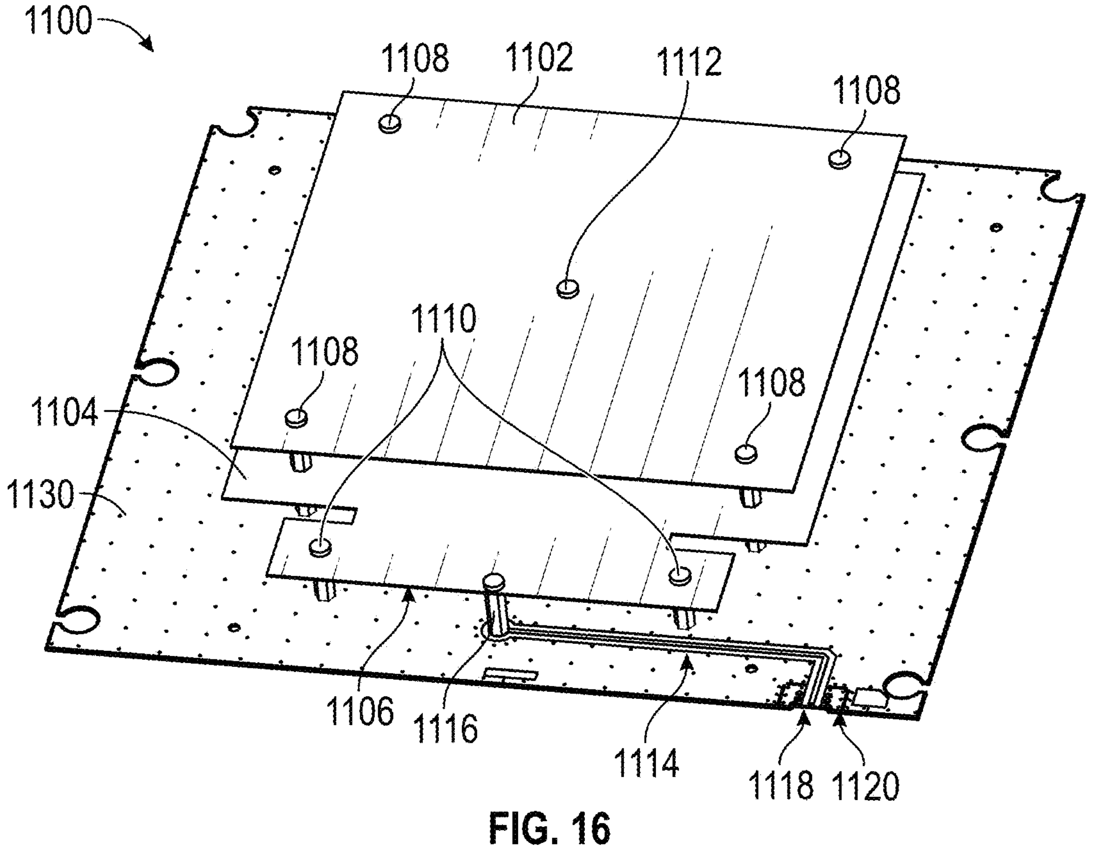
FIG. 16 illustrates a perspective view of a stacked patch antenna on a ground plane that can be included in any antenna assembly described herein, in accordance with some aspects of this disclosure.

FIG. 16 illustrates a perspective view of a stacked patch antenna 1100 on a ground plane 1130 that can be included in any antenna assembly described herein, in accordance with some aspects of this disclosure. For example, stacked patch antenna 1100 can form part of any of the multi-band multi-element antennas described herein (e.g., the multi-band multi-element antenna 201 of the antenna assembly 200, the multi-band multi-element antenna of the antenna assembly 300, the multi-band multi-element antenna 401 of the antenna assembly 400, the multi-band multi-element antenna of the antenna assembly 400', etc.). In other examples, the stacked patch antenna 1100 may be incorporated into an antenna assembly described herein but may operate separately from the corresponding stacked patch antenna 1100. In FIG. 16, particular reference is made to various components of the antenna assembly 400 and how those components interact with the stacked patch antenna 1100. However, it is recognized that one or more stacked patch antenna 1100 may be integrated into any of the antenna assemblies 200, 300, 400, and/or 400'. In some implementations, the stacked patch antenna 1100 may be incorporated into a different portion of the antenna assembly 400. For example, stacked patch antenna 1100 may be configured to be supported by the door 408, and the third ground plane 415 of the antenna assembly 400 can be in the form of the ground plane 1130 of FIG. 16. Additional disclosure regarding antenna systems and assemblies including the stacked patch antenna 1100 of FIGS. 17A-17G is further described in U.S. Provisional Application No. 63/638,330, filed Apr. 24, 2024, entitled "Antenna Systems," and U.S. Provisional Application No. 63/676,268, filed Jul. 26, 2024, entitled "Antenna Systems." The entire contents of both are hereby incorporated by reference herein in their entireties. The disclosure and Figures in U.S. Provisional Application No. 63/638,330 and is U.S. Provisional Application No. 63/676,268 can be used in connection with the disclosure and Figures described and shown herein.

With continued reference to FIG. 16, the stacked patch antenna 1100 can be formed on and/or supported by the ground plane 1130. Including the stacked patch antenna 1100 in an antenna assembly, such as the antenna assembly 400 can provide certain advantages. For example, the stacked patch antenna 1100 may enhance the performance of the antenna assembly 400 in terms of beamwidth, gain, spatial filtering, and/or efficiency. The stacked patch antenna 1100 can be configured as a highly directional antenna.

The stacked patch antenna 1100 can include a first or top patch element 1102 and a second or bottom patch element 1104. The patch elements 1102, 1104 may also be referred to herein as "patch antenna radiators", "patch antenna elements", and/or "patch radiating elements". Including a stacked patch antenna 1100 in the antenna assembly 400 can provide more impedance bandwidth than a single layer patch antenna of comparable thickness.

The top patch element 1102 and the bottom patch element 1104 can each be considered an electrically conductive structure. In some implementations, the top patch element 1102 and the bottom patch element 1104 can comprise sheet metal, PCBs with an electrically conductive coating, and/or the like. The top patch element 1102 can be positioned above the ground plane 1130 with the bottom patch element 1104 positioned therebetween in the orientation of the stacked patch antenna 1100 relative to the ground plane 1130 shown in FIG. 16. A first gap or physical space can be maintained between the top patch element 1102 and the bottom patch element 1104 and a second gap can be maintained between the bottom patch element 1104 and the ground plane 1130. The antenna assembly 100B can include one or more support posts 1108 that extend between the ground plane 1130 and the bottom patch element 1104 and/or between the bottom patch element 1104 and the top patch element 1102. The support posts 1108 can be configured to support the top patch element 1102 and the bottom patch element 1104 and maintain the first and second gaps. The support posts 1108 can extend through the bottom patch element 1104 in some configurations. The support posts 1108 can be non-conductive. For example, the support posts 1108 are configured such that there is not a conductive path between the ground plane 1130 and either to the top patch element 1102 or the bottom patch element 1104 or between the top patch element 1102 and the bottom patch element 1104.

In some implementations, the stacked patch antenna 1100 can include a conductive post 1112. The conductive post 1112 can provide mechanical support for the top patch element 1102 and/or the bottom patch element 1104. The conductive post 1112 can also be electrically connected to the ground plane 1130 and the patch elements 1102, 1104. The gain and bandwidth performance of the stacked patch antenna 1100 will not change in a significant fashion if post 1112 is constructed of non-conductive material.

In the illustrated configuration, the bottom patch element 1104 includes a matching circuit 1106. The matching circuit 1106 can allow for a transmission line 1114 (e.g., a 50 ohm microstrip transmission line) to be matched to the input impedance of the stacked patch antenna 1100. The matching circuit 1106 can be T-shaped. The matching circuit 1106 can extend from the bottom patch element 1104. While a majority of the bottom patch element 1104 may be positioned directly below the top patch element 1102, the matching circuit 1106 may extend outwardly from the bottom patch element 1104 such that the matching circuit 1106 is not positioned directly below the top patch element 1102. The matching circuit 1106 can be mechanically supported by one or more support posts 1110. The one or more support posts 1110 can be configured in a similar manner as the support posts 1108 (e.g., to provide non-conductive mechanical support).

The matching circuit 1106 can be electrically connected to the transmission line 1114 via a feed post 1116. The feed post 1116 provides the electrical connection between the transmission line 1114 and the bottom patch element 1104. In some configurations, the feed post 1116 serves an additional function of providing mechanical support for the matching circuit 1106 in addition to or alternatively to the one or more support posts 1110. The transmission line 1114 can include a junction or attachment point 1118. The attachment point 1118 is where a coaxial cable could attach to the ground plane 1130 to connect the stacked patch antenna 1100 to a radio. The ground plane 1130 can include heat relief sections 1120 in the ground plane 1130 (e.g., in the PCB structure when formed as such) at the attachment point 1118. The transmission line 1114 can extend along the non-conductive side of the ground plane 1130 between the attachment point 1118 and the feed post 1116. In some configurations, the transmission line 1114 could include an impedance transformer or reactive matching components along the transmission line 1114.

In some implementations, any of antenna assemblies described herein can include one or more millimeter wave radios. For example, the one or more millimeter wave radios can form part of the associated multi-element multi-band antenna. FIGS. 18A-18D illustrate four example millimeter wave radios 250A, 250B, 250C, 250D respectively (collectively millimeter wave radios 250), any of which can be included in any antenna assembly described herein (e.g., the antenna assembly 400). While particular reference is made to the antenna assembly 400 and its components, it is recognized that the millimeter wave radios 250 of FIGS. 18A-18D can form part of any of the other antennas assemblies. While four example millimeter wave radios 250 are provided, in other implementations, different or modified millimeter wave radios 250 can be included in the antenna assemblies described herein. The millimeter wave radios 250 can be included in addition to or alternatively to the other antennas included in the antenna assembly 400. The millimeter wave radios 250 can operated in the millimeter wave frequency spectrum (approximately between 30 GHz and 300 GHz), with wavelengths ranging from 1 to 10 millimeters approximately. The millimeter wave radios 250 can be used for high-frequency communication. Including one or more millimeter wave radios 250 can improve or support high data transfer rates of the antenna assembly 400 over short distances. For example, the millimeter wave radios 250 can be configured to transmit large amounts of data, which can be ideal for 5G network applications and high-speed wireless communication for the antenna assembly 400. In some implementations, the millimeter wave radios 250 can be mounted to the first ground plane 412 and/or the third ground plane 415. When one or more of the stacked patch antenna 1100 and/or the multi-band radiator portion 1200 are included in the antenna assembly 400 and coupled to the third ground plane 415, it may be desirable to include one or more millimeter wave radios 250 coupled to the third ground plane 415 as well.

Figure 18A:
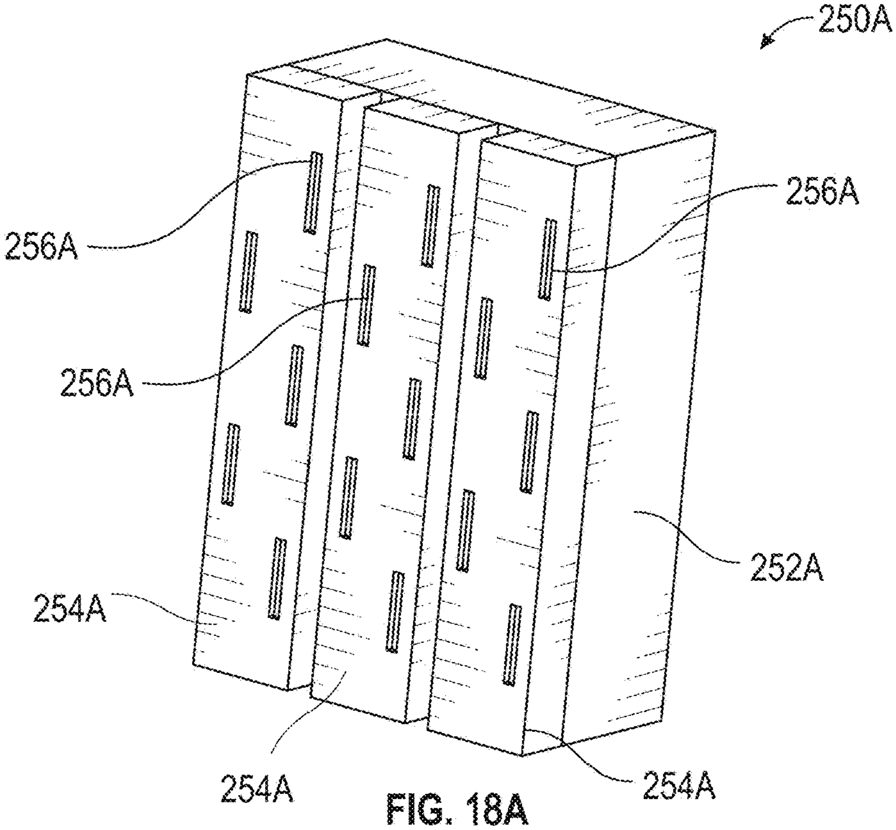
FIGS. 18A-18D illustrate various implementations of millimeter wave radios with their antennas that can be included in the any antenna assembly described herein, in accordance with some aspects of this disclosure.

FIG. 18A illustrates a first example of a millimeter wave radio 250A that can be included in the antenna assembly 400. The millimeter wave radio 250A can be a slotted waveguide array millimeter wave radio. The millimeter wave radio 250A can include a millimeter wave radio 252A and one or more waveguides 254A. In the illustrated example, three waveguides 254A are included. The waveguides 254A can be hollow metallic structures that direct electromagnetic waves. Each waveguide 254A can include slots 256A cut into its surface to allow for controlled radiation. For ease of illustration, not all slots 256A in FIG. 9A are labeled. The waveguides 254A can serve as a conduit for the millimeter-wave signals, efficiently transmitting them along its length with minimal loss. The slots 256A can act as the radiating elements for the millimeter wave radio 250A, emitting the millimeter wave signals. The position and size of the slots 256A can be selected to achieve a highly directional beam. In some implementations, the waveguides 254A can be configured to create an array of slots 256A. Such an array can be used to form a high-gain, highly directional antenna, which can be ideal for focusing energy in a specific direction or scanned along a portion of the horizon, which may be desirable.

Figure 18B:
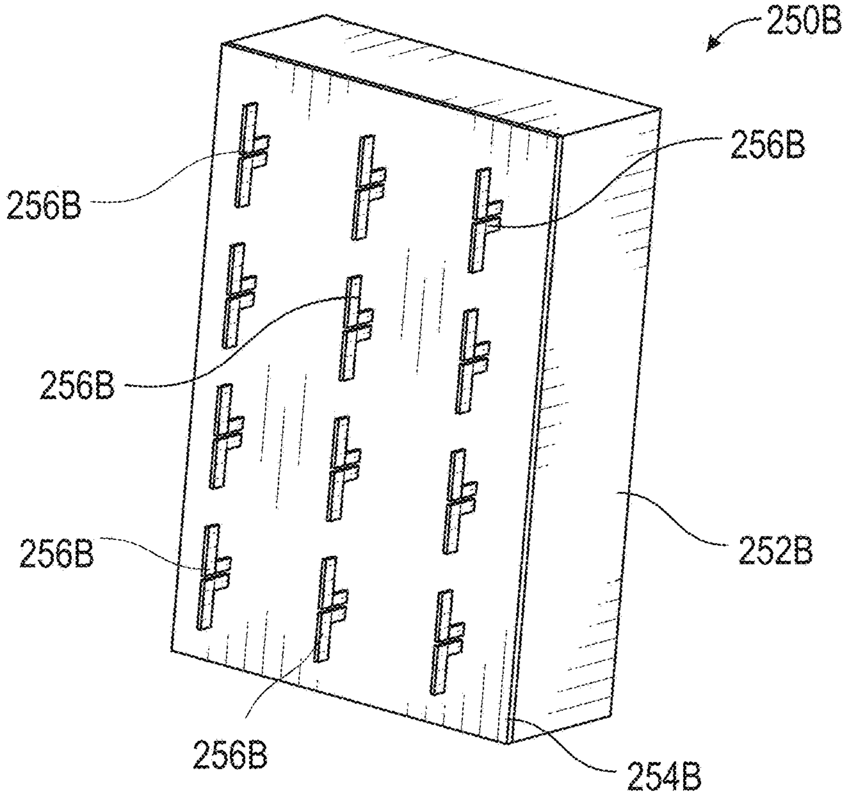

FIG. 18B illustrates a second example of a millimeter wave radio 250B that can be included in the antenna assembly 400. The millimeter wave radio 250B can be a dipole array millimeter wave radio. The millimeter wave radio 250B can include a millimeter wave radio 252B, a microwave grade PCB portion 254B, and a plurality of dipole antennas 256B. The dipole antennas 256B can be arranged in an array on the PCB portion 254B. The PCB portion 254B can include a ground plane (not shown) on its back side (e.g., the side closest to the millimeter wave radio 252B). For ease of illustration, not all of the dipole antennas 256B in FIG. 9B are labeled. The dipole antennas 256B can be substantially smaller compared to other antennas of the antenna assembly 400 because of the short wavelength of the millimeter wave radio 250B. Arranging the dipole antennas 256B in an array can enhance the gain, directivity, and/or beamforming capabilities of the millimeter wave radio 250B. The phase and amplitude of signals fed to each dipole antenna 256B can be selected to focus the energy in a specific direction. For example, highly directional and scannable radiation patterns can be generated by the millimeter wave radio 250B.

Figure 18C:
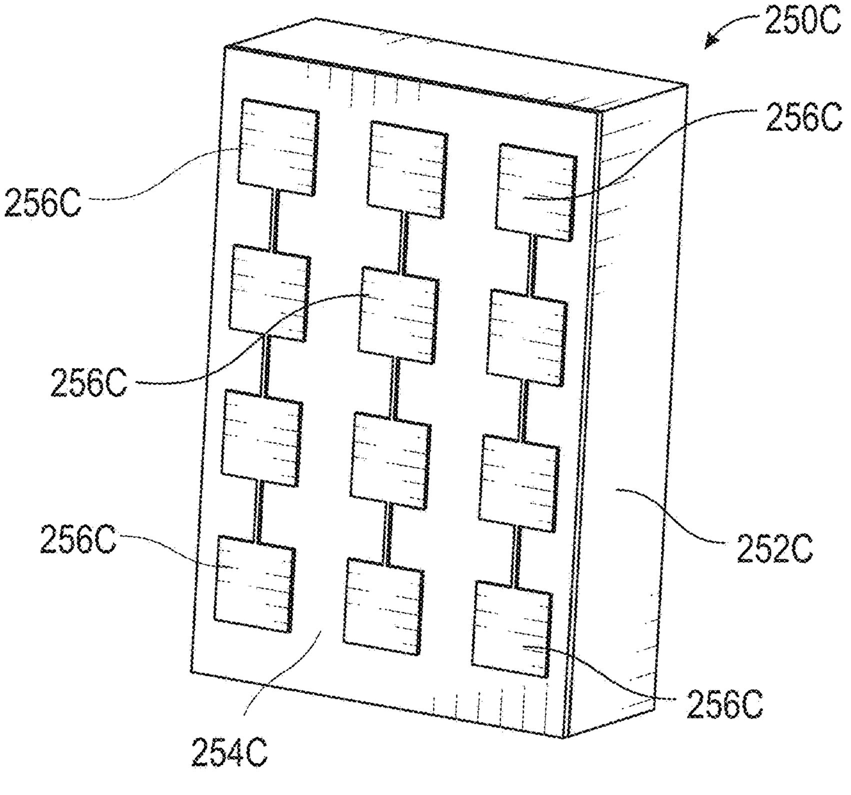

FIG. 18C illustrates a third example of a millimeter wave radio 250C that can be included in the antenna assembly 400. The millimeter wave radio 250C can be a microstrip patch array millimeter wave radio. The millimeter wave radio 250C can include a millimeter wave radio 252C, a microwave grade PCB portion 254C, and a plurality of microstrip patch antennas 256C. The microstrip patch antennas 256C can be flat rectangular antennas comprising a conductive material (e.g., a metal). The microstrip patch antennas 256C can be arranged in an array on the PCB portion 254C. The PCB portion 254C can include a ground plane (not shown) on its back side (e.g., the side closest to the millimeter wave radio 252C). For ease of illustration, not all of the microstrip patch antennas 256C in FIG. 9C are labeled. The microstrip patch antennas 256C can be substantially smaller compared to other antennas of the antenna assembly 400 because of the short wavelength of the millimeter wave radio 250C. Arranging the microstrip patch antennas 256C in an array can enhance the gain, directivity, and/or beamforming capabilities of the millimeter wave radio 250C. The feed network of the microstrip patch antenna array can be controlled to allow for precise beamforming and higher directional accuracy. Alternatively, elements can be individually fed as opposed to serially fed to form a highly scannable array in both azimuth and elevation.

Figure 18D:
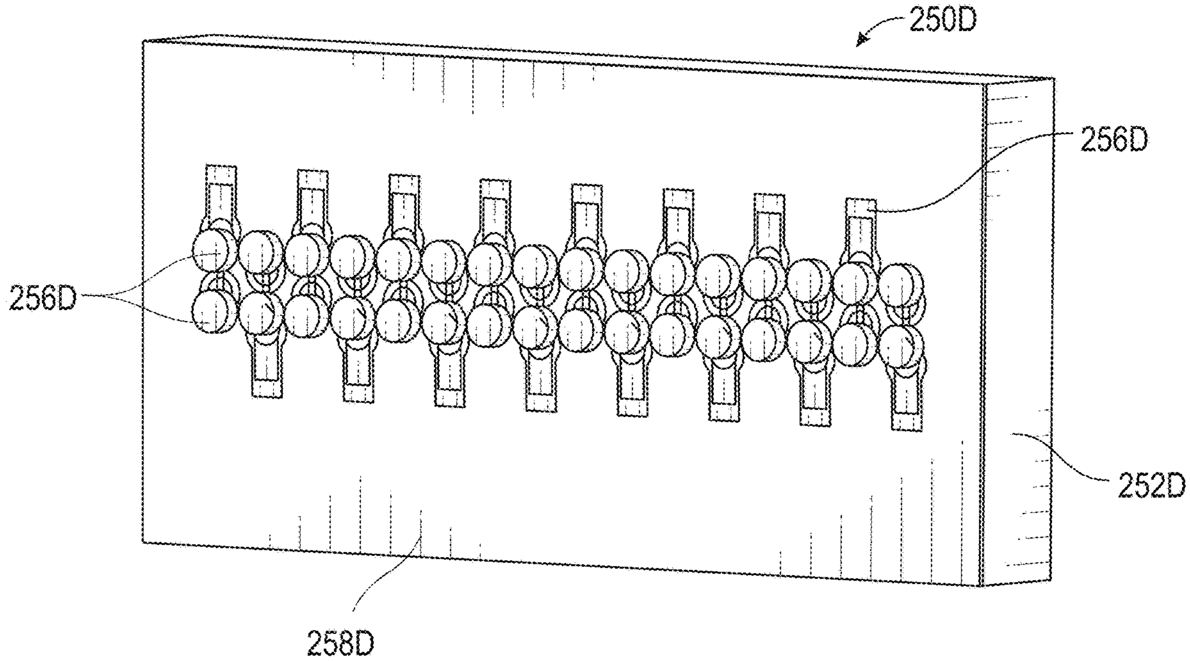

FIG. 18D illustrates a fourth example of a millimeter wave radio 250D that can be included in the antenna assembly 400. The millimeter wave radio 250D can be a coplanar waveguide feed cylindrical dielectric resonator array millimeter wave radio. The millimeter wave radio 250D can include a millimeter wave radio 252D, a microwave grade PCB portion 254D, a plurality of dielectric resonator antennas 256D, and a ground plane 258D. The dielectric resonator antennas 256D can be constructed of a non-metallic materials (e.g., dielectrics) and can be the radiating elements of the millimeter wave radio 250D. The dielectric resonator antennas 256D can be cylindrically shaped, which can help confine and radiate electromagnetic energy effectively at millimeter-wave frequencies. The dielectric resonator antennas 256D can be arranged in an array on the PCB portion 254D. For ease of illustration, not all of the dielectric resonator antennas 256D in FIG. 9D are labeled. The dielectric resonator antennas 256D can be substantially smaller compared to other antennas of the antenna assembly 400 because of the short wavelength of the millimeter wave radio 250D. Arranging the dielectric resonator antennas 256D in an array can enhance the gain, directivity, and/or beamforming capabilities of the millimeter wave radio 250D.

The particular implementations disclosed above are illustrative only, as the application may be modified and practiced in different but equivalent manners apparent to those skilled in the art having the benefit of the teachings herein. It is therefore evident that the particular implementations disclosed above may be altered or modified, and all such variations are considered within the scope and spirit of the application. Accordingly, the protection sought herein is as set forth in the description. It is apparent that an application with significant advantages has been described and illustrated. Although the present application is shown in a limited number of forms, it is not limited to just these forms, but is amenable to various changes and modifications without departing from the spirit thereof.

Example Clauses

Various examples of systems relating to an antenna system are found in the following clauses:

Clause 1. An antenna assembly comprising: a cover defining a first internal volume; a radome defining a second internal volume, the radome coupled to the cover; one or more multi-band radiator portions; and one or more dual-band WiFi radiator portions, wherein the one or more multi-band radiator portions and the one or more dual-band WiFi radiator portions are housed within the second internal volume.

Clause 2. The antenna assembly of clause 1, further comprising a first ground plane and a second ground plane, wherein the first ground plane is enveloped by the radome, wherein the one or more multi-band radiator portions and the one or more dual-band WiFi radiator portions are coupled to the first ground plane.

Clause 3. The antenna assembly of clause 2, wherein the second ground plane is coupled to the first ground plane.

Clause 4. The antenna assembly of clause 2 or clause 3, wherein the second ground plane is orthogonal to the first ground plane.

Clause 5. The antenna assembly of any of clauses 2-4, wherein the second ground plane is housed within the first internal volume.

Clause 6. The antenna assembly of any of clauses 2-4, wherein the second ground plane is coupled to a back side of the cover.

Clause 7. The antenna assembly of any of clauses 2-6, wherein the second ground plane is a heatsink for the antenna assembly.

Clause 8. The antenna assembly of any of clauses 1-7, wherein the cover comprising a body and a door, the door pivotably coupled to the body, wherein the door is configured to move between an open configurations, where the first internal volume is accessible, and a closed configuration, where the first internal volume is sealed.

Clause 9. The antenna assembly of any of clauses 1-8, further comprising an internal modem and a battery.

Clause 10. The antenna assembly of clause 9, wherein at least one of the internal modem and the battery are coupled to the second ground plane.

Clause 11. The antenna assembly of any of clauses 1-10, wherein each multi-band radiator portion of the one or more multi-band radiator portions comprises: a feeding portion; a grounding portion; an upright low band radiation portion; a second low band radiation portion; and a high band radiation portion.

Clause 12. The antenna assembly of any of clauses 11, wherein the second low band radiation portion is not-coplanar with the upright low band radiation portion.

Clause 13. The antenna assembly of any of clauses 11, wherein the second low band radiation portion is coplanar with the upright low band radiation portion.

Clause 14. The antenna assembly of any of clauses 11-13, wherein the high band radiation portion comprises two arms coupled to a base of the upright low band radiation portion.

Clause 15. The antenna assembly of any of clauses 11-13, wherein the high band radiation portion comprises a single arm coupled to a base of the upright low band radiation portion.

Clause 16. The antenna assembly of any of clauses 11-13, wherein the high band radiation portion comprises a plurality of arms coupled to a base of the upright low band radiation portion.

Clause 17. The antenna assembly of any of clauses 11-13, wherein the high band radiation portion comprises a plurality of arms of different lengths coupled to a base of the upright low band radiation portion.

Clause 18. The antenna assembly of any of clauses 11-17, wherein each multi-band radiator portion of the one or more multi-band radiator portions further comprises: a third low band radiation portion coupled to the second low band radiation portion; and a fourth low band radiation portion coupled to the second low band radiation portion and not contacting the third low band radiation portion.

Clause 19. The antenna assembly of clause 18, wherein the third low band radiation portion has a first dimension, wherein the fourth low band radiation portion has a second dimension, and wherein the first dimension and the second dimension are substantially the same.

Clause 20. The antenna assembly of clause 18, wherein the third low band radiation portion has a first dimension, wherein the fourth low band radiation portion has a second dimension, and wherein the first dimension and the second dimension are different.

Clause 21. The antenna assembly of any of clauses 1-20, wherein the one or more multi-band radiator portions comprises two multi-band radiator portions.

Clause 22. The antenna assembly of any of clauses 1-20, wherein the one or more multi-band radiator portions comprises four multi-band radiator portions.

Clause 23. The antenna assembly of any of clauses 1-22, wherein the one or more dual-band WiFi radiator portions comprises two dual-band WiFi radiator portions.

Clause 24. The antenna assembly of any of clauses 1-22, wherein the one or more dual-band WiFi radiator portions comprises five dual-band WiFi radiator portions.

Clause 25. The antenna assembly of any of clauses 2-24, further comprising a GPS radiator portion coupled to the first ground plane.

Clause 26. The antenna assembly of clause 22, wherein the four multi-band radiator portions comprise a first multi-band radiator portion, a second multi-band radiator portion, a third multi-band radiator portion, and a fourth multi-band radiator portion, wherein each multi-band radiator portion has a unique rotational positioned.

Clause 27. The antenna assembly of clause 26, wherein the first multi-band radiator portion extends in a first direction and the second multi-band radiator portion extends in a second direction, the second direction opposite the first direction.

Clause 28. The antenna assembly of clause 27, wherein the third multi-band radiator portion extends in third direction and the fourth multi-band radiator portion extends in a fourth direction, the fourth direction opposite the third direction, the fourth direction different than the first direction and the second direction.

Clause 29. The antenna assembly of any of clauses 26-28, wherein the third multi-band radiator portion and the fourth multi-band radiator portion are positioned between the first multi-band radiator portion and the second multi-band radiator portion.

Clause 30. The antenna assembly of any of clauses 1-29, further comprising a display screen coupled to the cover.

Clause 31. An antenna assembly comprising: a case comprising: a body portion; and a door pivotably coupled to the body portion; a first ground plane coupled to the body portion, the first ground plane dividing the case into a first internal volume and a second internal volume; and a multi-band multi-element antenna comprising: at least one multi-band radiating element coupled to a top side of the first ground plane.

Clause 32. The antenna assembly of clause 31, further comprising a second ground plane and a third ground plane configured to be in contact with the first ground plane.

Clause 33. The antenna assembly of clause 32, wherein the second ground plane is coupled to the body portion within the first internal volume and the third ground plane is coupled to the door.

Clause 34. The antenna assembly of clause 32 or clause 33, wherein the second ground plane and the third ground plane are substantially orthogonal to a top side of the first ground plane.

Clause 35. The antenna assembly of clause 33 or clause 34, wherein the door is configured to move between an open configuration, where the first internal volume is accessible, and a closed configuration, where the first internal volume is sealed.

Clause 36. The antenna assembly of clause 35, wherein the third ground plane is configured to contact the first ground plane when the door is moved from the open configuration to the closed configuration.

Clause 37. The antenna assembly of clause 36, further comprising one or more compressible contact portions coupled to the first ground plane, wherein the one or more compressible contact portions contact both the first ground plane and the third ground plane when the door is in the closed configuration.

Clause 38. The antenna assembly of clause 37, wherein the one or more compressible contact portions comprise foam portions covered in a conductive fabric.

Clause 39. The antenna assembly of any of clauses 31-38, wherein the case further comprising an inlet vent and an exhaust vent, the inlet vent configured to allow fluid to enter the first internal volume, the exhaust vent configured to allow fluid to exit the first internal volume.

Clause 40. The antenna assembly of clause 39, wherein the case further comprises a first rain hood extending over the inlet vent and a second rain hood extending over the exhaust vent.

Clause 41. The antenna assembly of any of clauses 32-40, wherein the second ground plane is configured to act as a heatsink for the antenna assembly.

Clause 42. The antenna assembly of any of clauses 31-41, further comprising an internal modem and a battery housed within the first internal volume.

Clause 43. The antenna assembly of any of clauses 31-42, wherein the at least one multi-band radiating element comprises: a feeding portion; a grounding portion; an upright low band radiation portion; a second low band radiation portion; and a high band radiation portion.

Clause 44. The antenna assembly of any of clauses 43, wherein the second low band radiation portion is not-coplanar with the upright low band radiation portion.

Clause 45. The antenna assembly of any of clauses 43, wherein the second low band radiation portion is coplanar with the upright low band radiation portion.

Clause 46. The antenna assembly of any of clauses 43-45, wherein the high band radiation portion comprises two arms coupled to a base of the upright low band radiation portion.

Clause 47. The antenna assembly of any of clauses 43-45, wherein the high band radiation portion comprises a single arm coupled to a base of the upright low band radiation portion.

Clause 48. The antenna assembly of any of clauses 43-45, wherein the high band radiation portion comprises a plurality of arms coupled to a base of the upright low band radiation portion.

Clause 49. The antenna assembly of any of clauses 31 to 42, wherein the at least one multi-band radiating element comprises: a conductive sheet having a body portion with a front face, a head portion, a first left arm, and a first right arm; wherein the head portion angularly extends from the body portion; wherein the first left arm angularly extends from the body portion and the first right arm angularly extends from the body portion; and wherein the front face is configured as a first resonating component, the head portion is configured as a second resonating component, the first left arm is configured as a third resonating component, and the first right arm is configured a fourth resonating component.

Clause 50. The antenna assembly of clause 49, wherein at least one of the respective first, second, third, and fourth resonating components is configured to resonate within a low frequency band of between 600 MHz and 700 MHz during use and at least one of the respective first, second, third, and fourth resonating components is configured to resonate within a high frequency band of between 2.7 GHz and 6.0 GHz during use.

Clause 51. The antenna assembly of clause 49 or clause 50, further comprising a second left arm that extends from the body portion and a second right arm that extends from the body portion.

Clause 52. The antenna assembly of clause 51, wherein the second left arm and the second right arm are coplanar to the front face.

Clause 53. The antenna assembly of any of clauses 49-52, wherein the body portion further comprises one or more slots configured to receive projections of an antenna connection.

Clause 54. The antenna assembly of any of clauses 49-53, wherein the conductive sheet has a thickness at or within 0.01 to 0.03 inches.

Clause 55. The antenna assembly of any of clauses 49-54, wherein the head portion is configured to angularly extend from the body portion at an angle at or within 89-91 degrees.

Clause 56. The antenna assembly of any of clauses 49-55, wherein the first left arm angularly extends from a left side of the body portion at an angle at or within 79-81 degrees.

Clause 57. The antenna assembly of any of clauses 49-56, wherein the first right arm angularly extends from a left side of the body portion at an angle at or within 79-81 degrees.

Clause 58. The antenna assembly of any of clauses 49-57, wherein at least one of the respective first and second resonating components is configured to resonate within a low frequency band of between 600 MHz and 700 MHz during use.

Clause 59. The antenna assembly of any of clauses 49-58, wherein at least one of the respective third and fourth resonating components is configured to resonate within a high frequency band of between 2.7 GHZ and 6.0 GHz during use.

Clause 60. The antenna assembly of any of clauses 49-59, further comprising a ground aperture located along a symmetry line of the body portion and configured to be electrically coupled to a ground reference.

Clause 61. The antenna assembly of any of clauses 49-60, further comprising a first set of apertures on the head portion and located proximate to an upper edge of the body portion.

Clause 62. The antenna assembly of any of clauses 49-61, wherein the first left arm comprises a first left arm portion and a second left arm portion and the first right arm comprises a first right arm portion and a second right arm portion, wherein the first left arm portion is coupled to the front face and the second left arm portion extends from the first right arm portion, wherein the first right arm portion is coupled to the front face and the second right arm portion extends from the first right arm portion.

Clause 63. The antenna assembly of clause 62, wherein the first right arm portion has a varying width along a length of the first right arm portion and the first left arm portion has a varying width along a length of the first left arm portion.

Clause 64. The antenna assembly of clause 62 or clause 63, wherein the second left arm portion has a consistent width along a length of the second left arm portion and the second right arm portion has a consistent width along a length of the second right arm portion.

Clause 65. The antenna assembly of any of clauses 31-64, wherein the at least one multi-band radiating element comprises between two and six multi-band radiating elements.

Clause 66. The antenna assembly of any of clauses 31-42, wherein the at least one multi-band radiating element comprises multi-band antenna defined by any of clauses 106 to 130.

Clause 67. The antenna assembly of any of clauses 31-42, wherein the at least one multi-band radiating element comprises the multi-band antenna defined by any of clauses 131 to 155.

Clause 68. The antenna assembly of any of clauses 31-67, wherein the multi-band multi-element antenna further comprises at least one dual-band WiFi radiator portion.

Clause 69. The antenna assembly of clause 68, wherein the at least one dual-band WiFi radiator portion comprises between two and eight dual-band WiFi radiator portions.

Clause 70. The antenna assembly of any of clauses 31-64, wherein the at least one multi-band radiating element comprises a first multi-band radiator portion, a second multi-band radiator portion, a third multi-band radiator portion, and a fourth multi-band radiator portion, wherein each multi-band radiator portion has a unique rotational positioned.

Clause 71. The antenna assembly of clause 70, wherein the first multi-band radiator portion extends in a first direction and the second multi-band radiator portion extends in a second direction, the second direction opposite the first direction.

Clause 72. The antenna assembly of clause 71, wherein the third multi-band radiator portion extends in third direction and the fourth multi-band radiator portion extends in a fourth direction, the fourth direction opposite the third direction, the fourth direction different than the first direction and the second direction.

Clause 73. The antenna assembly of any of clauses 70-72, wherein the third multi-band radiator portion and the fourth multi-band radiator portion are positioned between the first multi-band radiator portion and the second multi-band radiator portion.

Clause 74. The antenna assembly of any of clauses 31-67, wherein the multi-band multi-element antenna further comprises at least one second radiating element comprising a conductive portion formed on a PCB portion.

Clause 75. The antenna assembly of clause 74, wherein the conductive portion has a generally rectangular shape and extends to a feed point at a bottom of the conductive portion.

Clause 76. The antenna assembly of clause 74, wherein the conductive portion comprises: a central conductive portion being generally T-shaped; a first arm; and a second arm.

Clause 77. The antenna assembly of clause 76, wherein the central conductive portion is configured to resonate within a mid-frequency band of between 2.4 GHz and 2.5 GHz during use and the first arm and second arm are configured to resonate within a Wi-Fi-frequency band of between 4.8 GHz and 7.25 GHz during use.

Clause 78. The antenna assembly of any of clauses 74 to 77, wherein the at least one second radiating elements are configured as multi-band Wi-Fi radios and are configured for operation at frequencies above 1 GHz.

Clause 79. The antenna assembly of clause 31, wherein the at least one multi-band radiating element comprises: one or more first radiating elements; and one or more second radiating elements.

Clause 80. The antenna assembly, according to any one or more of the clauses herein, wherein the first radiating elements comprise monopole antennas and/or the second radiating elements comprise inverted F antennas.

Clause 81. The antenna assembly, according to any one or more of the clauses herein, wherein the multi-element multi-band antenna is configured and adapted to have an operating frequency range of between about 450 MHz to about 8 GHz when used in conjunction with high order electromagnetic modes generated or received by a transceiver and/or a receiver.

Clause 82. The antenna assembly, according to any one or more of the clauses herein, wherein the one or more first radiating elements can be configured and adapted to be used for communication between about 1 GHz to about 8 GHz.

Clause 83. The antenna assembly, according to any one or more of the clauses herein, wherein the one or more second radiating elements can be configured and adapted to be used for communication between about 450 MHz to about 8 GHz.

Clause 84. The antenna assembly, according to any one or more of the clauses herein, wherein the one or more first radiating elements comprise four first radiating elements.

Clause 85. The antenna assembly, according to any one or more of the clauses herein, wherein the one or more second radiating elements comprise four second radiating elements.

Clause 86. The antenna assembly, according to any one or more of the clauses herein, wherein the one or more first radiating elements and/or the one or more second radiating elements are constructed from one or more types of PCB material.

Clause 87. The antenna assembly, according to any one or more of the clauses herein, wherein the one or more first radiating elements and/or the one or more second radiating elements are constructed from sheet metal.

Clause 88. The antenna assembly, according to any one or more of the clauses herein, further comprising: a radome; a base; and an internal ground plane, wherein the multi-element multi-band antenna is positioned between the radome and the internal ground plane.

Clause 89. The antenna assembly, according to any one or more of the clauses herein, further comprising a GPS antenna.

Clause 90. The antenna assembly, according to any one or more of the clauses herein, wherein the one or more first radiating elements are configured for WiFi and/or Bluetooth operations.

Clause 91. The antenna assembly, according to any one or more of the clauses herein, wherein each of the one or more second radiating elements comprises a radiating portion coupled to a ground portion.

Clause 92. The antenna assembly, according to any one or more of the clauses herein, wherein the radiating portion comprises: one or more low band radiating portions; and one or more high band radiating portions.

Clause 93. The antenna assembly, according to any one or more of the clauses herein, wherein the one or more low band radiating portions comprise an upright radiating portion and a head radiating portion.

Clause 94. The antenna assembly, according to any one or more of the clauses herein, wherein the head radiating portion extends orthogonally from the upright radiating portion.

Clause 95. The antenna assembly, according to any one or more of the clauses herein, wherein the one or more high band radiating portions comprise arms extending from the upright radiating portion.

Clause 96. The antenna assembly, according to any one or more of the clauses herein, wherein the one or more high band radiating portions comprise a left arm and a right arm.

Clause 97. The antenna assembly, according to any one or more of the clauses herein, wherein the left arm comprises a first left arm portion and a second left arm portion, the first left arm portion extending from the upright radiating portion, the second left arm portion extending from the first left arm portion.

Clause 98. The antenna assembly, according to any one or more of the clauses herein, wherein the second left arm portion extends substantially vertically from the first left arm portion relative to the internal ground plane.

Clause 99. The antenna assembly, according to any one or more of the clauses herein, wherein the right arm comprises a first right arm portion and a second right arm portion, the first right arm portion extending from the upright radiating portion, the second right arm portion extending from the first right arm portion.

Clause 100. The antenna assembly, according to any one or more of the clauses herein, wherein the second right arm portion extends substantially vertically from the first right arm portion relative to the internal ground plane.

Clause 101. The antenna assembly, according to any one or more of the clauses herein, wherein the left arm portion and right arm portion are coupled to the upright radiating portion by one or more connecting portions.

Clause 102. The antenna assembly, according to any one or more of the clauses herein, wherein the upright radiating portion has a greater height than width.

Clause 103. The antenna assembly, according to any one or more of the clauses herein, wherein the upright radiating portion has a height to width ratio of 2:1 or greater.

Clause 104. The antenna assembly, according to any one or more of the clauses herein, wherein the upright radiating portion includes one or more mounting features, the one or more mounting features configured to allow the upright radiating portion to be coupled to the internal ground plane.

Clause 105. The antenna assembly, according to any one or more of the clauses herein, wherein the upright radiating portion includes a slot, the slot configured to receive a mounting feature of the grounding portion.

Clause 106. A multi-band antenna comprising a radiating element, the radiating element comprising: an upright portion configured for low-band radiation; a head portion extending from a top edge of the upright portion, the head portion configured for low-band radiation; one or more first arms extending from the upright portion, the one or more first arms configured for mid-band radiation; and one or more second arms extending from the upright portion, the one or more second arms configured for C-band radiation.

Clause 107. The multi-band antenna of clause 106, wherein the multi-band antenna is formed from a conductive sheet comprising the upright portion, the head portion, the one or more first arms, and the one or more second arms.

Clause 108. The multi-band antenna of clause 106, wherein the multi-band antenna is formed of one or more PCB portions, the one or more PCB portions comprising the upright portion, the head portion, the one or more first arms, and the one or more second arms.

Clause 109. The multi-band antenna of any of clauses 106 to 108, wherein the head portion extends angularly from the upright portion.

Clause 110. The multi-band antenna of clause 109, wherein the head portion extends from the upright portion at an angle at or within 89-91 degrees.

Clause 111. The multi-band antenna of any of clauses 106 to 110, wherein the one or more first arms extend angularly from the upright portion.

Clause 112. The multi-band antenna of any of clauses 106 to 111, wherein the one or more first arms comprise a first left arm that extends from a left side of the upright portion and a first right arm that extends from a right side of the upright portion.

Clause 113. The multi-band antenna of clause 112, wherein the first left arm comprises a first left arm portion extending from the left side of the upright portion and a second left arm portion extending from the first left arm portion, and the first right arm comprises a first right arm portion extending from the right side of the upright portion and a second right arm portion extending from the first right arm portion.

Clause 114. The multi-band antenna of clause 113, wherein the first right arm portion has a varying width along a length of the first right arm portion and the first left arm portion has a varying width along a length of the first left arm portion.

Clause 115. The multi-band antenna of clause 113 or clause 114, wherein the second left arm portion has a consistent width along a length of the second left arm portion and the second right arm portion has a consistent width along a length of the second right arm portion.

Clause 116. The multi-band antenna of any of clauses 113 to 115, wherein the second left arm portion and the second right arm portion are substantially orthogonal to the upright portion.

Clause 117. The multi-band antenna of any of clauses 106 to 116, wherein the one or more second arms comprise a second left arm that extends from a left side of the upright portion and a second right arm that extends from a right side of the upright portion.

Clause 118. The multi-band antenna of clause 117, wherein the second left arm and the second right arm are coplanar with the upright portion.

Clause 119. The multi-band antenna of any of clauses 106 to 118, wherein the one or more second arms are positioned on the upright portion between the head portion and the one or more first arms.

Clause 120. The multi-band antenna of any of clauses 106 to 119, wherein the upright portion comprises one or more slots configured to receive projection of a ground connection.

Clause 121. The multi-band antenna of any of clauses 106 to 120, further comprising a feed point extending from a bottom edge of the upright portion.

Clause 122. The multi-band antenna of any of clauses 106 to 121, wherein the head portion further comprises a first set of apertures located proximate to the top edge of the upright portion.

Clause 123. The multi-band antenna of any of clauses 106 to 122, further comprising one or more additional low-band portions extending from the head portion or the upright portion and configured for low-band radiation.

Clause 124. The multi-band antenna of any of clauses 106 to 123, wherein at least one of the upright portion and the head portion is configured to have multiple resonances that are odd multiples of a lowest low-band resonance.

Clause 125. The multi-band antenna of any of clauses 106 to 124, wherein at least one of the one or more first arms and the one or more second arms is configured to have multiple resonances that are even multiples of a lowest low-band resonance.

Clause 126. The multi-band antenna of any of clauses 106 to 125, further comprising a ground connection, the ground connection comprising: a face plate configured to be coupled to a ground reference; a body portion configured to be coupled to the upright portion; and an arm portion extending between the face plate and the body portion.

Clause 127. The multi-band antenna of clause 126, wherein the body portion further comprises one or more tabs, the one or more tabs configured to be received within slots of the upright portion to electrically connect the ground connection to the radiating element.

Clause 128. The multi-band antenna of clause 127, wherein the one or more tabs are configured to be twisted once received within the slots of the upright portion to mechanically connect the ground connection to the radiating element.

Clause 129. The multi-band antenna of any of clauses 126 to 128, wherein the arm portion has a smaller width than the body portion.

Clause 130. The multi-band antenna of any of clauses 126 to 129, wherein the arm portion extends from one side of a back side of the body portion such that a coaxial cable can extend past the arm portion and under the body portion when the coaxial cable is coupled to the radiating element.

Clause 131. A multi-band antenna comprising: an upright portion configured as a first resonating component; a head portion extending angularly from the upright portion, the head portion configured as a second resonating component; a first left arm extending from a left edge of the upright portion, the first left arm configured as a third resonating component; a first right arm extending from a right edge of the upright portion, the first right arm configured as a fourth resonating component; a second left arm extending from the left edge of the upright portion, the second left arm configured as a fifth resonating component; and a second right arm extending from the right edge of the upright portion, the second right arm configured as a sixth resonating component.

Clause 132. The multi-band antenna of clause 131, wherein the first resonating component and the second resonating component are configured to resonate within a low-frequency band of between 600 MHz and 900 MHz during use.

Clause 133. The multi-band antenna of clause 131 or clause 132, wherein the third resonating component and the fourth resonating component are configured to resonate within a mid-frequency band of between 1.7 GHZ and 2.7 GHz during use.

Clause 134. The multi-band antenna of any of clauses 131 to 133, wherein the fifth resonating component and the sixth resonating component are configured to resonate within a CBRS-frequency band of between 3.4 GHz and 4.2 GHz during use.

Clause 135. The multi-band antenna of any of clauses 131 to 134, wherein the multi-band antenna is formed from a conductive sheet comprising the upright portion, the head portion, the first left arm, the first right arm, the second left arm, and the second right arm.

Clause 136. The multi-band antenna of any of clauses 131 to 135, wherein the multi-band antenna is formed of one or more PCB portions, the one or more PCB portions comprising the upright portion, the head portion, the first left arm, the first right arm, the second left arm, and the second right arm.

Clause 137. The multi-band antenna of any of clauses 131 to 136, wherein the head portion extends from the upright portion at an angle at or within 89-91 degrees.

Clause 138. The multi-band antenna of any of clauses 131 to 137, wherein the first left arm and the first right arm extend angularly from the upright portion.

Clause 139. The multi-band antenna of any of clauses 131 to 138, wherein the first left arm comprises a first left arm portion extending from the left edge of the upright portion and a second left arm portion extending from the first left arm portion, and the first right arm comprises a first right arm portion extending from the right edge of the upright portion and a second right arm portion extending from the first right arm portion.

Clause 140. The multi-band antenna of clause 139, wherein the first right arm portion has a varying width along a length of the first right arm portion and the first left arm portion has a varying width along a length of the first left arm portion.

Clause 141. The multi-band antenna of clause 139 or clause 140, wherein the second left arm portion has a consistent width along a length of the second left arm portion and the second right arm portion has a consistent width along a length of the second right arm portion.

Clause 142. The multi-band antenna of any of clauses 139 to 141, wherein the second left arm portion and the second right arm portion are substantially orthogonal to the upright portion.

Clause 143. The multi-band antenna of any of clauses 131 to 142, wherein the second left arm and the second right arm are coplanar with the upright portion.

Clause 144. The multi-band antenna of any of clauses 131 to 143, wherein the second left arm and the second right arm are positioned on the upright portion between the head portion and the first left arm and the first right arm.

Clause 145. The multi-band antenna of any of clauses 131 to 144, wherein the upright portion comprises one or more slots configured to receive projection of a ground connection.

Clause 146. The multi-band antenna of any of clauses 131 to 145, further comprising a feed point extending from a bottom edge of the upright portion.

Clause 147. The multi-band antenna of any of clauses 131 to 146, wherein the head portion further comprises a first set of apertures located proximate to a top edge of the upright portion.

Clause 148. The multi-band antenna of any of clauses 131 to 147, further comprising one or more additional low-band portions extending from the head portion or the upright portion and configured for low-band radiation.

Clause 149. The multi-band antenna of any of clauses 131 to 148, wherein at least one of the upright portion and the head portion is configured to have multiple resonances that are odd multiples of a lowest low-band resonance.

Clause 150. The multi-band antenna of any of clauses 131 to 149, wherein at least one of the first left arm, the first right arm, the second left arm, and the second right arm is configured to have multiple resonances that are even multiples of a lowest low-band resonance.

Clause 151. The multi-band antenna of any of clauses 131 to 150, further comprising a ground connection, the ground connection comprising: a face plate configured to be coupled to a ground reference; a body portion configured to be coupled to the upright portion; and an arm portion extending between the face plate and the body portion.

Clause 152. The multi-band antenna of clause 151, wherein the body portion further comprises one or more tabs, the one or more tabs configured to be received within slots of the upright portion to electrically connect the ground connection to the upright portion.

Clause 153. The multi-band antenna of clause 152, wherein the one or more tabs are configured to be twisted once received within the slots of the upright portion to mechanically connect the ground connection to the upright portion.

Clause 154. The multi-band antenna of any of clauses 151 to 153, wherein the arm portion has a smaller width than the body portion.

Clause 155. The multi-band antenna of any of clauses 151 to 154, wherein the arm portion extends from one side of a back side of the body portion such that a coaxial cable can extend past the arm portion and under the body portion when the coaxial cable is coupled to the upright portion.

Clause 156. The antenna assembly, according to any one or more of the clauses herein, further comprising one or more multi-band antenna defined by any of clauses 106 to 130 or defined by any of clauses 131 to 155.

Clause 157. The antenna assembly according to any one or more of the clauses herein, further comprising one or more millimeter wave radios configured for operation at frequencies between 30 GHz and 300 GHz.

Clause 158. The antenna assembly of clause 157, wherein the one or more millimeter wave radios comprise slotted waveguide array millimeter wave radios, dipole array millimeter wave radios, microstrip patch array millimeter wave radios, or coplanar waveguide feed cylindrical dielectric resonator array millimeter wave radios.

Clause 159. An antenna system, comprising: a multi-element multi-band antenna.

Clause 160. The antenna system, according to any one or more of the clauses herein, wherein the multi-element multi-band antenna comprises: one or more first radiating elements; and one or more second radiating elements.

Clause 161. The antenna system, according to any one or more of the clauses herein, wherein the first radiating elements comprise monopole antennas and/or the second radiating elements comprise inverted F antennas.

Clause 162. The antenna system, according to any one or more of the clauses herein, wherein the multi-element multi-band antenna is configured and adapted to have an operating frequency range of between about 450 MHz to about 8 GHz when used in conjunction with high order electromagnetic modes generated or received by a transceiver and/or a receiver.

Clause 163. The antenna system, according to any one or more of the clauses herein, wherein the one or more first radiating elements can be configured and adapted to be used for communication between about 1 GHz to about 8 GHz.

Clause 164. The antenna system, according to any one or more of the clauses herein, wherein the one or more second radiating elements can be configured and adapted to be used for communication between about 450 MHz to about 8 GHz.

Clause 165. The antenna system, according to any one or more of the clauses herein, wherein the one or more first radiating elements comprise four first radiating elements.

Clause 166. The antenna system, according to any one or more of the clauses herein, wherein the one or more second radiating elements comprise four second radiating elements.

Clause 167. The antenna system, according to any one or more of the clauses herein, wherein the one or more first radiating elements and/or the one or more second radiating elements are constructed from one or more types of PCB material.

Clause 168. The antenna system, according to any one or more of the clauses herein, wherein the one or more first radiating elements and/or the one or more second radiating elements are constructed from sheet metal.

Clause 169. The antenna system, according to any one or more of the clauses herein, further comprising: a radome; and an internal ground plane, wherein the multi-element multi-band antenna is positioned between the radome and the internal ground plane.

Clause 170. The antenna system, according to any one or more of the clauses herein, further comprising a GPS antenna.

Clause 171. The antenna system, according to any one or more of the clauses herein, wherein the one or more first radiating elements are configured for WiFi and/or Bluetooth operations.

Clause 172. The antenna system, according to any one or more of the clauses herein, wherein each of the one or more second radiating elements comprises a radiating portion coupled to a ground portion.

Clause 173. The antenna system, according to any one or more of the clauses herein, wherein the radiating portion comprises: one or more low band radiating portions; and one or more high band radiating portions.

Clause 174. The antenna system, according to any one or more of the clauses herein, wherein the one or more low band radiating portions comprise an upright radiating portion and a head radiating portion.

Clause 175. The antenna system, according to any one or more of the clauses herein, wherein the head radiating portion extends orthogonally from the upright radiating portion.

Clause 176. The antenna system, according to any one or more of the clauses herein, wherein the one or more high band radiating portions comprise arms extending from the upright radiating portion.

Clause 177. The antenna system, according to any one or more of the clauses herein, wherein the one or more high band radiating portions comprise a left arm and a right arm.

Clause 178. The antenna system, according to any one or more of the clauses herein, wherein the left arm comprises a first left arm portion and a second left arm portion, the first left arm portion extending from the upright radiating portion, the second left arm portion extending from the first left arm portion.

Clause 179. The antenna system, according to any one or more of the clauses herein, wherein the second left arm portion extends substantially vertically from the first left arm portion relative to the internal ground plane.

Clause 180. The antenna system, according to any one or more of the clauses herein, wherein the right arm comprises a first right arm portion and a second right arm portion, the first right arm portion extending from the upright radiating portion, the second right arm portion extending from the first right arm portion.

Clause 181. The antenna system, according to any one or more of the clauses herein, wherein the second right arm portion extends substantially vertically from the first right arm portion relative to the internal ground plane.

Clause 182. The antenna system, according to any one or more of the clauses herein, wherein the left arm portion and right arm portion are coupled to the upright radiating portion by one or more connecting portions.

Clause 183. The antenna system, according to any one or more of the clauses herein, wherein the upright radiating portion has a greater height than width.

Clause 184. The antenna system, according to any one or more of the clauses herein, wherein the upright radiating portion has a height to width ratio of 2:1 or greater.

Clause 185. The antenna system, according to any one or more of the clauses herein, wherein the upright radiating portion includes one or more mounting features, the one or more mounting features configured to allow the upright radiating portion to be coupled to the internal ground plane.

Clause 186. The antenna system, according to any one or more of the clauses herein, wherein the upright radiating portion includes a slot, the slot configured to receive a mounting feature of the grounding portion.

Clause 187. An antenna assembly, comprising: a multi-element multi-band antenna coupled to a ground plane; and a plurality of impedance matching components coupled to one or more portions of the multi-element multi-band antenna and the ground plane.

Clause 188. The antenna assembly, according to any one or more of the clauses herein, wherein the multi-element multi-band antenna includes one or more radiating elements, each radiating element comprising an upright portion, a low band radiator portion, and one or more high band portions.

Clause 189. The antenna assembly, according to any one or more of the clauses herein, wherein a first high band portion of one or more high band portions is coupled to a connecting portion extending from the upright portion.

Clause 190. The antenna assembly, according to any one or more of the clauses herein, wherein the connecting portion extends at a first angle from the upright portion, and wherein the first high band portion extends from the connecting portion in a substantially parallel direction relative to the ground plane.

Clause 191. The antenna assembly, according to any one or more of the clauses herein, wherein each impedance matching component of the one or more impedance matching components is coupled to the upright portion and the ground plane, wherein the impedance matching component is positioned substantially perpendicular to the ground plane.

Clause 192. The antenna assembly, according to any one or more of the clauses herein, wherein the antenna assembly may be configured to produce a radiation pattern perpendicular to the ground plane.

Clause 193. The antenna assembly, according to any one or more of the clauses herein, wherein a radiation pattern of the antenna assembly is either omni-directional or directional when the antenna assembly is configured in accordance with a desired radiation performance criterion.

Clause 194. The antenna assembly, according to any one or more of the clauses herein, wherein the multi-element multi-band antenna comprises at least one inverted F antenna.

Clause 195. The antenna assembly, according to any one or more of the clauses herein, wherein the antenna assembly is configured and adapted to have an operating frequency range of between about 450 MHz to about 8 GHz when used in conjunction with high order electromagnetic modes generated or received by a transceiver and/or a receiver.

Clause 196. The antenna assembly, according to any one or more of the clauses herein, wherein the one or more high band portions can be configured and adapted to be used for communication between about 1 GHz to about 8 GHz.

Clause 197. The antenna assembly, according to any one or more of the clauses herein, wherein the multi-element multi-band antenna can be configured and adapted to be used for communication between about 450 MHz to about 8 GHz.

Clause 198. The antenna assembly, according to any one or more of the clauses herein, wherein the one or more high band portions comprises two high band portions.

Clause 199. The antenna assembly, according to any one or more of the clauses herein, wherein at least some of the multi-element multi-band antenna are constructed of one or more types of PCB material.

Clause 200. The antenna assembly, according to any one or more of the clauses herein, wherein the multi-element multi-band antenna is constructed substantially from sheet metal.

Clause 201. The antenna assembly, according to any one or more of the clauses herein, wherein the low band radiator portion extends substantially perpendicular from the upright portion.

Clause 202. The antenna assembly, according to any one or more of the clauses herein, wherein the upright portion has a greater width than height.

Clause 203. The antenna assembly, according to any one or more of the clauses herein, wherein the upright portion has a width to height ratio of 2:1 or greater.

Clause 204. The antenna assembly, according to any one or more of the clauses herein, wherein the upright portion includes one or more mounting features, the one or more mounting features configured to allow the upright portion to be coupled to the ground plane.

Clause 205. The antenna assembly, according to any one or more of the clauses herein, wherein the upright portion includes a slot, the slot configured to receive the impedance matching component.

Clause 206. The antenna assembly, according to any one or more of the clauses herein, wherein a first radiating element of the one or more radiating elements is rotated at least 15-degrees from a second radiating element of the one or more radiating elements.

Clause 207. An antenna comprising: a ground plane; and one or more multi-band radiating elements electrically connected to the ground plane.

Clause 208. The antenna of clause 207, wherein the one or more multi-band radiating elements comprise a first radiating element, a second radiating element, a third radiating element, and a fourth radiating element.

Clause 209. The antenna of clause 208, wherein each of the first radiating element, the second radiating element, the third radiating element, and the fourth radiating element comprise a three-dimensional radiator portion and a grounding portion.

Clause 210. The antenna of clause 208 or clause 209, wherein the first radiating element is arrayed with the second radiating element to form a first element pair and the third radiating element is arrayed with the fourth radiating element to form a second element pair.

Clause 211. The antenna of clause 208, wherein the first radiating element and the second radiating element are arrayed other.

Clause 212. The antenna assembly, according to any one or more of the clauses herein, further comprising a stacked patch antenna.

Clause 213. The antenna assembly of clause 212, wherein the stacked patch antenna comprises: a bottom patch element positioned above a ground plane with a first gap therebetween; and a top patch element positioned above the bottom patch element with a second gap therebetween.

Clause 214. The antenna assembly of clause 213, further comprising one or more support posts positioned between the ground plane and the bottom patch element, the one or more support posts supporting the bottom patch element above the ground plane.

Clause 215. The antenna assembly of clause 214, wherein the one or more support posts extend through the bottom patch element to support the top patch element above the bottom patch element.

Clause 216. The antenna assembly of clause 214 or clause 215, wherein the one or more support posts comprise a non-conductive material.

Clause 217. The antenna assembly of any of clauses 213 to 216, wherein the bottom patch element further comprises a bottom plate and a matching circuit, the matching circuit extending from the bottom plate in a plane defined by the bottom plate.

Clause 218. The antenna assembly of clause 217, wherein the matching circuit is T-shaped.

Clause 219. The antenna assembly of clause 217 or clause 218, wherein the ground plane comprises a microstrip transmission line extending from an attachment point to a feed post, the feed post comprising a conductive material, the feed post electrically connecting the matching circuit to the microstrip transmission line.

Clause 220. The antenna assembly of clause 219, wherein the attachment point is configured to allow a coaxial cable to connect the stacked patch antenna to a radio.

Clause 221. The antenna assembly of any of clauses 213 to 220, further comprising a conductive post, the conductive post extending between the ground plane and the top patch element through the bottom patch element, the conductive post electrically connecting the ground plane to the top patch element and the bottom patch element.

Additional Considerations and Terminology

Features, materials, characteristics, or groups described in conjunction with a particular aspect, implementation, or example are to be understood to be applicable to any other aspect, implementation or example described herein unless incompatible therewith. All of the features disclosed in this specification (including any accompanying claims, abstract and drawings), or all of the steps of any method or process so disclosed, may be combined in any combination, except combinations where at least some of such features or steps are mutually exclusive. The protection is not restricted to the details of any foregoing implementations. The protection extends to any novel one, or any novel combination, of the features disclosed in this specification (including any accompanying claims, abstract and drawings), or to any novel one, or any novel combination, of the steps of any method or process so disclosed.

While certain implementations have been described, these implementations have been presented by way of example only and are not intended to limit the scope of protection. Indeed, the novel methods and systems described herein may be embodied in a variety of other forms. Furthermore, various omissions, substitutions and changes in the form of the methods and systems described herein may be made. Those skilled in the art will appreciate that in some implementations, the actual steps taken in the processes illustrated or disclosed may differ from those shown in the figures. Depending on the implementation, certain of the steps described above may be removed, others may be added. For example, the actual steps or order of steps taken in the disclosed processes may differ from those shown in the figure. Depending on the implementation, certain of the steps described above may be removed, others may be added. Furthermore, the features and attributes of the specific implementations disclosed above may be combined in different ways to form additional implementations, all of which fall within the scope of the present disclosure.

Although the present disclosure includes certain implementations, examples and applications, it will be understood by those skilled in the art that the present disclosure extends beyond the specifically disclosed implementations to other alternative implementations or uses and obvious modifications and equivalents thereof, including implementations which do not provide all of the features and advantages set forth herein. Accordingly, the scope of the present disclosure is not intended to be limited by the described implementations and may be defined by claims as presented herein or as presented in the future.

Conditional language, such as "can," "could," "might," or "may," unless specifically stated otherwise, or otherwise understood within the context as used, is generally intended to convey that certain implementations include, while other implementations do not include, certain features, elements, or steps. Thus, such conditional language is not generally intended to imply that features, elements, or steps are in any way required for one or more implementations or that one or more implementations necessarily include logic for deciding, with or without user input or prompting, whether these features, elements, or steps are included or are to be performed in any particular implementation. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list. Likewise, the term "and/or" in reference to a list of two or more items, covers all of the following interpretations of the word: any one of the items in the list, all of the items in the list, and any combination of the items in the list. Further, the term "each," as used herein, in addition to having its ordinary meaning, can mean any subset of a set of elements to which the term "each" is applied. Additionally, the words "herein," "above," "below," and words of similar import, when used in this application, refer to this application as a whole and not to any particular portions of this application.

Conjunctive language such as the phrase "at least one of X, Y, and Z," unless specifically stated otherwise, is otherwise understood with the context as used in general to convey that an item, term, etc. may be either X, Y, or Z. Thus, such conjunctive language is not generally intended to imply that certain implementations require the presence of at least one of X, at least one of Y, and at least one of Z.

Language of degree used herein, such as the terms "approximately," "about," "generally," and "substantially" as used herein represent a value, amount, or characteristic close to the stated value, amount, or characteristic that still performs a desired function or achieves a desired result. For example, the terms "approximately", "about", "generally," and "substantially" may refer to an amount that is within less than 10% of, within less than 5% of, within less than 1% of, within less than 0.1% of, and within less than 0.01% of the stated amount. As another example, in certain implementations, the terms "generally parallel" and "substantially parallel" refer to a value, amount, or characteristic that departs from exactly parallel by less than or equal to 15 degrees, 10 degrees, 5 degrees, 3 degrees, 1 degree, or 0.1 degree.

What is claimed is:

1. An antenna assembly comprising:

a case comprising:

a body portion; and a door pivotably coupled to the body portion;

a first ground plane coupled to the body portion, the first ground plane dividing the case into a first internal volume and a second internal volume;

a second ground plane configured to be in contact with the first ground plane, the second ground plane coupled to the body portion within the first internal volume;

a third ground plane configured to be in contact with the first ground plane, the third ground plane coupled to the door; and a multi-band multi-element antenna comprising:

at least one multi-band radiating element coupled to a top side of the first ground plane.

2. The antenna assembly of claim 1, wherein the second ground plane and the third ground plane are substantially orthogonal to the top side of the first ground plane.

3. The antenna assembly of claim 1, wherein the door is configured to move between an open configuration, where the first internal volume is accessible, and a closed configuration, where the first internal volume is sealed.

4. The antenna assembly of claim 3, wherein the third ground plane is configured to contact the first ground plane when the door is moved from the open configuration to the closed configuration.

5. The antenna assembly of claim 4, further comprising one or more compressible contact portions coupled to the first ground plane, wherein the one or more compressible contact portions contact both the first ground plane and the third ground plane when the door is in the closed configuration.

6. The antenna assembly of claim 5, wherein the one or more compressible contact portions comprise foam portions covered in a conductive fabric.

7. The antenna assembly of claim 1, wherein the case further comprising an inlet vent and an exhaust vent, the inlet vent configured to allow fluid to enter the first internal volume, the exhaust vent configured to allow fluid to exit the first internal volume.

8. The antenna assembly of claim 7, wherein the case further comprises a first rain hood extending over the inlet vent and a second rain hood extending over the exhaust vent.

9. The antenna assembly of claim 1, wherein the second ground plane is configured to act as a heatsink for the antenna assembly.

10. The antenna assembly of claim 1, further comprising an internal modem and a battery housed within the first internal volume.

11. The antenna assembly of claim 1, wherein the at least one multi-band radiating element comprises:

a feeding portion;

a grounding portion;

an upright low band radiation portion;

a second low band radiation portion; and a high band radiation portion.

12. The antenna assembly of claim 1, wherein at least one of the first ground plane, the second ground plane, or the third ground plane is configured to act as a heatsink for the antenna assembly.

13. The antenna assembly of claim 1, wherein the door is configured to move between an open configuration, where the first internal volume is accessible, and a closed configuration, where the first internal volume is closed.

14. The antenna assembly of claim 13, wherein the third ground plane is configured to contact the first ground plane when the door is moved from the open configuration to the closed configuration.

15. The antenna assembly of claim 14, further comprising one or more compressible contact portions coupled to the first ground plane, wherein the one or more compressible contact portions contact both the first ground plane and the third ground plane when the door is in the closed configuration.

16. The antenna assembly of claim 15, wherein the one or more compressible contact portions comprise foam portions covered in a conductive fabric.

17. The antenna assembly of claim 1, wherein the at least one multi-band radiating element comprises a first multi-band radiator portion, a second multi-band radiator portion, a third multi-band radiator portion, and a fourth multi-band radiator portion, and wherein each multi-band radiator portion has a unique rotational position.

18. The antenna assembly of claim 17, wherein the first multi-band radiator portion extends in a first direction and the second multi-band radiator portion extends in a second direction, the second direction opposite the first direction.

19. The antenna assembly of claim 18, wherein the third multi-band radiator portion extends in third direction and the fourth multi-band radiator portion extends in a fourth direction, the fourth direction opposite the third direction, the fourth direction different than the first direction and the second direction.

20. The antenna assembly of claim 17, wherein the third multi-band radiator portion and the fourth multi-band radiator portion are positioned between the first multi-band radiator portion and the second multi-band radiator portion.

* * * * *